(12) United States Patent
Shuster et al.

(10) Patent No.: US 7,377,326 B2
(45) Date of Patent: *May 27, 2008

(54) MAGNETIC IMPULSE APPLIED SLEEVE METHOD OF FORMING A WELLBORE CASING

(75) Inventors: Mark Shuster, Houston, TX (US); Lev Ring, Houston, TX (US)

(73) Assignee: Enventure Global Technology, L.L.C., Houston, TX (US)

( * ) Notice: Subject to any disclaimer, the term of this patent is extended or adjusted under 35 U.S.C. 154(b) by 271 days.

This patent is subject to a terminal disclaimer.

(21) Appl. No.: 10/525,332

(22) PCT Filed: Aug. 18, 2003

(86) PCT No.: PCT/US03/25677

§ 371 (c)(1),
(2), (4) Date: Jul. 5, 2005

(87) PCT Pub. No.: WO2004/018824

PCT Pub. Date: Mar. 4, 2004

(65) Prior Publication Data

US 2005/0247453 A1    Nov. 10, 2005

Related U.S. Application Data

(60) Provisional application No. 60/405,610, filed on Aug. 23, 2002.

(51) Int. Cl.
*E21B 43/10* (2006.01)
(52) U.S. Cl. .................. 166/384; 166/380; 166/207
(58) Field of Classification Search .............. 166/207, 166/206, 313, 380, 381, 242.6; 403/179, 403/273; 285/53
See application file for complete search history.

(56) References Cited

U.S. PATENT DOCUMENTS 46,818 A    3/1865    Patterson (Continued)

FOREIGN PATENT DOCUMENTS

AU        767364        2/2004

(Continued)

OTHER PUBLICATIONS

Halliburton Energy Services, "Halliburton Completion Products" 1996, Page Packers 5-37, United States of America.

(Continued)

*Primary Examiner*—Jennifer H Gay
*Assistant Examiner*—Daniel P Stephenson
(74) *Attorney, Agent, or Firm*—Todd Mattingly; King & Spalding L.L.P.

(57) ABSTRACT

A method of forming a wellbore casing within a borehole that traverses a subterranean formation includes the steps of assembling a tubular liner by coupling a threaded portion of a first tubular member to a threaded portion of a second tubular member and coupling a tubular sleeve to the threaded portions of the first and second tubular members. The method further includes positioning the wellbore casing within the borehole and radially expanding and plastically deforming the wellbore casing assembly within the borehole. The step of coupling the tubular sleeve through the threaded portions of the and second tubular members includes applying impulsive magnetic energy to the tubular sleeve.

16 Claims, 10 Drawing Sheets

U.S. PATENT DOCUMENTS

| | | |
|---|---|---|
| 331,940 A | 12/1885 | Bole |
| 332,184 A | 12/1885 | Bole |
| 341,237 A | 5/1886 | Healey |
| 519,805 A | 5/1894 | Bavier |
| 802,880 A | 10/1905 | Phillips, Jr. |
| 806,156 A | 12/1905 | Marshall |
| 958,517 A | 5/1910 | Mettler |
| 984,449 A | 2/1911 | Stewart |
| 1,166,040 A | 12/1915 | Burlingham |
| 1,233,888 A | 7/1917 | Leonard |
| 1,494,128 A | 5/1924 | Primrose |
| 1,589,781 A | 6/1926 | Anderson |
| 1,590,357 A | 6/1926 | Feisthamel |
| 1,597,212 A | 8/1926 | Spengler |
| 1,613,461 A | 1/1927 | Johnson |
| 1,756,531 A | 4/1930 | Aldeen et al. |
| 1,880,218 A | 10/1932 | Simmons |
| 1,981,525 A | 11/1934 | Price |
| 2,046,870 A | 7/1936 | Clasen et al. |
| 2,087,185 A | 7/1937 | Dillom |
| 2,122,757 A | 7/1938 | Scott |
| 2,145,168 A | 1/1939 | Flagg |
| 2,160,263 A | 5/1939 | Fletcher |
| 2,187,275 A | 1/1940 | McLennan |
| 2,204,586 A | 6/1940 | Grau |
| 2,211,173 A | 8/1940 | Shaffer |
| 2,214,226 A | 9/1940 | English |
| 2,226,804 A | 12/1940 | Carroll |
| 2,246,038 A | 6/1941 | Graham |
| 2,273,017 A | 2/1942 | Boynton |
| 2,301,495 A | 11/1942 | Abegg |
| 2,305,282 A | 12/1942 | Taylor, Jr. et al. |
| 2,371,840 A | 3/1945 | Otis |
| 2,383,214 A | 8/1945 | Prout |
| 2,447,629 A | 8/1948 | Beissinger et al. |
| 2,500,276 A | 3/1950 | Church |
| 2,546,295 A | 3/1951 | Boice |
| 2,583,316 A | 1/1952 | Bannister |
| 2,609,258 A | 11/1952 | Taylor, Jr. et al. |
| 2,627,891 A | 2/1953 | Clark |
| 2,647,847 A | 8/1953 | Black et al. |
| 2,664,952 A | 1/1954 | Losey |
| 2,691,418 A | 10/1954 | Connolly |
| 2,723,721 A | 11/1955 | Corsette |
| 2,734,580 A | 2/1956 | Layne |
| 2,796,134 A | 6/1957 | Binkley |
| 2,812,025 A | 11/1957 | Teague et al. |
| 2,877,822 A | 3/1959 | Buck |
| 2,907,589 A | 10/1959 | Knox |
| 2,919,741 A | 1/1960 | Strock et al. |
| 2,929,741 A | 1/1960 | Strock et al. |
| 3,015,362 A | 1/1962 | Moosman |
| 3,015,500 A | 1/1962 | Barnett |
| 3,018,547 A | 1/1962 | Marskell |
| 3,039,530 A | 6/1962 | Condra |
| 3,067,801 A | 12/1962 | Sortor |
| 3,067,819 A | 12/1962 | Gore |
| 3,068,563 A | 12/1962 | Reverman |
| 3,104,703 A | 9/1963 | Rike et al. |
| 3,111,991 A | 11/1963 | O'Neal |
| 3,167,122 A | 1/1965 | Lang |
| 3,175,618 A | 3/1965 | Lang et al. |
| 3,179,168 A | 4/1965 | Vincent |
| 3,188,816 A | 6/1965 | Koch |
| 3,191,677 A | 6/1965 | Kinley |
| 3,191,680 A | 6/1965 | Vincent |
| 3,203,451 A | 8/1965 | Vincent |
| 3,203,483 A | 8/1965 | Vincent |
| 3,209,546 A | 10/1965 | Lawton |
| 3,210,102 A | 10/1965 | Joslin |
| 3,233,315 A | 2/1966 | Levake |
| 3,245,471 A | 4/1966 | Howard |
| 3,270,817 A | 9/1966 | Papaila |
| 3,297,092 A | 1/1967 | Jennings |
| 3,326,293 A | 6/1967 | Skipper |
| 3,343,252 A | 9/1967 | Reesor |
| 3,353,599 A | 11/1967 | Swift |
| 3,354,955 A | 11/1967 | Berry |
| 3,358,760 A | 12/1967 | Blagg |
| 3,358,769 A | 12/1967 | Berry |
| 3,364,993 A | 1/1968 | Skipper |
| 3,371,717 A | 3/1968 | Chenoweth |
| 3,397,745 A | 8/1968 | Owens et al. |
| 3,412,565 A | 11/1968 | Lindsey et al. |
| 3,419,080 A | 12/1968 | Lebourg |
| 3,422,902 A | 1/1969 | Bouchillon |
| 3,424,244 A | 1/1969 | Kinley |
| 3,427,707 A | 2/1969 | Nowosadko |
| 3,463,228 A | 8/1969 | Hearn |
| 3,477,506 A | 11/1969 | Malone |
| 3,489,220 A | 1/1970 | Kinley |
| 3,489,437 A | 1/1970 | Duret |
| 3,498,376 A | 3/1970 | Sizer et al. |
| 3,504,515 A | 4/1970 | Reardon |
| 3,508,771 A | 4/1970 | Duret |
| 3,520,049 A | 7/1970 | Lysenko et al. |
| 3,528,498 A | 9/1970 | Carothers |
| 3,532,174 A | 10/1970 | Diamantides et al. |
| 3,568,773 A | 3/1971 | Chancellor |
| 3,574,357 A | 4/1971 | Alexandru et al. |
| 3,578,081 A | 5/1971 | Bodine |
| 3,579,805 A | 5/1971 | Kast |
| 3,581,817 A | 6/1971 | Kammerer, Jr. |
| 3,605,887 A | 9/1971 | Lambie |
| 3,631,926 A | 1/1972 | Young |
| 3,665,591 A | 5/1972 | Kowal |
| 3,667,547 A | 6/1972 | Ahlstone |
| 3,669,190 A | 6/1972 | Sizer et al. |
| 3,678,727 A | 7/1972 | Jackson |
| 3,682,256 A | 8/1972 | Stuart |
| 3,687,196 A | 8/1972 | Mullins |
| 3,691,624 A | 9/1972 | Kinley |
| 3,693,717 A | 9/1972 | Wuenschel |
| 3,704,730 A | 12/1972 | Witzig |
| 3,709,306 A | 1/1973 | Curington |
| 3,711,123 A | 1/1973 | Arnold |
| 3,712,376 A | 1/1973 | Owen et al. |
| 3,746,068 A | 7/1973 | Deckert et al. |
| 3,746,091 A | 7/1973 | Owen et al. |
| 3,746,092 A | 7/1973 | Land |
| 3,764,168 A | 10/1973 | Kisling, III et al. |
| 3,776,307 A | 12/1973 | Young |
| 3,779,025 A | 12/1973 | Godley et al. |
| 3,780,562 A | 12/1973 | Kinley |
| 3,781,966 A | 1/1974 | Lieberman |
| 3,785,193 A | 1/1974 | Kinely et al. |
| 3,797,259 A | 3/1974 | Kammerer, Jr. |
| 3,805,567 A | 4/1974 | Agius-Sincero |
| 3,812,912 A | 5/1974 | Wuenschel |
| 3,818,734 A | 6/1974 | Bateman |
| 3,826,124 A | 7/1974 | Baksay |
| 3,830,294 A | 8/1974 | Swanson |
| 3,830,295 A | 8/1974 | Crowe |
| 3,834,742 A | 9/1974 | McPhillips |
| 3,848,668 A | 11/1974 | Sizer et al. |
| 3,866,954 A | 2/1975 | Slator et al. |
| 3,874,446 A | 4/1975 | Crowe |
| 3,885,298 A | 5/1975 | Pogonowski |
| 3,887,006 A | 6/1975 | Pitts |
| 3,893,718 A | 7/1975 | Powell |
| 3,898,163 A | 8/1975 | Mott |
| 3,915,478 A | 10/1975 | Al et al. |
| 3,915,763 A | 10/1975 | Jennings et al. |
| 3,935,910 A | 2/1976 | Gaudy et al. |

| Patent No. | Date | Name |
|---|---|---|
| 3,942,824 A | 3/1976 | Sable |
| 3,945,444 A | 3/1976 | Knudson |
| 3,948,321 A | 4/1976 | Owen et al. |
| 3,963,076 A | 6/1976 | Winslow |
| 3,970,336 A | 7/1976 | O'Sickey et al. |
| 3,977,473 A | 8/1976 | Page, Jr. |
| 3,989,280 A | 11/1976 | Schwarz |
| 3,997,193 A | 12/1976 | Tsuda et al. |
| 3,999,605 A | 12/1976 | Braddick |
| 4,011,652 A | 3/1977 | Black |
| 4,018,634 A | 4/1977 | Fencl |
| 4,019,579 A | 4/1977 | Thuse |
| 4,026,583 A | 5/1977 | Gottlieb |
| 4,053,247 A | 10/1977 | Marsh, Jr. |
| 4,069,573 A | 1/1978 | Rogers, Jr. et al. |
| 4,076,287 A | 2/1978 | Bill et al. |
| 4,096,913 A | 6/1978 | Kenneday et al. |
| 4,098,334 A | 7/1978 | Crowe |
| 4,099,563 A | 7/1978 | Hutchinson et al. |
| 4,125,937 A | 11/1978 | Brown et al. |
| 4,152,821 A | 5/1979 | Scott |
| 4,168,747 A | 9/1979 | Youmans |
| 4,190,108 A | 2/1980 | Webber |
| 4,204,312 A | 5/1980 | Tooker |
| 4,205,422 A | 6/1980 | Hardwick |
| 4,226,449 A | 10/1980 | Cole |
| 4,253,687 A | 3/1981 | Maples |
| 4,257,155 A | 3/1981 | Hunter |
| 4,274,665 A | 6/1981 | Marsh, Jr. |
| RE30,802 E | 11/1981 | Rogers, Jr. |
| 4,304,428 A | 12/1981 | Grigorian et al. |
| 4,328,983 A | 5/1982 | Gibson |
| 4,355,664 A | 10/1982 | Cook et al. |
| 4,359,889 A | 11/1982 | Kelly |
| 4,363,358 A | 12/1982 | Ellis |
| 4,366,971 A | 1/1983 | Lula |
| 4,368,571 A | 1/1983 | Cooper, Jr. |
| 4,379,471 A | 4/1983 | Kuenzel |
| 4,380,347 A | 4/1983 | Sable |
| 4,384,625 A | 5/1983 | Roper et al. |
| 4,388,752 A | 6/1983 | Vinciguerra et al. |
| 4,391,325 A | 7/1983 | Baker et al. |
| 4,393,931 A | 7/1983 | Muse et al. |
| 4,396,061 A | 8/1983 | Tamplen et al. |
| 4,397,484 A | 8/1983 | Miller |
| 4,401,325 A | 8/1983 | Tsuchiya et al. |
| 4,402,372 A | 9/1983 | Cherrington |
| 4,407,681 A | 10/1983 | Ina et al. |
| 4,411,435 A | 10/1983 | McStravick |
| 4,413,395 A | 11/1983 | Garnier |
| 4,413,682 A | 11/1983 | Callihan et al. |
| 4,420,866 A | 12/1983 | Mueller |
| 4,421,169 A | 12/1983 | Dearth et al. |
| 4,422,317 A | 12/1983 | Mueller |
| 4,422,507 A | 12/1983 | Reimert |
| 4,423,889 A | 1/1984 | Weise |
| 4,423,986 A | 1/1984 | Skogberg |
| 4,424,865 A | 1/1984 | Payton, Jr. |
| 4,429,741 A | 2/1984 | Hyland |
| 4,440,233 A | 4/1984 | Baugh et al. |
| 4,442,586 A | 4/1984 | Ridenour |
| 4,444,250 A | 4/1984 | Keithahn et al. |
| 4,449,713 A | 5/1984 | Ishido et al. |
| 4,458,925 A | 7/1984 | Raulins et al. |
| 4,462,471 A | 7/1984 | Hipp |
| 4,467,630 A | 8/1984 | Kelly |
| 4,468,309 A | 8/1984 | White |
| 4,469,356 A | 9/1984 | Duret et al. |
| 4,473,245 A | 9/1984 | Raulins et al. |
| 4,483,399 A | 11/1984 | Colgate |
| 4,485,847 A | 12/1984 | Wentzell |
| 4,491,001 A | 1/1985 | Yoshida |
| 4,495,073 A | 1/1985 | Beimgraben |
| 4,501,327 A | 2/1985 | Retz |
| 4,505,017 A | 3/1985 | Schukei |
| 4,505,987 A | 3/1985 | Yamada et al. |
| 4,506,432 A | 3/1985 | Smith |
| 4,507,019 A | 3/1985 | Thompson |
| 4,508,129 A | 4/1985 | Brown |
| 4,508,167 A | 4/1985 | Weinberg et al. |
| 4,511,289 A | 4/1985 | Herron |
| 4,513,995 A | 4/1985 | Niehaus et al. |
| 4,519,456 A | 5/1985 | Cochran |
| 4,526,232 A | 7/1985 | Hughson et al. |
| 4,526,839 A | 7/1985 | Herman et al. |
| 4,527,815 A | 7/1985 | Frick |
| 4,530,231 A | 7/1985 | Main |
| 4,531,552 A | 7/1985 | Kim |
| 4,537,429 A | 8/1985 | Landriault |
| 4,538,442 A | 9/1985 | Reed |
| 4,538,840 A | 9/1985 | DeLange |
| 4,541,655 A | 9/1985 | Hunter |
| 4,550,782 A | 11/1985 | Lawson |
| 4,550,937 A | 11/1985 | Duret |
| 4,553,776 A | 11/1985 | Dodd |
| 4,573,248 A | 3/1986 | Hackett |
| 4,576,386 A | 3/1986 | Benson et al. |
| 4,581,817 A | 4/1986 | Kelly |
| 4,582,348 A | 4/1986 | Dearden et al. |
| 4,590,227 A | 5/1986 | Nakamura et al. |
| 4,590,995 A | 5/1986 | Evans |
| 4,592,577 A | 6/1986 | Ayres et al. |
| 4,595,063 A | 6/1986 | Jennings et al. |
| 4,596,913 A | 6/1986 | Takechi |
| 4,601,343 A | 7/1986 | Lindsey, Jr. et al. |
| 4,603,889 A | 8/1986 | Welsh |
| 4,605,063 A | 8/1986 | Ross |
| 4,611,662 A | 9/1986 | Harrington |
| 4,614,233 A | 9/1986 | Menard |
| 4,629,218 A | 12/1986 | Dubois |
| 4,629,224 A | 12/1986 | Lanriault |
| 4,630,849 A | 12/1986 | Fukui et al. |
| 4,632,944 A | 12/1986 | Thompson |
| 4,634,317 A | 1/1987 | Skogberg et al. |
| 4,635,333 A | 1/1987 | Finch |
| 4,637,436 A | 1/1987 | Stewart, Jr. et al. |
| 4,646,787 A | 3/1987 | Rush et al. |
| 4,649,492 A | 3/1987 | Sinha et al. |
| 4,651,836 A | 3/1987 | Richards |
| 4,656,779 A | 4/1987 | Fedeli |
| 4,660,863 A | 4/1987 | Bailey et al. |
| 4,662,446 A | 5/1987 | Brisco et al. |
| 4,669,541 A | 6/1987 | Bissonnette |
| 4,674,572 A | 6/1987 | Gallus |
| 4,676,563 A | 6/1987 | Curlett et al. |
| 4,682,797 A | 7/1987 | Hildner |
| 4,685,191 A | 8/1987 | Mueller et al. |
| 4,685,834 A | 8/1987 | Jordan |
| 4,693,498 A | 9/1987 | Baugh et al. |
| 4,711,474 A | 12/1987 | Patrick |
| 4,714,117 A | 12/1987 | Dech |
| 4,730,851 A | 3/1988 | Watts |
| 4,732,416 A | 3/1988 | Dearden et al. |
| 4,735,444 A | 4/1988 | Skipper |
| 4,739,654 A | 4/1988 | Pilkington et al. |
| 4,739,916 A | 4/1988 | Ayres et al. |
| 4,754,781 A | 7/1988 | Putter |
| 4,758,025 A | 7/1988 | Frick |
| 4,762,344 A | 8/1988 | Perkins et al. |
| 4,776,394 A | 10/1988 | Lynde et al. |
| 4,778,088 A | 10/1988 | Miller |
| 4,779,445 A | 10/1988 | Rabe |
| 4,793,382 A | 12/1988 | Szalvay |
| 4,796,668 A | 1/1989 | Depret |
| 4,799,544 A | 1/1989 | Curlett |
| 4,817,710 A | 4/1989 | Edwards et al. |

| | | | | | |
|---|---|---|---|---|---|
| 4,817,712 A | 4/1989 | Bodine | 5,174,376 A | 12/1992 | Singeetham |
| 4,817,716 A | 4/1989 | Taylor et al. | 5,181,571 A | 1/1993 | Mueller et al. |
| 4,822,081 A | 4/1989 | Blose | 5,195,583 A | 3/1993 | Toon et al. |
| 4,825,674 A | 5/1989 | Tanaka et al. | 5,197,553 A | 3/1993 | Leturno |
| 4,826,347 A | 5/1989 | Baril et al. | 5,209,600 A | 5/1993 | Koster |
| 4,827,594 A | 5/1989 | Cartry et al. | 5,226,492 A | 7/1993 | Solaeche P. et al. |
| 4,828,033 A | 5/1989 | Frison | 5,242,017 A | 9/1993 | Hailey |
| 4,830,109 A | 5/1989 | Wedel | 5,249,628 A | 10/1993 | Surjaatmadja |
| 4,832,382 A | 5/1989 | Kapgan | 5,253,713 A | 10/1993 | Gregg et al. |
| 4,836,278 A | 6/1989 | Stone et al. | RE34,467 E | 12/1993 | Reeves |
| 4,836,579 A | 6/1989 | Wester et al. | 5,275,242 A | 1/1994 | Payne |
| 4,838,349 A | 6/1989 | Berzin | 5,282,508 A | 2/1994 | Ellingsen et al. |
| 4,842,082 A | 6/1989 | Springer | 5,286,393 A | 2/1994 | Oldiges et al. |
| 4,848,459 A | 7/1989 | Blackwell et al. | 5,306,101 A | 4/1994 | Rockower et al. |
| 4,854,338 A | 8/1989 | Grantham | 5,309,621 A | 5/1994 | O'Donnell et al. |
| 4,856,592 A | 8/1989 | Van Bilderbeek et al. | 5,314,014 A | 5/1994 | Tucker |
| 4,865,127 A | 9/1989 | Koster | 5,314,209 A | 5/1994 | Kuhne |
| 4,871,199 A | 10/1989 | Ridenour et al. | 5,318,122 A | 6/1994 | Murray et al. |
| 4,872,253 A | 10/1989 | Carstensen | 5,318,131 A | 6/1994 | Baker |
| 4,887,646 A | 12/1989 | Groves | 5,325,923 A | 7/1994 | Surjaatmadja et al. |
| 4,888,975 A | 12/1989 | Soward et al. | 5,326,137 A | 7/1994 | Lorenz et al. |
| 4,892,337 A | 1/1990 | Gunderson et al. | 5,327,964 A | 7/1994 | O'Donnell et al. |
| 4,893,658 A | 1/1990 | Kimura et al. | 5,330,850 A | 7/1994 | Suzuki et al. |
| 4,904,136 A | 2/1990 | Matsumoto | 5,332,038 A | 7/1994 | Tapp et al. |
| 4,907,828 A | 3/1990 | Change | 5,332,049 A | 7/1994 | Tew |
| 4,911,237 A | 3/1990 | Melenyzer | 5,333,692 A | 8/1994 | Baugh et al. |
| 4,913,758 A | 4/1990 | Koster | 5,335,736 A | 8/1994 | Windsor |
| 4,915,177 A | 4/1990 | Claycomb | 5,337,808 A | 8/1994 | Graham |
| 4,915,426 A | 4/1990 | Skipper | 5,337,823 A | 8/1994 | Nobileau |
| 4,917,409 A | 4/1990 | Reeves | 5,337,827 A | 8/1994 | Hromas et al. |
| 4,919,989 A | 4/1990 | Colangelo | 5,339,894 A | 8/1994 | Stotler |
| 4,921,045 A | 5/1990 | Richardson | 5,343,949 A | 9/1994 | Ross et al. |
| 4,924,949 A | 5/1990 | Curlett | 5,346,007 A | 9/1994 | Dillon et al. |
| 4,930,573 A | 6/1990 | Lane et al. | 5,348,087 A | 9/1994 | Williamson, Jr. |
| 4,934,038 A | 6/1990 | Caudill | 5,348,093 A | 9/1994 | Wood et al. |
| 4,934,312 A | 6/1990 | Koster et al. | 5,348,095 A | 9/1994 | Worrall et al. |
| 4,938,291 A | 7/1990 | Lynde et al. | 5,348,668 A | 9/1994 | Oldiges et al. |
| 4,941,512 A | 7/1990 | McParland | 5,351,752 A | 10/1994 | Wood et al. |
| 4,941,532 A | 7/1990 | Hurt et al. | 5,360,239 A | 11/1994 | Klementich |
| 4,942,925 A | 7/1990 | Themig | 5,360,292 A | 11/1994 | Allen et al. |
| 4,942,926 A | 7/1990 | Lessi | 5,361,836 A | 11/1994 | Sorem et al. |
| 4,958,691 A | 9/1990 | Hipp | 5,361,843 A | 11/1994 | Shy et al. |
| 4,968,184 A | 11/1990 | Reid | 5,366,010 A | 11/1994 | Zwart |
| 4,971,152 A | 11/1990 | Koster et al. | 5,366,012 A | 11/1994 | Lohbeck |
| 4,976,322 A | 12/1990 | Abdrakhmanov et al. | 5,368,075 A | 11/1994 | Bäro et al. |
| 4,981,250 A | 1/1991 | Persson | 5,370,425 A | 12/1994 | Dougherty et al. |
| 4,995,464 A | 2/1991 | Watkins et al. | 5,375,661 A | 12/1994 | Daneshy et al. |
| 5,014,779 A | 5/1991 | Meling et al. | 5,388,648 A | 2/1995 | Jordan, Jr. |
| 5,015,017 A | 5/1991 | Geary | 5,390,735 A | 2/1995 | Williamson, Jr. |
| 5,026,074 A | 6/1991 | Hoes et al. | 5,390,742 A | 2/1995 | Dines et al. |
| 5,031,370 A | 7/1991 | Jewett | 5,396,957 A | 3/1995 | Surjaatmadja et al. |
| 5,031,699 A | 7/1991 | Artynov et al. | 5,400,827 A | 3/1995 | Baro et al. |
| 5,040,283 A | 8/1991 | Pelgrom | 5,405,171 A | 4/1995 | Allen et al. |
| 5,044,676 A | 9/1991 | Burton et al. | 5,411,301 A | 5/1995 | Moyer et al. |
| 5,048,871 A | 9/1991 | Pfeiffer et al. | 5,413,180 A | 5/1995 | Ross et al. |
| 5,052,483 A | 10/1991 | Hudson | 5,419,595 A | 5/1995 | Yamamoto et al. |
| 5,059,043 A | 10/1991 | Kuhne | 5,425,559 A | 6/1995 | Nobileau |
| 5,064,004 A | 11/1991 | Lundel | 5,426,130 A | 6/1995 | Thurder et al. |
| 5,079,837 A | 1/1992 | Vanselow | 5,431,831 A | 7/1995 | Vincent |
| 5,083,608 A | 1/1992 | Abdrakhmanov et al. | 5,435,395 A | 7/1995 | Connell |
| 5,093,015 A | 3/1992 | Oldiges | 5,439,320 A | 8/1995 | Abrams |
| 5,095,991 A | 3/1992 | Milberger | 5,443,129 A | 8/1995 | Bailey et al. |
| 5,097,710 A | 3/1992 | Palynchuk | 5,447,201 A | 9/1995 | Mohn |
| 5,101,653 A | 4/1992 | Hermes et al. | 5,454,419 A | 10/1995 | Vloedman |
| 5,105,888 A | 4/1992 | Pollock et al. | 5,456,319 A | 10/1995 | Schmidt et al. |
| 5,107,221 A | 4/1992 | N'Guyen et al. | 5,458,194 A | 10/1995 | Brooks |
| 5,119,661 A | 6/1992 | Abdrakhmanov et al. | 5,462,120 A | 10/1995 | Gondouin |
| 5,134,891 A | 8/1992 | Canevet | 5,467,822 A | 11/1995 | Zwart |
| 5,150,755 A | 9/1992 | Cassel et al. | 5,472,055 A | 12/1995 | Simson et al. |
| 5,156,043 A | 10/1992 | Ose | 5,474,334 A | 12/1995 | Eppink |
| 5,156,213 A | 10/1992 | George et al. | 5,492,173 A | 2/1996 | Kilgore et al. |
| 5,156,223 A | 10/1992 | Hipp | 5,494,106 A | 2/1996 | Gueguen et al. |
| 5,174,340 A | 12/1992 | Peterson et al. | 5,507,343 A | 4/1996 | Carlton et al. |

| | | | | | |
|---|---|---|---|---|---|
| 5,511,620 A | 4/1996 | Baugh et al. | 6,024,181 A | 2/2000 | Richardson et al. |
| 5,524,937 A | 6/1996 | Sides, III et al. | 6,027,145 A | 2/2000 | Tsuru et al. |
| 5,535,824 A | 7/1996 | Hudson | 6,029,748 A | 2/2000 | Forsyth et al. |
| 5,536,422 A | 7/1996 | Oldiges et al. | 6,035,954 A | 3/2000 | Hipp |
| 5,540,281 A | 7/1996 | Round | 6,044,906 A | 4/2000 | Saltel |
| 5,554,244 A | 9/1996 | Ruggles et al. | 6,047,505 A | 4/2000 | Willow |
| 5,566,772 A | 10/1996 | Coone et al. | 6,047,774 A | 4/2000 | Allen |
| 5,567,335 A | 10/1996 | Baessler et al. | 6,050,341 A | 4/2000 | Metcalf |
| 5,576,485 A | 11/1996 | Serata | 6,050,346 A | 4/2000 | Hipp |
| 5,584,512 A | 12/1996 | Carstensen | 6,056,059 A | 5/2000 | Ohmer |
| 5,606,792 A | 3/1997 | Schafer | 6,056,324 A | 5/2000 | Reimert et al. |
| 5,611,399 A | 3/1997 | Richard et al. | 6,062,324 A | 5/2000 | Hipp |
| 5,613,557 A | 3/1997 | Blount et al. | 6,065,500 A | 5/2000 | Metcalfe |
| 5,617,918 A | 4/1997 | Cooksey et al. | 6,070,671 A | 6/2000 | Cumming et al. |
| 5,642,560 A | 7/1997 | Tabuchi et al. | 6,073,332 A | 6/2000 | Turner |
| 5,642,781 A | 7/1997 | Richard | 6,073,692 A | 6/2000 | Wood et al. |
| 5,662,180 A | 9/1997 | Coffman et al. | 6,073,698 A | 6/2000 | Shultz et al. |
| 5,664,327 A | 9/1997 | Swars | 6,074,133 A | 6/2000 | Kelsey |
| 5,667,011 A | 9/1997 | Gill et al. | 6,078,031 A | 6/2000 | Bliault et al. |
| 5,667,252 A | 9/1997 | Schafer et al. | 6,079,495 A | 6/2000 | Ohmer |
| 5,678,609 A | 10/1997 | Washburn | 6,085,838 A | 7/2000 | Vercaemer et al. |
| 5,685,369 A | 11/1997 | Ellis et al. | 6,089,320 A | 7/2000 | LaGrange |
| 5,689,871 A | 11/1997 | Carstensen | 6,098,717 A | 8/2000 | Bailey et al. |
| 5,695,008 A | 12/1997 | Bertet et al. | 6,102,119 A | 8/2000 | Raines |
| 5,695,009 A | 12/1997 | Hipp | 6,109,355 A | 8/2000 | Reid |
| 5,697,442 A | 12/1997 | Baldridge | 6,112,818 A | 9/2000 | Campbell |
| 5,697,449 A | 12/1997 | Hennig et al. | 6,131,265 A | 10/2000 | Bird |
| 5,718,288 A | 2/1998 | Bertet et al. | 6,135,208 A | 10/2000 | Gano et al. |
| 5,738,146 A | 4/1998 | Abe | 6,138,761 A | 10/2000 | Freeman et al. |
| 5,743,335 A | 4/1998 | Bussear | 6,142,230 A | 11/2000 | Smalley et al. |
| 5,749,419 A | 5/1998 | Coronado et al. | 6,155,613 A | 12/2000 | Quadflieg et al. |
| 5,749,585 A | 5/1998 | Lembcke | 6,158,785 A | 12/2000 | Beaulier et al. |
| 5,755,895 A | 5/1998 | Tamehiro et al. | 6,158,963 A | 12/2000 | Hollis |
| 5,775,422 A | 7/1998 | Wong et al. | 6,167,970 B1 | 1/2001 | Stout |
| 5,785,120 A | 7/1998 | Smalley et al. | 6,182,775 B1 | 2/2001 | Hipp |
| 5,787,933 A | 8/1998 | Russ et al. | 6,183,013 B1 | 2/2001 | Mackenzie et al. |
| 5,791,419 A | 8/1998 | Valisalo | 6,183,573 B1 | 2/2001 | Fujiwara et al. |
| 5,794,702 A | 8/1998 | Nobileau | 6,196,336 B1 | 3/2001 | Fincher et al. |
| 5,797,454 A | 8/1998 | Hipp | 6,216,509 B1 | 4/2001 | Lotspaih et al. |
| 5,829,520 A | 11/1998 | Johnson | 6,220,306 B1 | 4/2001 | Omura et al. |
| 5,829,524 A | 11/1998 | Flanders et al. | 6,226,855 B1 | 5/2001 | Maine |
| 5,829,797 A | 11/1998 | Yamamoto et al. | 6,231,086 B1 | 5/2001 | Tierling |
| 5,833,001 A | 11/1998 | Song et al. | 6,237,967 B1 | 5/2001 | Yamamoto et al. |
| 5,845,945 A | 12/1998 | Carstensen | 6,250,385 B1 | 6/2001 | Montaron |
| 5,849,188 A | 12/1998 | Voll et al. | 6,253,846 B1 | 7/2001 | Nazzai et al. |
| 5,857,524 A | 1/1999 | Harris | 6,253,850 B1 | 7/2001 | Nazzai et al. |
| 5,862,866 A | 1/1999 | Springer | 6,263,966 B1 | 7/2001 | Haut et al. |
| 5,875,851 A | 3/1999 | Vick, Jr. et al. | 6,263,968 B1 | 7/2001 | Freeman et al. |
| 5,885,941 A | 3/1999 | Sateva et al. | 6,263,972 B1 | 7/2001 | Richard et al. |
| 5,895,079 A | 4/1999 | Carstensen et al. | 6,267,181 B1 | 7/2001 | Rhein-Knudsen et al. |
| 5,901,789 A | 5/1999 | Donnelly et al. | 6,273,634 B1 | 8/2001 | Lohbeck |
| 5,918,677 A | 7/1999 | Head | 6,275,556 B1 | 8/2001 | Kinney et al. |
| 5,924,745 A | 7/1999 | Campbell | 6,283,211 B1 | 9/2001 | Vloedman |
| 5,931,511 A | 8/1999 | DeLange et al. | 6,286,558 B1 | 9/2001 | Quigley et al. |
| 5,933,945 A | 8/1999 | Thomeer et al. | 6,302,211 B1 | 10/2001 | Nelson et al. |
| 5,944,100 A | 8/1999 | Hipp | 6,311,792 B1 | 11/2001 | Scott et al. |
| 5,944,107 A | 8/1999 | Ohmer | 6,315,040 B1 | 11/2001 | Donnelly |
| 5,944,108 A | 8/1999 | Baugh et al. | 6,315,043 B1 | 11/2001 | Farrant et al. |
| 5,951,207 A | 9/1999 | Chen | 6,318,457 B1 | 11/2001 | Den Boer et al. |
| 5,957,195 A | 9/1999 | Bailey et al. | 6,318,465 B1 | 11/2001 | Coon et al. |
| 5,964,288 A | 10/1999 | Leighton et al. | 6,322,109 B1 | 11/2001 | Campbell et al. |
| 5,971,443 A | 10/1999 | Noel et al. | 6,325,148 B1 | 12/2001 | Trahan et al. |
| 5,975,587 A | 11/1999 | Wood et al. | 6,328,113 B1 | 12/2001 | Cook |
| 5,979,560 A | 11/1999 | Nobileau | 6,334,351 B1 | 1/2002 | Tsuchiya |
| 5,984,369 A | 11/1999 | Crook et al. | 6,343,495 B1 | 2/2002 | Cheppe et al. |
| 5,984,568 A | 11/1999 | Lohbeck | 6,343,657 B1 | 2/2002 | Baugh et al. |
| 6,012,521 A | 1/2000 | Zunkel et al. | 6,345,373 B1 | 2/2002 | Chakradhar et al. |
| 6,012,522 A | 1/2000 | Donnelly et al. | 6,345,431 B1 | 2/2002 | Greig |
| 6,012,523 A | 1/2000 | Campbell et al. | 6,349,521 B1 | 2/2002 | McKeon et al. |
| 6,012,874 A | 1/2000 | Groneck et al. | 6,352,112 B1 | 3/2002 | Mills |
| 6,015,012 A | 1/2000 | Reddick | 6,354,373 B1 | 3/2002 | Vercaemer et al. |
| 6,017,168 A | 1/2000 | Fraser et al. | 6,390,720 B1 | 5/2002 | LeBegue et al. |
| 6,021,850 A | 2/2000 | Woo et al. | 6,405,761 B1 | 6/2002 | Shimizu et al. |

| | | |
|---|---|---|
| 6,406,063 B1 | 6/2002 | Pfeiffer |
| 6,409,175 B1 | 6/2002 | Evans et al. |
| 6,419,025 B1 | 7/2002 | Lohbeck et al. |
| 6,419,026 B1 | 7/2002 | MacKenzie et al. |
| 6,419,033 B1 | 7/2002 | Hahn et al. |
| 6,419,147 B1 | 7/2002 | Daniel |
| 6,425,444 B1 | 7/2002 | Metcalfe et al. |
| 6,431,277 B1 | 8/2002 | Cox et al. |
| 6,443,247 B1 | 9/2002 | Wardley |
| 6,446,724 B2 | 9/2002 | Baugh et al. |
| 6,447,025 B1 | 9/2002 | Smith |
| 6,450,261 B1 | 9/2002 | Baugh |
| 6,454,013 B1 | 9/2002 | Metcalfe |
| 6,454,024 B1 | 9/2002 | Nackerud |
| 6,457,532 B1 | 10/2002 | Simpson |
| 6,457,533 B1 | 10/2002 | Metcalfe |
| 6,457,749 B1 | 10/2002 | Heijnen |
| 6,460,615 B1 | 10/2002 | Heijnen |
| 6,464,008 B1 | 10/2002 | Roddy et al. |
| 6,464,014 B1 | 10/2002 | Bernat |
| 6,470,966 B2 | 10/2002 | Cook et al. |
| 6,470,996 B1 | 10/2002 | Kyle et al. |
| 6,478,092 B2 | 11/2002 | Voll et al. |
| 6,491,108 B1 | 12/2002 | Slup et al. |
| 6,497,289 B1 | 12/2002 | Cook et al. |
| 6,513,243 B1 | 2/2003 | Bignucolo et al. |
| 6,516,887 B2 | 2/2003 | Nguyen et al. |
| 6,517,126 B1 | 2/2003 | Peterson et al. |
| 6,527,049 B2 | 3/2003 | Metcalfe et al. |
| 6,543,545 B1 | 4/2003 | Chatterji et al. |
| 6,543,552 B1 | 4/2003 | Metcalfe et al. |
| 6,550,539 B2 | 4/2003 | Maguire et al. |
| 6,550,821 B2 | 4/2003 | DeLange et al. |
| 6,557,640 B1 | 5/2003 | Cook et al. |
| 6,557,906 B1 | 5/2003 | Carcagno |
| 6,561,227 B2 | 5/2003 | Cook et al. |
| 6,561,279 B2 | 5/2003 | MacKenzie et al. |
| 6,564,875 B1 | 5/2003 | Bullock |
| 6,568,471 B1 | 5/2003 | Cook et al. |
| 6,568,488 B2 | 5/2003 | Wentworth et al. |
| 6,575,240 B1 | 6/2003 | Cook et al. |
| 6,578,630 B2 | 6/2003 | Simpson et al. |
| 6,585,053 B2 | 7/2003 | Coon |
| 6,585,299 B1 | 7/2003 | Quadflieg et al. |
| 6,591,905 B2 | 7/2003 | Coon |
| 6,598,677 B1 | 7/2003 | Baugh et al. |
| 6,598,678 B1 | 7/2003 | Simpson |
| 6,604,763 B1 | 8/2003 | Cook et al. |
| 6,607,220 B2 | 8/2003 | Sivley, IV |
| 6,609,735 B1 | 8/2003 | DeLange et al. |
| 6,619,696 B2 | 9/2003 | Baugh et al. |
| 6,622,797 B2 | 9/2003 | Sivley, IV |
| 6,629,567 B2 | 10/2003 | Lauritzen et al. |
| 6,631,759 B2 | 10/2003 | Cook et al. |
| 6,631,760 B2 | 10/2003 | Cook et al. |
| 6,631,765 B2 | 10/2003 | Baugh et al. |
| 6,631,769 B2 | 10/2003 | Cook et al. |
| 6,634,431 B2 | 10/2003 | Cook et al. |
| 6,640,895 B2 | 11/2003 | Murray |
| 6,640,903 B1 | 11/2003 | Cook et al. |
| 6,648,075 B2 | 11/2003 | Badrak et al. |
| 6,659,509 B2 | 12/2003 | Goto et al. |
| 6,662,876 B2 | 12/2003 | Lauritzen |
| 6,668,937 B1 | 12/2003 | Murray |
| 6,672,759 B2 | 1/2004 | Feger |
| 6,679,328 B2 | 1/2004 | Davis et al. |
| 6,681,862 B2 | 1/2004 | Freeman |
| 6,684,947 B2 | 2/2004 | Cook et al. |
| 6,688,397 B2 | 2/2004 | McClurkin et al. |
| 6,695,012 B1 | 2/2004 | Ring et al. |
| 6,695,065 B2 | 2/2004 | Simpson et al. |
| 6,698,517 B2 | 3/2004 | Simpson |
| 6,701,598 B2 | 3/2004 | Chen et al. |
| 6,702,030 B2 | 3/2004 | Simpson |
| 6,705,395 B2 | 3/2004 | Cook et al. |
| 6,708,767 B2 | 3/2004 | Harrall et al. |
| 6,712,154 B2 | 3/2004 | Cook et al. |
| 6,712,401 B2 | 3/2004 | Coulon et al. |
| 6,719,064 B2 | 4/2004 | Price-Smith et al. |
| 6,722,427 B2 | 4/2004 | Gano et al. |
| 6,722,437 B2 | 4/2004 | Vercaemer et al. |
| 6,722,443 B1 | 4/2004 | Metcalfe |
| 6,725,917 B2 | 4/2004 | Metcalfe |
| 6,725,919 B2 | 4/2004 | Cook et al. |
| 6,725,934 B2 | 4/2004 | Coronado et al. |
| 6,725,939 B2 | 4/2004 | Richard |
| 6,732,806 B2 | 5/2004 | Mauldin et al. |
| 6,739,392 B2 | 5/2004 | Cook et al. |
| 6,745,845 B2 | 6/2004 | Cook et al. |
| 6,755,447 B2 | 6/2004 | Galle, Jr. et al. |
| 6,758,278 B2 | 7/2004 | Cook et al. |
| 6,772,841 B2 | 8/2004 | Gano |
| 6,796,380 B2 | 9/2004 | Xu |
| 6,814,147 B2 | 11/2004 | Baugh |
| 6,817,633 B2 | 11/2004 | Brill et al. |
| 6,820,690 B2 | 11/2004 | Vercaemer et al. |
| 6,823,937 B1 | 11/2004 | Cook et al. |
| 6,832,649 B2 | 12/2004 | Bode et al. |
| 6,834,725 B2 | 12/2004 | Whanger et al. |
| 6,843,322 B2 | 1/2005 | Burtner et al. |
| 6,857,473 B2 | 2/2005 | Cook et al. |
| 6,880,632 B2 | 4/2005 | Tom et al. |
| 6,892,819 B2 | 5/2005 | Cook et al. |
| 6,902,000 B2 | 6/2005 | Simpson et al. |
| 6,902,652 B2 | 6/2005 | Martin |
| 6,907,652 B1 | 6/2005 | Heijnen |
| 6,923,261 B2 | 8/2005 | Metcalfe et al. |
| 6,935,429 B2 | 8/2005 | Badrack |
| 6,935,430 B2 | 8/2005 | Harrell et al. |
| 6,966,370 B2 | 11/2005 | Cook et al. |
| 6,976,539 B2 | 12/2005 | Metcalfe et al. |
| 6,976,541 B2 | 12/2005 | Brisco et al. |
| 7,000,953 B2 | 2/2006 | Berghaus |
| 7,007,760 B2 | 3/2006 | Lohbeck |
| 7,021,390 B2 | 4/2006 | Cook et al. |
| 7,036,582 B2 | 5/2006 | Cook et al. |
| 7,044,221 B2 | 5/2006 | Cook et al. |
| 7,048,062 B2 | 5/2006 | Ring et al. |
| 7,066,284 B2 | 6/2006 | Wylie et al. |
| 7,077,211 B2 | 7/2006 | Cook et al. |
| 7,077,213 B2 | 7/2006 | Cook et al. |
| 7,086,475 B2 | 8/2006 | Cook |
| 7,100,685 B2 | 9/2006 | Cook et al. |
| 7,121,337 B2 | 10/2006 | Cook et al. |
| 7,121,352 B2 | 10/2006 | Cook et al. |
| 7,124,821 B2 | 10/2006 | Metcalfe et al. |
| 7,124,823 B2 | 10/2006 | Oosterling |
| 7,124,826 B2 | 10/2006 | Simpson |
| 2001/0002626 A1 | 6/2001 | Frank et al. |
| 2001/0020532 A1 | 9/2001 | Baugh et al. |
| 2001/0045284 A1 | 11/2001 | Simpson et al. |
| 2001/0045289 A1 | 11/2001 | Cook et al. |
| 2001/0047870 A1 | 12/2001 | Cook et al. |
| 2002/0011339 A1 | 1/2002 | Murray |
| 2002/0014339 A1 | 2/2002 | Ross |
| 2002/0020524 A1 | 2/2002 | Gano |
| 2002/0020531 A1 | 2/2002 | Ohmer |
| 2002/0033261 A1 | 3/2002 | Metcalfe |
| 2002/0060068 A1 | 5/2002 | Cook et al. |
| 2002/0062956 A1 | 5/2002 | Murray et al. |
| 2002/0066576 A1 | 6/2002 | Cook et al. |
| 2002/0066578 A1 | 6/2002 | Broome |
| 2002/0070023 A1 | 6/2002 | Turner et al. |
| 2002/0070031 A1 | 6/2002 | Voll et al. |
| 2002/0079101 A1 | 6/2002 | Baugh et al. |
| 2002/0084070 A1 | 7/2002 | Voll et al. |

| | | |
|---|---|---|
| 2002/0092654 A1 | 7/2002 | Coronado et al. |
| 2002/0108756 A1 | 8/2002 | Harrall et al. |
| 2002/0139540 A1 | 10/2002 | Lauritzen |
| 2002/0144822 A1 | 10/2002 | Hackworth et al. |
| 2002/0148612 A1 | 10/2002 | Cook et al. |
| 2002/0185274 A1 | 12/2002 | Simpson et al. |
| 2002/0189816 A1 | 12/2002 | Cook et al. |
| 2002/0195252 A1 | 12/2002 | Maguire et al. |
| 2002/0195256 A1 | 12/2002 | Metcalfe et al. |
| 2003/0024708 A1 | 2/2003 | Ring et al. |
| 2003/0024711 A1 | 2/2003 | Simpson et al. |
| 2003/0034177 A1 | 2/2003 | Chitwood et al. |
| 2003/0042022 A1 | 3/2003 | Lauritzen et al. |
| 2003/0047322 A1 | 3/2003 | Maguire et al. |
| 2003/0047323 A1 | 3/2003 | Jackson et al. |
| 2003/0056991 A1 | 3/2003 | Hahn et al. |
| 2003/0066655 A1 | 4/2003 | Cook et al. |
| 2003/0067166 A1 | 4/2003 | Maguire |
| 2003/0075337 A1 | 4/2003 | Sivley, IV |
| 2003/0075338 A1 | 4/2003 | Sivley, IV |
| 2003/0075339 A1 | 4/2003 | Gano et al. |
| 2003/0094277 A1 | 5/2003 | Cook et al. |
| 2003/0094278 A1 | 5/2003 | Cook et al. |
| 2003/0094279 A1 | 5/2003 | Ring et al. |
| 2003/0098154 A1 | 5/2003 | Cook et al. |
| 2003/0098162 A1 | 5/2003 | Cook |
| 2003/0107217 A1 | 6/2003 | Daigle et al. |
| 2003/0111234 A1 | 6/2003 | McClurkin et al. |
| 2003/0116318 A1 | 6/2003 | Metcalfe |
| 2003/0116325 A1 | 6/2003 | Cook et al. |
| 2003/0121558 A1 | 7/2003 | Cook et al. |
| 2003/0121655 A1 | 7/2003 | Lauritzen et al. |
| 2003/0121669 A1 | 7/2003 | Cook et al. |
| 2003/0140673 A1 | 7/2003 | Marr et al. |
| 2003/0150608 A1 | 8/2003 | Smith, Jr. et al. |
| 2003/0168222 A1 | 9/2003 | Maguire et al. |
| 2003/0173090 A1 | 9/2003 | Cook et al. |
| 2003/0192705 A1 | 10/2003 | Cook et al. |
| 2003/0221841 A1 | 12/2003 | Burtner et al. |
| 2003/0222455 A1 | 12/2003 | Cook et al. |
| 2004/0011534 A1 | 1/2004 | Simonds et al. |
| 2004/0045616 A1 | 3/2004 | Cook et al. |
| 2004/0045718 A1 | 3/2004 | Brisco et al. |
| 2004/0060706 A1 | 4/2004 | Stephenson |
| 2004/0065446 A1 | 4/2004 | Tran et al. |
| 2004/0069499 A1 | 4/2004 | Cook et al. |
| 2004/0112589 A1 | 6/2004 | Cook et al. |
| 2004/0112606 A1 | 6/2004 | Lewis et al. |
| 2004/0118574 A1 | 6/2004 | Cook et al. |
| 2004/0123983 A1 | 7/2004 | Cook et al. |
| 2004/0123988 A1 | 7/2004 | Cook et al. |
| 2004/0129431 A1 | 7/2004 | Jackson |
| 2004/0159446 A1 | 8/2004 | Haugen et al. |
| 2004/0188099 A1 | 9/2004 | Cook et al. |
| 2004/0216873 A1 | 11/2004 | Frost, Jr. et al. |
| 2004/0221996 A1 | 11/2004 | Burge |
| 2004/0231839 A1 | 11/2004 | Ellington et al. |
| 2004/0231855 A1 | 11/2004 | Cook et al. |
| 2004/0238181 A1 | 12/2004 | Cook et al. |
| 2004/0244968 A1 | 12/2004 | Cook et al. |
| 2004/0262014 A1 | 12/2004 | Cook et al. |
| 2005/0011641 A1 | 1/2005 | Cook et al. |
| 2005/0015963 A1 | 1/2005 | Costa et al. |
| 2005/0028988 A1 | 2/2005 | Cook et al. |
| 2005/0039910 A1 | 2/2005 | Lohbeck |
| 2005/0039928 A1 | 2/2005 | Cook et al. |
| 2005/0045324 A1 | 3/2005 | Cook et al. |
| 2005/0045341 A1 | 3/2005 | Cook et al. |
| 2005/0045342 A1 | 3/2005 | Luke et al. |
| 2005/0056433 A1 | 3/2005 | Watson et al. |
| 2005/0056434 A1 | 3/2005 | Ring et al. |
| 2005/0077051 A1 | 4/2005 | Cook et al. |
| 2005/0081358 A1 | 4/2005 | Cook et al. |
| 2005/0087337 A1 | 4/2005 | Brisco et al. |
| 2005/0098323 A1 | 5/2005 | Cook et al. |
| 2005/0103502 A1 | 5/2005 | Watson et al. |
| 2005/0123639 A1 | 6/2005 | Ring et al. |
| 2005/0133225 A1 | 6/2005 | Oosterling |
| 2005/0138790 A1 | 6/2005 | Cook et al. |
| 2005/0144771 A1 | 7/2005 | Cook et al. |
| 2005/0144772 A1 | 7/2005 | Cook et al. |
| 2005/0144777 A1 | 7/2005 | Cook et al. |
| 2005/0150098 A1 | 7/2005 | Cook et al. |
| 2005/0150660 A1 | 7/2005 | Cook et al. |
| 2005/0161228 A1 | 7/2005 | Cook et al. |
| 2005/0166387 A1 | 8/2005 | Cook et al. |
| 2005/0166388 A1 | 8/2005 | Cook et al. |
| 2005/0173108 A1 | 8/2005 | Cook et al. |
| 2005/0175473 A1 | 8/2005 | Cook et al. |
| 2005/0183863 A1 | 8/2005 | Cook et al. |
| 2005/0205253 A1 | 9/2005 | Cook et al. |
| 2005/0217768 A1 | 10/2005 | Asahi et al. |
| 2005/0217865 A1 | 10/2005 | Ring et al. |
| 2005/0217866 A1 | 10/2005 | Watson et al. |
| 2005/0223535 A1 | 10/2005 | Cook et al. |
| 2005/0224225 A1 | 10/2005 | Cook et al. |
| 2005/0230102 A1 | 10/2005 | Cook et al. |
| 2005/0230103 A1 | 10/2005 | Cook et al. |
| 2005/0230104 A1 | 10/2005 | Cook et al. |
| 2005/0230123 A1 | 10/2005 | Cook et al. |
| 2005/0236159 A1 | 10/2005 | Cook et al. |
| 2005/0236163 A1 | 10/2005 | Cook et al. |
| 2005/0244578 A1 | 11/2005 | Van Egmond et al. |
| 2005/0246883 A1 | 11/2005 | Alliot et al. |
| 2005/0247453 A1 | 11/2005 | Shuster et al. |
| 2005/0265788 A1 | 12/2005 | Renkema |
| 2005/0269107 A1 | 12/2005 | Cook et al. |
| 2006/0027371 A1 | 2/2006 | Gorrara |
| 2006/0032640 A1 | 2/2006 | Costa et al. |
| 2006/0048948 A1 | 3/2006 | Noel |
| 2006/0054330 A1 | 3/2006 | Metcalfe et al. |
| 2006/0065403 A1 | 3/2006 | Watson et al. |
| 2006/0065406 A1 | 3/2006 | Shuster et al. |
| 2006/0096762 A1 | 5/2006 | Brisco |
| 2006/0102360 A1 | 5/2006 | Brisco et al. |
| 2006/0112768 A1 | 6/2006 | Shuster et al. |
| 2006/0113086 A1 | 6/2006 | Costa et al. |
| 2006/0266527 A1 | 11/2006 | Brisco et al. |
| 2006/0272826 A1 | 12/2006 | Shuster et al. |

FOREIGN PATENT DOCUMENTS

| | | |
|---|---|---|
| AU | 770008 | 7/2004 |
| AU | 770359 | 7/2004 |
| AU | 771884 | 8/2004 |
| AU | 776580 | 1/2005 |
| AU | 780123 | 3/2005 |
| AU | 2001269810 | 8/2005 |
| AU | 782901 | 9/2005 |
| AU | 783245 | 10/2005 |
| AU | 2001294802 | 10/2005 |
| AU | 2001283026 | 7/2006 |
| AU | 2002239857 | 8/2006 |
| AU | 2001292695 | 10/2006 |
| CA | 736288 | 6/1966 |
| CA | 771462 | 11/1967 |
| CA | 1171310 | 7/1984 |
| CA | 2292171 | 6/2000 |
| CA | 2298139 | 8/2000 |
| CA | 2234386 | 3/2003 |
| CA | 2414449 | 9/2006 |
| CA | 2289811 | 1/2007 |
| DE | 174521 | 4/1953 |
| DE | 2458188 | 6/1975 |
| DE | 203767 | 11/1983 |
| DE | 233607 A1 | 3/1986 |

| | | | | | | |
|---|---|---|---|---|---|---|
| DE | 278517 A1 | 5/1990 | | GB | 2361724 | 10/2001 |
| EP | 0084940 A1 | 8/1983 | | GB | 2365898 A | 2/2002 |
| EP | 0272511 | 12/1987 | | GB | 2359037 B | 4/2002 |
| EP | 0294264 | 5/1988 | | GB | 2359837 B | 4/2002 |
| EP | 0553566 A1 | 12/1992 | | GB | 2370301 A | 6/2002 |
| EP | 0633391 A2 | 1/1995 | | GB | 2371064 A | 7/2002 |
| EP | 0713953 B1 | 11/1995 | | GB | 2371574 A | 7/2002 |
| EP | 0823534 | 2/1998 | | GB | 2373524 | 9/2002 |
| EP | 0881354 | 12/1998 | | GB | 2367842 A | 10/2002 |
| EP | 0881359 | 12/1998 | | GB | 2374098 A | 10/2002 |
| EP | 0899420 | 3/1999 | | GB | 2374622 A | 10/2002 |
| EP | 0937861 | 8/1999 | | GB | 2375560 A | 11/2002 |
| EP | 0952305 | 10/1999 | | GB | 2380213 A | 4/2003 |
| EP | 0952306 | 10/1999 | | GB | 2380503 A | 4/2003 |
| EP | 1141515 A | 10/2001 | | GB | 2381019 A | 4/2003 |
| EP | 1152120 A2 | 11/2001 | | GB | 2343691 B | 5/2003 |
| EP | 1152120 A3 | 11/2001 | | GB | 2382364 A | 5/2003 |
| EP | 1152120 A3 | 11/2001 | | GB | 2382828 A | 6/2003 |
| EP | 1235972 A | 9/2002 | | GB | 2344606 B | 8/2003 |
| EP | 1555386 | 7/2005 | | GB | 2347950 B | 8/2003 |
| FR | 2771133 A | 10/1934 | | GB | 2380213 B | 8/2003 |
| FR | 1325596 | 6/1962 | | GB | 2380214 B | 8/2003 |
| FR | 2583398 A1 | 12/1986 | | GB | 2380215 B | 8/2003 |
| FR | 2717855 A1 | 9/1995 | | GB | 2348223 B | 9/2003 |
| FR | 2741907 A1 | 6/1997 | | GB | 2347952 B | 10/2003 |
| FR | 2771133 A | 5/1999 | | GB | 2348657 B | 10/2003 |
| FR | 2780751 | 1/2000 | | GB | 2384800 B | 10/2003 |
| FR | 2841626 A1 | 1/2004 | | GB | 2384801 B | 10/2003 |
| GB | 557823 | 12/1943 | | GB | 2384802 B | 10/2003 |
| GB | 788150 | 12/1957 | | GB | 2384803 B | 10/2003 |
| GB | 851096 | 10/1960 | | GB | 2384804 B | 10/2003 |
| GB | 1008383 | 7/1962 | | GB | 2384805 B | 10/2003 |
| GB | 961750 | 6/1964 | | GB | 2384806 B | 10/2003 |
| GB | 1000383 | 10/1965 | | GB | 2384807 B | 10/2003 |
| GB | 1062610 | 3/1967 | | GB | 2384808 B | 10/2003 |
| GB | 1111536 | 5/1968 | | GB | 2385353 B | 10/2003 |
| GB | 1448304 | 9/1976 | | GB | 2385354 B | 10/2003 |
| GB | 1460864 | 1/1977 | | GB | 2385355 B | 10/2003 |
| GB | 1542847 | 3/1979 | | GB | 2385356 B | 10/2003 |
| GB | 1563740 | 3/1980 | | GB | 2385357 B | 10/2003 |
| GB | 2058877 A | 4/1981 | | GB | 2385358 B | 10/2003 |
| GB | 2108228 A | 5/1983 | | GB | 2385359 B | 10/2003 |
| GB | 2115860 A | 9/1983 | | GB | 2385360 B | 10/2003 |
| GB | 2125876 A | 3/1984 | | GB | 2385361 B | 10/2003 |
| GB | 2211573 A | 7/1989 | | GB | 2385362 B | 10/2003 |
| GB | 2216926 A | 10/1989 | | GB | 2385363 B | 10/2003 |
| GB | 2243191 A | 10/1991 | | GB | 2385619 B | 10/2003 |
| GB | 2256910 A | 12/1992 | | GB | 2385620 B | 10/2003 |
| GB | 2257184 A | 6/1993 | | GB | 2385621 B | 10/2003 |
| GB | 2305682 A | 4/1997 | | GB | 2385622 B | 10/2003 |
| GB | 2325949 A | 5/1998 | | GB | 2385623 B | 10/2003 |
| GB | 2322655 A | 9/1998 | | GB | 2387405 A | 10/2003 |
| GB | 2326896 A | 1/1999 | | GB | 2387861 A | 10/2003 |
| GB | 2329916 A | 4/1999 | | GB | 2388134 A | 11/2003 |
| GB | 2329918 A | 4/1999 | | GB | 2388860 A | 11/2003 |
| GB | 2331103 A | 5/1999 | | GB | 2355738 B | 12/2003 |
| GB | 2336383 A | 10/1999 | | GB | 2374622 B | 12/2003 |
| GB | 2355738 A | 4/2000 | | GB | 2388391 B | 12/2003 |
| GB | 2343691 A | 5/2000 | | GB | 2388392 B | 12/2003 |
| GB | 2344606 A | 6/2000 | | GB | 2388393 B | 12/2003 |
| GB | 2345308 A | 7/2000 | | GB | 2388394 B | 12/2003 |
| GB | 2368865 A | 7/2000 | | GB | 2388395 B | 12/2003 |
| GB | 2346165 A | 8/2000 | | GB | 2356651 B | 2/2004 |
| GB | 2346632 A | 8/2000 | | GB | 2368865 B | 2/2004 |
| GB | 2347445 A | 9/2000 | | GB | 2388860 B | 2/2004 |
| GB | 2347446 A | 9/2000 | | GB | 2388861 B | 2/2004 |
| GB | 2347950 A | 9/2000 | | GB | 2388862 B | 2/2004 |
| GB | 2347952 A | 9/2000 | | GB | 2391886 A | 2/2004 |
| GB | 2348223 A | 9/2000 | | GB | 2390628 B | 3/2004 |
| GB | 2348657 A | 10/2000 | | GB | 2391033 B | 3/2004 |
| GB | 2357099 A | 12/2000 | | GB | 2392686 A | 3/2004 |
| GB | 2356651 A | 5/2001 | | GB | 2393199 A | 3/2004 |
| GB | 2350137 B | 8/2001 | | GB | 2373524 B | 4/2004 |

| | | | | | | | |
|---|---|---|---|---|---|---|---|
| GB | 2390387 | B | 4/2004 | GB | 2403971 | A | 1/2005 |
| GB | 2392686 | B | 4/2004 | GB | 2403972 | A | 1/2005 |
| GB | 2392691 | B | 4/2004 | GB | 2400624 | B | 2/2005 |
| GB | 2391575 | B | 5/2004 | GB | 2404402 | A | 2/2005 |
| GB | 2394979 | A | 5/2004 | GB | 2404676 | A | 2/2005 |
| GB | 2395506 | A | 5/2004 | GB | 2404680 | A | 2/2005 |
| GB | 2392932 | B | 6/2004 | GB | 2384807 | C | 3/2005 |
| GB | 2395734 | A | 6/2004 | GB | 2388134 | B | 3/2005 |
| GB | 2396635 | A | 6/2004 | GB | 2398320 | B | 3/2005 |
| GB | 2396639 | A | 6/2004 | GB | 2398323 | B | 3/2005 |
| GB | 2396640 | A | 6/2004 | GB | 2399120 | B | 3/2005 |
| GB | 2396641 | A | 6/2004 | GB | 2399848 | B | 3/2005 |
| GB | 2396642 | A | 6/2004 | GB | 2399849 | B | 3/2005 |
| GB | 2396643 | A | 6/2004 | GB | 2405893 | A | 3/2005 |
| GB | 2396644 | A | 6/2004 | GB | 2406117 | A | 3/2005 |
| GB | 2396646 | A | 6/2004 | GB | 2406118 | A | 3/2005 |
| GB | 2373468 | B | 7/2004 | GB | 2406119 | A | 3/2005 |
| GB | 2397261 | A | 7/2004 | GB | 2406120 | A | 3/2005 |
| GB | 2397262 | A | 7/2004 | GB | 2406125 | A | 3/2005 |
| GB | 2397263 | A | 7/2004 | GB | 2406126 | A | 3/2005 |
| GB | 2397264 | A | 7/2004 | GB | 2410518 | A | 3/2005 |
| GB | 2397265 | A | 7/2004 | GB | 2406599 | A | 4/2005 |
| GB | 2390622 | B | 8/2004 | GB | 2399119 | B | 5/2005 |
| GB | 2398087 | A | 8/2004 | GB | 2399580 | B | 5/2005 |
| GB | 2398317 | A | 8/2004 | GB | 2401630 | B | 5/2005 |
| GB | 2398318 | A | 8/2004 | GB | 2401631 | B | 5/2005 |
| GB | 2398319 | A | 8/2004 | GB | 2401632 | B | 5/2005 |
| GB | 2398320 | A | 8/2004 | GB | 2401633 | B | 5/2005 |
| GB | 2398321 | A | 8/2004 | GB | 2401634 | B | 5/2005 |
| GB | 2398322 | A | 8/2004 | GB | 2401635 | B | 5/2005 |
| GB | 2398323 | A | 8/2004 | GB | 2401636 | B | 5/2005 |
| GB | 2398326 | A | 8/2004 | GB | 2401637 | B | 5/2005 |
| GB | 2382367 | B | 9/2004 | GB | 2401638 | B | 5/2005 |
| GB | 2396641 | B | 9/2004 | GB | 2401639 | B | 5/2005 |
| GB | 2396643 | B | 9/2004 | GB | 2408277 | A | 5/2005 |
| GB | 2397261 | B | 9/2004 | GB | 2408278 | A | 5/2005 |
| GB | 2397262 | B | 9/2004 | GB | 2399579 | B | 6/2005 |
| GB | 2397263 | B | 9/2004 | GB | 2409216 | A | 6/2005 |
| GB | 2397264 | B | 9/2004 | GB | 2409218 | A | 6/2005 |
| GB | 2397265 | B | 9/2004 | GB | 2401893 | B | 7/2005 |
| GB | 2399120 | A | 9/2004 | GB | 2414749 | A | 7/2005 |
| GB | 2399579 | A | 9/2004 | GB | 2414750 | A | 7/2005 |
| GB | 2399580 | A | 9/2004 | GB | 2414751 | A | 7/2005 |
| GB | 2399848 | A | 9/2004 | GB | 2398326 | B | 8/2005 |
| GB | 2399849 | A | 9/2004 | GB | 2403970 | B | 8/2005 |
| GB | 2399850 | A | 9/2004 | GB | 2403971 | B | 8/2005 |
| GB | 2384502 | B | 10/2004 | GB | 2403972 | B | 8/2005 |
| GB | 2396644 | B | 10/2004 | GB | 2380503 | B | 10/2005 |
| GB | 2400126 | A | 10/2004 | GB | 2382828 | B | 10/2005 |
| GB | 2400393 | A | 10/2004 | GB | 2398317 | B | 10/2005 |
| GB | 2400624 | A | 10/2004 | GB | 2398318 | B | 10/2005 |
| GB | 2396640 | B | 11/2004 | GB | 2398319 | B | 10/2005 |
| GB | 2396642 | B | 11/2004 | GB | 2398321 | B | 10/2005 |
| GB | 2401136 | A | 11/2004 | GB | 2398322 | B | 10/2005 |
| GB | 2401137 | A | 11/2004 | GB | 2412681 | A | 10/2005 |
| GB | 2401138 | A | 11/2004 | GB | 2412682 | A | 10/2005 |
| GB | 2401630 | A | 11/2004 | GB | 2413136 | A | 10/2005 |
| GB | 2401631 | A | 11/2004 | GB | 2414493 | A | 11/2005 |
| GB | 2401632 | A | 11/2004 | GB | 2409217 | B | 12/2005 |
| GB | 2401633 | A | 11/2004 | GB | 2410518 | B | 12/2005 |
| GB | 2401634 | A | 11/2004 | GB | 2415003 | A | 12/2005 |
| GB | 2401635 | A | 11/2004 | GB | 2415219 | A | 12/2005 |
| GB | 2401636 | A | 11/2004 | GB | 2395506 | B | 1/2006 |
| GB | 2401637 | A | 11/2004 | GB | 2412681 | B | 1/2006 |
| GB | 2401638 | A | 11/2004 | GB | 2412682 | B | 1/2006 |
| GB | 2401639 | A | 11/2004 | GB | 2415979 | A | 1/2006 |
| GB | 2381019 | B | 12/2004 | GB | 2415983 | A | 1/2006 |
| GB | 2382368 | B | 12/2004 | GB | 2415987 | A | 1/2006 |
| GB | 2394979 | B | 12/2004 | GB | 2415988 | A | 1/2006 |
| GB | 2401136 | B | 12/2004 | GB | 2416177 | A | 1/2006 |
| GB | 2401137 | B | 12/2004 | GB | 2416361 | A | 1/2006 |
| GB | 2401138 | B | 12/2004 | GB | 2416556 | A | 2/2006 |
| GB | 2403970 | A | 1/2005 | GB | 2416794 | A | 2/2006 |

| | | | | | | |
|---|---|---|---|---|---|---|
| GB | 2416795 A | 2/2006 | | SU | 976019 | 11/1982 |
| GB | 2417273 A | 2/2006 | | SU | 976020 | 11/1982 |
| GB | 2417275 A | 2/2006 | | SU | 989038 | 1/1983 |
| GB | 2418216 A | 3/2006 | | SU | 1002514 | 3/1983 |
| GB | 2418217 A | 3/2006 | | SU | 1041671 A | 9/1983 |
| GB | 2418690 A | 4/2006 | | SU | 1051222 A | 10/1983 |
| GB | 2418941 A | 4/2006 | | SU | 1086118 A | 4/1984 |
| GB | 2418942 A | 4/2006 | | SU | 1077803 A | 7/1984 |
| GB | 2418943 A | 4/2006 | | SU | 1158400 A | 5/1985 |
| GB | 2418944 A | 4/2006 | | SU | 1212575 A | 2/1986 |
| GB | 2419907 A | 5/2006 | | SU | 1250637 A1 | 8/1986 |
| GB | 2419913 A | 5/2006 | | SU | 1324722 A1 | 7/1987 |
| GB | 2400126 B | 6/2006 | | SU | 1411434 | 7/1988 |
| GB | 2414749 B | 6/2006 | | SU | 1430498 A1 | 10/1988 |
| GB | 2420810 A | 6/2006 | | SU | 1432190 A1 | 10/1988 |
| GB | 2421257 A | 6/2006 | | SU | 1601330 A1 | 10/1990 |
| GB | 2421258 A | 6/2006 | | SU | 1627663 A2 | 2/1991 |
| GB | 2421259 A | 6/2006 | | SU | 1659621 A1 | 6/1991 |
| GB | 2421262 A | 6/2006 | | SU | 1663179 A2 | 7/1991 |
| GB | 2421529 A | 6/2006 | | SU | 1663180 A1 | 7/1991 |
| GB | 2422164 A | 7/2006 | | SU | 1677225 A1 | 9/1991 |
| GB | 2406599 B | 8/2006 | | SU | 1677248 A1 | 9/1991 |
| GB | 2418690 B | 8/2006 | | SU | 1686123 A1 | 10/1991 |
| GB | 2421257 B | 8/2006 | | SU | 1686124 A1 | 10/1991 |
| GB | 2421258 B | 8/2006 | | SU | 1686125 A1 | 10/1991 |
| GB | 2422859 A | 8/2006 | | SU | 1698413 A1 | 12/1991 |
| GB | 2422860 A | 8/2006 | | SU | 1710694 A | 2/1992 |
| GB | 2423317 | 8/2006 | | SU | 1730429 A1 | 4/1992 |
| GB | 2404676 B | 9/2006 | | SU | 1745873 A1 | 7/1992 |
| GB | 2414493 B | 9/2006 | | SU | 1747673 A1 | 7/1992 |
| GB | 2424077 A | 9/2006 | | SU | 1749267 A1 | 7/1992 |
| JP | 208458 | 10/1985 | | SU | 1295799 A1 | 2/1995 |
| JP | 6475715 | 3/1989 | | WO | WO81/00132 | 1/1981 |
| JP | 102875 | 4/1995 | | WO | WO90/05598 | 3/1990 |
| JP | 11-169975 | 6/1999 | | WO | WO92/01859 | 2/1992 |
| JP | 94068 A | 4/2000 | | WO | WO92/08875 | 5/1992 |
| JP | 107870 A | 4/2000 | | WO | WO93/25799 | 12/1993 |
| JP | 162192 | 6/2000 | | WO | WO93/25800 | 12/1993 |
| JP | 2001-47161 | 2/2001 | | WO | WO94/21887 | 9/1994 |
| NL | 9001081 | 12/1991 | | WO | WO94/25655 | 11/1994 |
| RO | 113267 B1 | 5/1998 | | WO | WO95/03476 | 2/1995 |
| RU | 1786241 A1 | 1/1993 | | WO | WO96/01937 | 1/1996 |
| RU | 1804543 A3 | 3/1993 | | WO | WO96/21083 | 7/1996 |
| RU | 1810482 A1 | 4/1993 | | WO | WO96/26350 | 8/1996 |
| RU | 1818459 A1 | 5/1993 | | WO | WO96/37681 | 11/1996 |
| RU | 2016345 C1 | 7/1994 | | WO | WO97/06346 | 2/1997 |
| RU | 2039214 C1 | 7/1995 | | WO | WO97/11306 | 3/1997 |
| RU | 2056201 C1 | 3/1996 | | WO | WO97/17524 | 5/1997 |
| RU | 2064357 C1 | 7/1996 | | WO | WO97/17526 | 5/1997 |
| RU | 2068940 C1 | 11/1996 | | WO | WO97/17527 | 5/1997 |
| RU | 2068943 C1 | 11/1996 | | WO | WO97/20130 | 6/1997 |
| RU | 2079633 C1 | 5/1997 | | WO | WO97/21901 | 6/1997 |
| RU | 2083798 C1 | 7/1997 | | WO | WO97/35084 | 9/1997 |
| RU | 2091655 C1 | 9/1997 | | WO | WO98/00626 | 1/1998 |
| RU | 2095179 C1 | 11/1997 | | WO | WO98/07957 | 2/1998 |
| RU | 2105128 C1 | 2/1998 | | WO | WO98/09053 | 3/1998 |
| RU | 2108445 C1 | 4/1998 | | WO | WO98/22690 | 5/1998 |
| RU | 2144128 C1 | 1/2000 | | WO | WO98/26152 | 6/1998 |
| SU | 350833 | 9/1972 | | WO | WO98/42947 | 10/1998 |
| SU | 511468 | 9/1976 | | WO | WO98/49423 | 11/1998 |
| SU | 607950 | 5/1978 | | WO | WO99/02818 | 1/1999 |
| SU | 612004 | 5/1978 | | WO | WO99/04135 | 1/1999 |
| SU | 620582 | 7/1978 | | WO | WO99/06670 | 2/1999 |
| SU | 641070 | 1/1979 | | WO | WO99/08827 | 2/1999 |
| SU | 909114 | 5/1979 | | WO | WO99/08828 | 2/1999 |
| SU | 832049 | 5/1981 | | WO | WO99/18328 | 4/1999 |
| SU | 853089 | 8/1981 | | WO | WO99/23354 | 5/1999 |
| SU | 874952 | 10/1981 | | WO | WO99/25524 | 5/1999 |
| SU | 894169 | 1/1982 | | WO | WO99/25951 | 5/1999 |
| SU | 899850 | 1/1982 | | WO | WO99/35368 | 7/1999 |
| SU | 907220 | 2/1982 | | WO | WO99/43923 | 9/1999 |
| SU | 953172 | 8/1982 | | WO | WO00/01926 | 1/2000 |
| SU | 959878 | 9/1982 | | WO | WO00/04271 | 1/2000 |

| | | | | | | |
|---|---|---|---|---|---|---|
| WO | WO00/08301 | 2/2000 | | WO | WO03/058022 A3 | 7/2003 |
| WO | WO00/26500 | 5/2000 | | WO | WO03/059549 A1 | 7/2003 |
| WO | WO00/26501 | 5/2000 | | WO | WO03/064813 A1 | 8/2003 |
| WO | WO00/26502 | 5/2000 | | WO | WO03/069115 A3 | 8/2003 |
| WO | WO00/31375 | 6/2000 | | WO | WO03/071086 A2 | 8/2003 |
| WO | WO00/37766 | 6/2000 | | WO | WO03/071086 A3 | 8/2003 |
| WO | WO00/37767 | 6/2000 | | WO | WO03/078785 A2 | 9/2003 |
| WO | WO00/37768 | 6/2000 | | WO | WO03/078785 A3 | 9/2003 |
| WO | WO00/37771 | 6/2000 | | WO | WO03/086675 A2 | 9/2003 |
| WO | WO00/37772 | 6/2000 | | WO | WO03/086675 A2 | 10/2003 |
| WO | WO00/39432 | 7/2000 | | WO | WO03/086675 A3 | 10/2003 |
| WO | WO00/46484 | 8/2000 | | WO | WO03/089161 A2 | 10/2003 |
| WO | WO00/50727 | 8/2000 | | WO | WO03/089161 A3 | 10/2003 |
| WO | WO00/50732 | 8/2000 | | WO | WO03/093623 A2 | 11/2003 |
| WO | WO00/50733 | 8/2000 | | WO | WO03/093623 A3 | 11/2003 |
| WO | WO00/77431 A2 | 12/2000 | | WO | WO03/102365 A1 | 12/2003 |
| WO | WO01/04520 A1 | 1/2001 | | WO | WO03/104601 A2 | 12/2003 |
| WO | WO01/04535 A1 | 1/2001 | | WO | WO03/104601 A3 | 12/2003 |
| WO | WO01/18354 A1 | 3/2001 | | WO | WO03/106130 A2 | 12/2003 |
| WO | WO01/21929 A1 | 3/2001 | | WO | WO03/106130 A3 | 12/2003 |
| WO | WO01/26860 A1 | 4/2001 | | WO | WO2004/003337 A1 | 1/2004 |
| WO | WO01/33037 A1 | 5/2001 | | WO | WO2004/009950 A1 | 1/2004 |
| WO | WO01/38693 A1 | 5/2001 | | WO | WO2004/010039 A2 | 1/2004 |
| WO | WO01/60545 A1 | 8/2001 | | WO | WO2004/010039 A3 | 1/2004 |
| WO | WO01/83943 A1 | 11/2001 | | WO | WO2004/011776 A2 | 2/2004 |
| WO | WO01/98623 A1 | 12/2001 | | WO | WO2004/011776 A3 | 2/2004 |
| WO | WO02/01102 A1 | 1/2002 | | WO | WO2004/018823 A2 | 3/2004 |
| WO | WO02/10550 A1 | 2/2002 | | WO | WO2004/018823 A3 | 3/2004 |
| WO | WO02/10551 A1 | 2/2002 | | WO | WO2004/018824 A2 | 3/2004 |
| WO | WO 02/20941 A1 | 3/2002 | | WO | WO2004/018824 A3 | 3/2004 |
| WO | WO02/23007 A1 | 3/2002 | | WO | WO2004/020895 A2 | 3/2004 |
| WO | WO02/25059 A1 | 3/2002 | | WO | WO2004/020895 A3 | 3/2004 |
| WO | WO02/29199 A1 | 4/2002 | | WO | WO2004/023014 A2 | 3/2004 |
| WO | WO02/40825 A1 | 5/2002 | | WO | WO2004/023014 A3 | 3/2004 |
| WO | WO02/053867 A2 | 7/2002 | | WO | WO2004/026017 A2 | 4/2004 |
| WO | WO02/053867 A3 | 7/2002 | | WO | WO2004/026017 A3 | 4/2004 |
| WO | WO02/059456 A1 | 8/2002 | | WO | WO2004/026073 A2 | 4/2004 |
| WO | WO02/066783 A1 | 8/2002 | | WO | WO2004/026073 A3 | 4/2004 |
| WO | WO02/068792 A1 | 9/2002 | | WO | WO2004/026500 A2 | 4/2004 |
| WO | WO02/073000 A1 | 9/2002 | | WO | WO2004/026500 A3 | 4/2004 |
| WO | WO02/075107 A1 | 9/2002 | | WO | WO2004/027200 A2 | 4/2004 |
| WO | WO02/077411 A1 | 10/2002 | | WO | WO2004/027200 A3 | 4/2004 |
| WO | WO02/081863 A1 | 10/2002 | | WO | WO2004/027204 A2 | 4/2004 |
| WO | WO02/081864 A2 | 10/2002 | | WO | WO2004/027204 A3 | 4/2004 |
| WO | WO02/086285 A1 | 10/2002 | | WO | WO2004/027205 A2 | 4/2004 |
| WO | WO02/086286 A2 | 10/2002 | | WO | WO2004/027205 A3 | 4/2004 |
| WO | WO02/090713 | 11/2002 | | WO | WO2004/027392 A1 | 4/2004 |
| WO | WO02/095181 A1 | 11/2002 | | WO | WO2004/027786 A2 | 4/2004 |
| WO | WO02/103150 A2 | 12/2002 | | WO | WO2004/027786 A3 | 4/2004 |
| WO | WO03/004819 A2 | 1/2003 | | WO | WO2004/053434 A2 | 6/2004 |
| WO | WO03/004819 A3 | 1/2003 | | WO | WO2004/053434 A3 | 6/2004 |
| WO | WO03/004820 A2 | 1/2003 | | WO | WO2004/057715 A2 | 7/2004 |
| WO | WO03/004820 A3 | 1/2003 | | WO | WO2004/057715 A3 | 7/2004 |
| WO | WO03/008756 A1 | 1/2003 | | WO | WO2004/067961 A2 | 8/2004 |
| WO | WO03/012255 A1 | 2/2003 | | WO | WO2004/067961 A3 | 8/2004 |
| WO | WO03/016669 A2 | 2/2003 | | WO | WO2004/072436 A1 | 8/2004 |
| WO | WO03/016669 A3 | 2/2003 | | WO | WO2004/074622 A2 | 9/2004 |
| WO | WO03/023178 A2 | 3/2003 | | WO | WO2004/074622 A3 | 9/2004 |
| WO | WO03/023178 A3 | 3/2003 | | WO | WO2004/076798 A2 | 9/2004 |
| WO | WO03/023179 A2 | 3/2003 | | WO | WO2004/076798 A3 | 9/2004 |
| WO | WO03/023179 A3 | 3/2003 | | WO | WO2004/081346 A2 | 9/2004 |
| WO | WO03/029607 A1 | 4/2003 | | WO | WO2004/083591 A2 | 9/2004 |
| WO | WO03/029608 A1 | 4/2003 | | WO | WO2004/083591 A3 | 9/2004 |
| WO | WO03/036018 A2 | 5/2003 | | WO | WO2004/083592 A2 | 9/2004 |
| WO | WO03/042486 A2 | 5/2003 | | WO | WO2004/083592 A3 | 9/2004 |
| WO | WO03/042486 A3 | 5/2003 | | WO | WO2004/083593 A2 | 9/2004 |
| WO | WO03/042487 A2 | 5/2003 | | WO | WO2004/083594 A2 | 9/2004 |
| WO | WO03/042487 A3 | 5/2003 | | WO | WO2004/083594 A3 | 9/2004 |
| WO | WO03/042489 A2 | 5/2003 | | WO | WO2004/085790 A2 | 10/2004 |
| WO | WO03/048520 A1 | 6/2003 | | WO | WO2004/089608 A2 | 10/2004 |
| WO | WO03/048521 A2 | 6/2003 | | WO | WO2004/092527 A2 | 10/2004 |
| WO | WO03/055616 A2 | 7/2003 | | WO | WO2004/092528 A2 | 10/2004 |
| WO | WO03/058022 A2 | 7/2003 | | WO | WO2004/092528 A3 | 10/2004 |

| | | | |
|---|---|---|---|
| WO | WO2004/092530 A2 | 10/2004 |
| WO | WO2004/092530 A3 | 10/2004 |
| WO | WO2004/094766 A2 | 11/2004 |
| WO | WO2004/094766 A3 | 11/2004 |
| WO | WO2005/017303 A2 | 2/2005 |
| WO | WO2005/021921 A2 | 3/2005 |
| WO | WO2005/021921 A3 | 3/2005 |
| WO | WO2005/021922 A2 | 3/2005 |
| WO | WO2005/021922 A3 | 3/2005 |
| WO | WO2005/024170 A2 | 3/2005 |
| WO | WO2005/024170 A3 | 3/2005 |
| WO | WO2005/024171 A2 | 3/2005 |
| WO | WO2005/028803 A2 | 3/2005 |
| WO | WO2005/071212 A1 | 4/2005 |
| WO | WO2005/079186 A2 | 9/2005 |
| WO | WO2005/079186 A3 | 9/2005 |
| WO | WO2005/081803 A2 | 9/2005 |
| WO | WO2005/086614 A2 | 9/2005 |
| WO | WO2006/014333 A2 | 2/2006 |
| WO | WO2006/020723 A2 | 2/2006 |
| WO | WO2006/020726 A2 | 2/2006 |
| WO | WO2006/020734 A2 | 2/2006 |
| WO | WO2006/020809 A2 | 2/2006 |
| WO | WO2006/020810 A2 | 2/2006 |
| WO | WO2006/020810 A3 | 2/2006 |
| WO | WO2006/020827 A2 | 2/2006 |
| WO | WO2006/020827 A3 | 2/2006 |
| WO | WO2006/020913 A2 | 2/2006 |
| WO | WO2006/020913 A3 | 2/2006 |
| WO | WO2006/020960 A2 | 2/2006 |
| WO | WO2006/033720 A2 | 3/2006 |
| WO | WO2004/089608 A3 | 7/2006 |
| WO | WO2006/079072 A2 | 7/2006 |
| WO | WO2006/088743 A2 | 8/2006 |
| WO | WO2006/102171 A2 | 9/2006 |
| WO | WO2006/102556 A2 | 9/2006 |

OTHER PUBLICATIONS

Turcotte and Schubert, Geodynamics (1982) John Wiley & Sons, Inc., pp. 9, 432.
Baker Hughes Incorporated, "EXPatch Expandable Cladding System" (2002).
Baker Hughes Incorporated, "EXPress Expandable Screen System".
High-Tech Wells, "World's First Completion Set Inside Expandable Screen" (2003) Gilmer, J.M., Emerson, A.B.
Baker Hughes Incorporated, "Technical Overview Production Enhancement Technology" (Mar. 10, 2003) Geir Owe Egge.
Baker Hughes Incorporated, "FORMlock Expandable Liner Hangers".
Weatherford Completion Systems, "Expandable Sand Screens" (2002).
Expandable Tubular Technology, "EIS Expandable Isolation Sleeve" (Feb. 2003).
Oilfield Catalog; "Jet-Lok Product Application Description" (Aug. 8, 2003).
Power Ultrasonics, "Design and Optimisation of an Ultrasonic Die System For Form" Chris Cheers (1999, 2000).
Research Area —Sheet Metal Forming—Superposition of Vibra; Fraunhofer IWU (2001).
Research Projects; "Analysis of Metal Sheet Formability and It's Factors of Influence" Prof. Dorel Banabic (2003).
www.materialsresources.com, "Low Temperature Bonding of Dissimilar and Hard-to-Bond Materials and Metal-Including . . . " (2004).
www.tribtech.com. "Trib-gel A Chemical Cold Welding Agent" G R Linzell (Sep. 14, 1999).
www.spurind.com, "Galvanic Protection, Metallurgical Bonds, Custom Fabrication—Spur Industries" (2000).
Lubrication Engineering, "Effect of Micro-Surface Texturing on Breakaway Torque and Blister Formation on Carbon-Graphite Faces in a Mechanical Seal" Philip Guichelaar, Karalyn Folkert, Izhak Etsion, Steven Pride (Aug. 2002).
Surface Technologies Inc., "Improving Tribological Performance of Mechanical Seals by Laser Surface Texturing" Izhak Etsion.
Tribology Transactions "Experimental Investigation of Laser Surface Texturing for Reciprocating Automotive Components" G Ryk, Y Klingerman and I Etsion (2002).
Proceeding of the International Tribology Conference, "Microtexturing of Functional Surfaces for Improving Their Tribological Performance" Henry Haefke, Yvonne Gerbig, Gabriel Dumitru and Valerio Romano (2002).
Sealing Technology, "A laser surface textured hydrostatic mechanical seal" Izhak Etsion and Gregory Halperin (Mar. 2003).
Metalforming Online, "Advanced Laser Texturing Tames Tough Tasks" Harvey Arbuckle.
Tribology Transactions, "A Laser Surface Textured Parallel Thrust Bearing" V. Brizmer, Y. Klingerman and I. Etsion (Mar. 2003).
PT Design, "Scratching the Surface" Todd E. Lizotte (Jun. 1999).
Tribology Transactions, "Friction-Reducing Surface-Texturing in Reciprocating Automotive Components" Aviram Ronen, and Izhak Etsion (2001).
Michigan Metrology "3D Surface Finish Roughness Texture Wear WYKO Veeco" C.A. Brown, PHD; Charles, W.A. Johnsen, S. Chester.
Letter From Baker Oil Tools to William Norvell in Regards to Enventure's Claims of Baker Infringement Of Enventure's Expandable Patents Apr. 1, 2005.
International Search Report, Application PCT/IL00/00245, Sep. 18, 2000.
International Search Report, Application PCT/US00/18635, Nov. 24, 2000.
International Search Report, Application PCT/US00/27645, Dec. 29, 2000.
International Search Report, Application PCT/US00/30022, Mar. 27, 2001.
International Search Report, Application PCT/US01/04753, Jul. 3, 2001.
International Search Report, Application PCT/US01/19014, Nov. 23, 2001.
International Search Report, Application PCT/US01/23815, Nov. 16, 2001.
International Search Report, Application PCT/US01/28960, Jan. 22, 2002.
International Search Report, Application PCT/US01/30256, Jan. 3, 2002.
International Search Report, Application PCT/US01/41446, Oct. 30, 2001.
International Search Report, Application PCT/US02/00093, Aug. 6, 2002.
International Search Report, Application PCT/US02/00677, Jul. 17, 2002.
International Search Report, Application PCT/US02/00677, Feb. 24, 2004.
International Search Report, Application PCT/US02/04353, Jun. 24, 2002.
International Search Report, Application PCT/US02/20256, Jan. 3, 2003.
International Search Report, Application PCT/US02/20477; Oct. 31, 2003.
International Search Report, Application PCT/US02/20477; Apr. 6, 2004.
International Search Report, Application PCT/US02/24399; Feb. 27, 2004.
International Examination Report, Application PCT/US02/24399, Aug. 6, 2004.
International Search Report, Application PCT/US02/25608; May 24, 2004.
International Search Report, Application PCT/US02/25727; Feb. 19, 2004.
Examination Report, Application PCT/US02/25727; Jul. 7, 2004.
International Search Report, Application PCT/US02/29856, Dec. 16, 2002.
International Search Report, Application PCT/US02/36157; Sep. 29, 2003.

International Search Report, Application PCT/US02/36157; Apr. 14, 2004.
International Search Report, Application PCT/US02/36267; May 21, 2004.
International Examination Report, Application PCT/US02/36267, Jan. 4, 2004.
International Search Report, Application PCT/US02/39418, Mar. 24, 2003.
International Examination Report, Application PCT/US02/39418, Feb. 18, 2005.
International Search Report, Application PCT/US02/39425, May 28, 2004.
International Search Report, Application PCT/US03/00609, May 20, 2004.
International Search Report, Application PCT/US03/04837, May 28, 2004.
International Examination Report, Application PCT/US03/04837, Dec. 9, 2004.
International Search Report, Application PCT/US03/06544, Jun. 9, 2004.
International Search Report, Application PCT/US03/10144; Oct. 31, 2003.
Examination Report, Application PCT/US03/10144; Jul. 7, 2004.
International Search Report, Application PCT/US03/11765; Nov. 13, 2003.
International Examination Report, Application PCT/US03/11765; Dec. 10, 2004.
International Examination Report, Application PCT/US03/11765;; Jan. 25, 2005.
International Search Report, Application PCT/US03/13787; May 28, 2004.
International Examination Report, Application PCT/US03/13787; Apr. 7, 2005.
International Examination Report, Application PCT/US03/13787; Mar. 2, 2005.
International Search Report, Application PCT/US03/14153; May 28, 2004.
International Search Report, Application PCT/US03/15020; Jul. 30, 2003.
International Search Report, Application PCT/US03/18530; Jun. 24, 2004.
International Search Report, Application PCT/US03/19993; May 24, 2004.
International Search Report, Application PCT/US03/20694; Nov. 12, 2003.
International Search Report, Application PCT/US03/20870; May 24, 2004.
International Search Report, Application PCT/US03/20870; Sep. 30, 2004.
International Search Report, Application PCT/US03/24779; Mar. 3, 2004.
International Search Report, Application PCT/US03/25675; May 25, 2004.
International Search Report, Application PCT/US03/25676; May 17, 2004.
International Examination Report, Application PCT/US03/25676, Aug. 17, 2004.
International Search Report, Application PCT/US03/25677; May 21, 2004.
International Examination Report, Application PCT/US03/25677, Aug. 17, 2004.
International Search Report, Application PCT/US03/25707; Jun. 23, 2004.
International Search Report, Application PCT/US03/25715; Apr. 9, 2004.
International Search Report, Application PCT/US03/25716; Jan. 13, 2005.
International Search Report, Application PCT/US03/25742; May 27, 2004.
International Search Report, Application PCT/US03/25742; Dec. 20, 2004.
International Search Report, Application PCT/US03/29460; May 25, 2004.
International Examination Report, Application PCT/US03/29460; Dec. 8, 2004.
International Search Report, Application PCT/US03/25667; Feb. 26, 2004.
International Search Report, Application PCT/US03/29858; Jun. 30, 2003.
International Search Report, Application PCT/US03/29859; May 21, 2004.
International Examination Report, Application PCT/US03/29859, Aug. 16, 2004.
International Search Report, Application PCT/US03/38550; Jun. 15, 2004.
International Preliminary Report on Patentability, Application PCT/US04/04740; Apr. 27, 2005.
International Preliminary Report on Patentability, Application PCT/US04/06246; May 5, 2005.
International Preliminary Report on Patentability, Application PCT/US04/08030; Apr. 7, 2005.
Search Report to Application No. EP 02806451.7; Feb. 9, 2005.
Search Report to Application No. GB 0003251.6, Jul. 13, 2000.
Search Report to Application No. GB 0004282.0, Jul. 31, 2000.
Search Report to Application No. GB 0004282.0 Jan. 15, 2001.
Search and Examination Report to Application No. GB 0004282.0, Jun. 3, 2003.
Search Report to Application No. GB 0004285.3, Jul. 12, 2000.
Search Report to Application No. GB 0004285.3, Jan. 17, 2001.
Search Report to Application No. GB 0004285.3, Jan. 19, 2001.
Search Report to Application No. GB 0004285.3, Aug. 28, 2002.
Examination Report to Application No. 0004285.3, Mar. 28, 2003.
Examination Report to Application No. GB 0005399.1; Jul. 24, 2000.
Search Report to Application No. GB 0005399.1, Feb. 15, 2001.
Examination Report to Application No. GB 0005399.1; Oct. 14, 2002.
Search Report to Application No. GB 0013661.4, Oct. 20, 2000.
Search Report to Application No. GB 0013661.4, Apr. 17, 2001.
Search Report to Application No. GB 0013661.4, Feb. 19, 2003.
Examination Report to Application No. GB 0013661.4, Nov. 25, 2003.
Search Report to Application No. GB 0013661.4, Oct. 20, 2003.
Examination Report to Application No. GB 0208367.3, Apr. 4, 2003.
Examination Report to Application No. GB 0208367.3, Nov. 4, 2003.
Examination Report to Application No. GB 0208367.3, Nov. 17, 2003.
Examination Report to Application No. GB 0208367.3, Jan. 30, 2004.
Examination Report to Application No. GB 0212443.6, Apr. 10, 2003.
Examination Report to Application No. GB 0216409.3, Feb. 9, 2004.
Search Report to Application No. GB 0219757.2, Nov. 25, 2002.
Search Report to Application No. GB 0219757.2, Jan. 20, 2003.
Examination Report to Application No. GB 0219757.2, May 10, 2004.
Search Report to Application No. GB 0220872.6, Dec. 5, 2002.
Search Report to Application GB 0220872.6, Mar. 13, 2003.
Examination Report to Application GB 0220872.6, Oct. 29, 2004.
Search Report to Application No. GB 0225505.7, Mar. 5, 2003.
Search and Examination Report to Application No. GB 0225505.7, Jul. 1, 2003.
Examination Report to Application No. GB 0225505.7, Oct. 27, 2004.
Examination Report to Application No. GB 0225505.7 Feb. 15, 2005.
Examination Report to Application No. GB 0300085.8, Nov. 28, 2003.
Examination Report to Application No. GB 030086.6, Dec. 1, 2003.
Examination Report to Application No. GB 0306046.4, Sep. 10, 2004.
Search and Examination Report to Application No. GB 0308290.6, Jun. 2, 2003.

Search and Examination Report to Application No. GB 0308293.0, Jun. 2, 2003.
Search and Examination Report to Application No. GB 0308293.0, Jul. 14, 2003.
Search and Examination Report to Application No. GB 0308294.8, Jun. 2, 2003.
Search and Examination Report to Application No. GB 0308294.8, Jul. 14, 2003.
Search and Examination Report to Application No. GB 0308295.5, Jun. 2, 2003.
Search and Examination Report to Application No. GB 0308295.5, Jul. 14, 2003.
Search and Examination Report to Application No. GB 0308296.3, Jun. 2, 2003.
Search and Examination Report to Application No. GB 0308296.3, Jul. 14, 2003.
Search and Examination Report to Application No. GB 0308297.1, Jun. 2, 2003.
Search and Examination Report to Application No. GB 0308297.1, Jul. 2003.
Search and Examination Report to Application No. GB 0308299.7, Jun. 2, 2003.
Search and Examination Report to Application No. GB 0308299.7, Jun. 14, 2003.
Search and Examination Report to Application No. GB 0308302.9, Jun. 2, 2003.
Search and Examination Report to Application No. GB 0308303.7, Jun. 2, 2003.
Search and Examination Report to Application No. GB 0308303.7, Jul. 14, 2003.
Search and Examination Report to Application No. GB 0310090.6, Jun. 24, 2003.
Search and Examination Report to Application No. GB 0310099.7, Jun. 24, 2003.
Search and Examination Report to Application No. GB 0310101.1, Jun. 24, 2003.
Search and Examination Report to Application No. GB 0310104.5, Jun. 24, 2003.
Search and Examination Report to Application No. GB 0310118.5, Jun. 24, 2003.
Search and Examination Report to Application No. GB 0310757.0, Jun. 12, 2003.
Search and Examination Report to Application No. GB 0310759.6, Jun. 12, 2003.
Search and Examination Report to Application No. GB 0320770.3, Jun. 12, 2003.
Search and Examination Report to Application No. GB 0310772.9, Jun. 12, 2003.
Search and Examination Report to Application No. GB 0310785.1, Jun. 12, 2003.
Search and Examination Report to Application No. GB 0310795.0, Jun. 12, 2003.
Search and Examination Report to Application No. GB 0310797.6, Jun. 12, 2003.
Search and Examination Report to Application No. GB 0310799.2, Jun. 12, 2003.
Search and Examination Report to Application No. GB 0310801.6, Jun. 12, 2003.
Search and Examination Report to Application No. GB 0310833.9, Jun. 12, 2003.
Search and Examination Report to Application No. GB 0310836.2, Jun. 12, 2003.
Examination Report to Application No. GB 0310836.2, Aug. 7, 2003.
Examination Report to Application No. GB 0311596.1, May 18, 2004.
Search and Examination Report to Application No. GB 0313406.1, Sep. 3, 2003.
Examination Report to Application No. GB 0314846.7, Jul. 15, 2004.
Search and Examination Report to Application No. GB 0316883.8, Aug. 14, 2003.
Search and Examination Report to Application No. GB 0316883.8, Nov. 25, 2003.
Search and Examination Report to Application No. GB 0316886.1, Aug. 14, 2003.
Search and Examination Report to Application No. GB 0316886.1, Nov. 25, 2003.
Search and Examination Report to Application No. GB 0316887.9, Aug. 14, 2003.
Search and Examination Report to Application No. GB 0316887.9, Nov. 25, 2003.
Search and Examination Report to Application No. GB 0318545.1, Sep. 3, 2003.
Search and Examination Report to Application No. GB 0318547.4; Sep. 3, 2003.
Search and Examination Report to Application No. GB 0318549.3; Sep. 3, 2003.
Search and Examination Report to Application No. GB 0318550.1, Sep. 3, 2003.
Search and Examination Report to Application No. GB 0320579.6, Dec. 16, 2003.
Search and Examination Report to Application No. GB 0320580.4, Dec. 17, 2003.
Examination Report to Application No. GB 0320747.9, May 25, 2004.
Search and Examination Report to Application No. GB 0323891.2, Dec. 19, 2003.
Search and Examination Report to Application No. GB 0324172.6, Nov. 4, 2003.
Search and Examination Report to Application No. GB 0324174.2, Nov. 4, 2003.
Search and Examination Report to Application No. GB 0325071.9, Nov. 18, 2003.
Examination Report to Application No. GB 0325071.9, Feb. 2, 2004.
Examination Report to Application No. GB 0325072.7, Feb. 5, 2004.
Search and Examination Report to Application No. GB 0325072.7; Dec. 3, 2003.
Examination Report to Application No. GB 0325072.7; Apr. 13, 2004.
Examination Report to Application No. GB 0400018.8; Oct. 29, 2004.
Examination Report to Application No. GB 0400019.6; Oct. 29, 2004.
Search and Examination Report to Application No. GB 0403891.5, Jun. 9, 2004.
Examination Report to Application No. GB 0403891.5, Feb. 14, 2005.
Search and Examination Report to Application No. GB 0403893.1, Jun. 9, 2004.
Examination Report to Application No. GB 0403893.1, Feb. 14, 2005.
Search and Examination Report to Application No. GB 0403894.9, Jun. 9, 2004.
Examination Report to Application No. GB 0403894.9, Feb. 15, 2005.
Search and Examination Report to Application No. GB 0403897.2, Jun. 9, 2004.
Search and Examination Report to Application No. GB 0403920.2, Jun. 10, 2004.
Examination Report to Application No. GB 0403920.2, Feb. 15, 2005.
Search and Examination Report to Application No. GB 0403921.0, Jun. 10, 2004.
Examination Report to Application No. GB 0403921.0, Feb. 15, 2005.
Search and Examination Report to Application No. GB 0403926.9, Jun. 10, 2004.
Examination Report to Application No. GB 0404796.5; May 20, 2004.
Search and Examination Report to Application No. GB 0404826.0, Apr. 21, 2004.

Search and Examination Report to Application No. GB 0404828.6, Apr. 21, 2004.
Search and Examination Report to Application No. GB 0404830.2, Apr. 21, 2004.
Search and Examination Report to Application No. GB 0404832.8, Apr. 21, 2004.
Search and Examination Report to Application No. GB 0404833.6, Apr. 21, 2004.
Search and Examination Report to Application No. GB 0404833.6, Aug. 19, 2004.
Search and Examination Report to Application No. GB 0404837.7, May 17, 2004.
Examination Report to Application No. GB 0404837.7, Jul. 12, 2004.
Search and Examination Report to Application No. GB 0404839.3, May 14, 2004.
Search and Examination Report to Application No. GB 0404842.7, May 14, 2004.
Search and Examination Report to Application No. GB 0404845.0, May 14, 2004.
Search and Examination Report to Application No. GB 0404849.2, May 17, 2004.
Examination Report to Application No. GB 0406257.6, Jun. 28, 2004.
Examination Report to Application No. GB 0406257.6, Jan. 25, 2005.
Examination Report to Application No. GB 0406258.4, May 20, 2004.
Examination Report to Application No. GB 0406258.4; Jan. 12, 2005.
Examination Report to Application No. GB 0408672.4, Jul. 12, 2004.
Examination Report to Application No. GB 0408672.4, Mar. 21, 2005.
Examination Report to Application No. GB 0404830.2, Aug. 17, 2004.
Search and Examination Report to Application No. GB 0411698.4, Jun. 30, 2004.
Examination Report to Application No. GB 0411698.4, Jan. 24, 2005.
Search and Examination Report to Application No. GB 0411892.3, Jul. 14, 2004.
Examination Report to Application No. GB 0411892.3, Feb. 21, 2005.
Search and Examination Report to Application No. GB 0411893.3, Jul. 14, 2004.
Search and Examination Report to Application No. GB 0411894.9, Jun. 30, 2004.
Search and Examination Report to Application No. GB 0412190.1, Jul. 22, 2004.
Search and Examination Report to Application No. GB 0412191.9, Jul. 22, 2004.
Search and Examination Report to Application No. GB 0412192.7, Jul. 22, 2004.
Search Report to Application No. GB 0415835.8, Dec. 2, 2004.
Search Report to Application No. GB 0415835.8; Mar. 10, 2005
Examination Report to Application No. 0416625.2 Jan. 20, 2005.
Search and Examination Report to Application No. GB 0416834.0, Aug. 11, 2004.
Search and Examination Report to Application No. GB 0416834.0, Nov. 16, 2004.
Search and Examination Report to Application No. GB 0417810.9, Aug. 25, 2004.
Search and Examination Report to Application No. GB 0417811.7, Aug. 25, 2004.
Search and Examination Report to Application No. GB 0418005.5, Aug. 25, 2004.
Search and Examination Report to Application No. GB 0418425.5, Sep. 10, 2004.
Search and Examination Report to Application No. GB 0418426.3 Sep. 10, 2004.
Search and Examination Report to Application No. GB 0418427.1 Sep. 10, 2004.
Search and Examination Report to Application No. GB 0418429.7 Sep. 10, 2004.
Search and Examination Report to Application No. GB 0418430.5 Sep. 10, 2004.
Search and Examination Report to Application No. GB 0418431.3 Sep. 10, 2004.
Search and Examination Report to Application No. GB 0418432.1 Sep. 10, 2004.
Search and Examination Report to Application No. GB 0418433.9 Sep. 10, 2004.
Search and Examination Report to Application No. GB 0418439.6 Sep. 10, 2004.
Search and Examination Report to Application No. GB 0418442.0 Sep. 10, 2004.
Examination Report to Application No. GB 0422419.2 Dec. 8, 2004.
Search and Examination Report to Application No. GB 0422893.8 Nov. 24, 2004.
Search and Examination Report to Application No. GB 0423416.7 Nov. 12, 2004.
Search and Examination Report to Application No. GB 0423417.5 Nov. 12, 2004.
Search and Examination Report to Application No. GB 0423418.3 Nov. 12, 2004.
Search and Examination Report to Application No. GB 0426155.8 Jan. 12, 2005.
Search and Examination Report to Application No. GB 0426156.6 Jan. 12, 2005.
Search and Examination Report to Application No. GB 0426157.4 Jan. 12, 2005.
Examination Report to Application No. GB 0428141.6 Feb. 9, 2005.
Examination Report to Application No. GB 0500184.7 Feb. 9, 2005.
Search and Examination Report to Application No. GB 0500600.2 Feb. 15, 2005.
Search and Examination Report to Application No. GB 0503470.7 Mar. 21, 2005.
Search Report to Application No. GB 9926449.1, Mar. 27, 2000.
Search Report to Application No. GB 9926449.1, Jul. 4, 2001.
Search Report to Application No. GB 9926449.1, Sep. 5, 2001.
Search Report to Application No. GB 9926450.9, Feb. 28, 2000.
Examination Report to Application No. GB 9926450.9, May 15, 2002.
Examination Report to Application No. GB 9926450.9, Nov. 22, 2002.
Search Report to Application No. GB 9930398.4, Jun. 27, 2000.
Search Report to Application No. Norway 1999 5593, Aug. 20, 2002.
Written Opinion to Application No. PCT/US01/19014; Dec. 10, 2002.
Written Opinion to Application No. PCT/US01/23815; Jul. 25, 2002.
Written Opinion to Application No. PCT/US01/28960; Dec. 2, 2002.
Written Opinion to Application No. PCT/US01/30256; Nov. 11, 2002.
Written Opinion to Application No. PCT/US02/00093; Apr. 21, 2003.
Written Opinion to Application No. PCT/US02/00677; Apr. 17, 2003.
Written Opinion to Application No. PCT/US02/04353; Apr. 11, 2003.
Written Opinion to Application No. PCT/US02/20256; May 9, 2003.
Written Opinion to Application No. PCT/US02/24399; Apr. 28, 2004.
Written Opinion to Application No. PCT/US02/25608 Sep. 13, 2004.
Written Opinion to Application No. PCT/US02/25608 Feb. 2, 2005.
Written Opinion to Application No. PCT/US03/25675 Nov. 24, 2004.
Written Opinion to Application No. PCT/US02/25727; May 17, 2004.
Written Opinion to Application No. PCT/US02/39418; Jun. 9, 2004.

Written Opinion to Application No. PCT/US02/39425; Nov. 22, 2004.
Written Opinion to Application No. PCT/US02/39425; Apr. 11, 2005.
Written Opinion to Application No. PCT/US03/06544; Feb. 18, 2005.
Written Opinion to Application No. PCT/US03/11765 May 11, 2004.
Written Opinion to Application No. PCT/US03/13787 Nov. 9, 2004.
Written Opinion to Application No. PCT/US03/14153 Sep. 9, 2004.
Written Opinion to Application No. PCT/US03/14153 Nov. 9, 2004.
Written Opinion to Application No. PCT/US03/18530 Sep. 13, 2004.
Written Opinion to Application No. PCT/US03/19993 Oct. 15, 2004.
Written Opinion to Application No. PCT/US03/29858 Jan. 21, 2004.
Written Opinion to Application No. PCT/US03/38550 Dec. 10, 2004.
Written Opinion to Application No. PCT/US04/08171 May 5, 2005.
Combined Search Report and Written Opinion to Application No. PCT/US04/-00631; Mar. 28, 2005.
Combined Search Report and Written Opinion to Application No. PCT/US04/02122 Feb. 24, 2005.
Combined Search Report and Written Opinion to Application No. PCT/US04/04740 Jan. 19, 2005.
Combined Search Report and Written Opinion to Application No. PCT/US04/06246 Jan. 26, 2005.
Combined Search Report and Written Opinion to Application No. PCT/US04/08030 Jan. 6, 2005.
Combined Search Report and Written Opinion to Application No. PCT/US04/08073 Mar. 4, 2005.
Combined Search Report and Written Opinion to Application No. PCT/US04/08170 Jan. 13, 2005.
Combined Search Report and Written Opinion to Application No. PCT/US04/08171 Feb. 16, 2005.
Combined Search Report and Written Opinion to Application No. PCT/US04/11172 Feb. 14, 2005.
Combined Search Report and Written Opinion to Application No. PCT/US04/28438 Mar. 14, 2005.
International Examination Report, Application PCT/US02/25608; Jun. 1, 2005.
International Examination Report, Application PCT/US03/06544, May 10, 2005.
International Examination Report, Application PCT/US03/11765; Jul. 18, 2005.
International Examination Report, Application PCT/US03/14153; May 12, 2005.
International Examination Report, Application PCT/US03/15020, May 9, 2005.
International Examination Report, Application PCT/US03/25667, May 25, 2005.
International Examination Report, Application PCT/US03/29858; May 23, 2005.
International Search Report, Application PCT/US03/38550; May 23, 2005.
International Preliminary Report on Patentability, Application PCT/US04/02122; May 13, 2005.
International Preliminary Report on Patentability, Application PCT/US04/11177;Jun. 9, 2005.
Examination Report to Application No. AU 2001278196 ,Apr. 21, 2005.
Examination Report to Application No. AU 2002237757 ,Apr. 28, 2005.
Examination Report to Application No. AU 2002240366 ,Apr. 13, 2005.
Search Report to Application No. GB 0220872.6, Mar. 13, 2003.
Examination Report to Application No. GB 0220872.6, Oct. 29, 2004.
Search and Examination Report to Application No. GB 1310757.0, Jun. 12, 2003.
Search and Examination Report to Application No. GB 0310770.3, Jun. 12, 2003.
Search and Examination Report to Application No. GB 0400018.8; May 17, 2005.
Examination Report to Application No. GB 0400019.6; May 19, 2005.
Examination Report to Application No. GB 0403891.5, Jun. 30, 2005.
Examination Report to Application No. GB 0404796.5; Apr. 14, 2005.
Examination Report to Application No. GB 0406257.6 Jun. 16, 2005.
Examination Report to Application No. GB 0412533.2, May 20, 2005.
Search Report to Application No. GB 0415835.8; Mar. 10, 2005.
Search and Examination Report to Application No. GB 0425948.7 Apr. 13, 2005.
Search and Examination Report to Application No. GB 0425951.1 Apr. 14, 2005.
Search and Examination Report to Application No. GB 0425956.0 Apr. 14, 2005.
Examination Report to Application No. GB 0501667.0 May 27, 2005.
Search and Examination Report to Application No. GB 0506697.2 May 20, 2005.
Search and Examination Report to Application No. GB 0507979.3 Jun. 16, 2005.
Research Area—Sheet Metal Forming—Superposition of Vibra; Fraunhofer IWU (2001).
Research Projects;"Analysis of Metal Sheet Formability and It's Factors of Influence" Prof. Dorel Banabic (2003).
www.materialsresources.com, "Low Temperature Bonding of Dissimilar and Hard-to-Bond Materials and Metal-Including . . . " (2004).
Offshore, "Agbada Well Solid Tubulars Expanded Bottom Up, Screens Expanded Top Down" William Furlow, Jan. 2002.(copy not available).
Drilling Contractor, "Solid Expandable Tubulars are Enabling Technology" Mar./Apr. 2001.(copy not available).
Hart's E & P, "SET Technology: Setting the Standard" Mar. 2002.
Hart's E & P, "An Expanded Horizon" Jim Brock, Lev Ring, Scott Costa, Andrel Filippov. Feb. 2000.
Hart's E & P, "Technology Strategy Breeds Value" All Daneshy. May 2004.
Hart's E & P, "Solid Expandable Tubulars Slimwell: Stepping Stone to MonoDiameter" Jun. 2003.
Innovators Chart the Course, Shell Exploration & Production.
"Case Study: Value In Drilling Derived From Application-Specific Technology" Langley, Diane., Oct. 2004.
L'Usine Nouvelle, "Les Tubes Expansibles Changent La Face Du Forage Petroller" Demoulin, Laurence, No. 2878 . pp. 50-52, 3 Juillet 2003.
Offshore, "Monodiameter Technology Keeps Hole Diameter to TD", Hull, Jennifer., Oct. 2002.
News Release, "Shell and Halliburton Agree to Form Company to Develop and Market Expandable Casing Technology", 1998.
Offshore, "Expandable Tubulars Enable Multilaterals Without Compromise on Hole Size," DeMong, Karl, et al., Jun. 2003.
Offshore Engineer, "From Exotic to Routine- the offshore quickstep" Apr. 2004, pp. 77-83.
Offshore, "Expandable Solid Casing Reduces Telescope Effect," Furlow, William, Aug. 1998, pp. 102 & 140.
Offshore, "Casing Expansion, Test Process Fine Tuned on Ultradeepwater Well," Furlow, William, Dec. 2000.
Offshore Engineer, "Oilfield Service Trio Target Jules Verne Territory," Von Flater, Rick., Aug. 2001.
Offshore, "Expandable Casing Program Helps Operator Hit TD With Larger Tubulars" Furlow, William, Jan. 2000.
Offshore, "Same Internal Casing Diameter From Surface to TD", Cook, Lance., Jul. 2002.
Oil and Gas Investor, "Straightening the Drilling Curve," Williams, Peggy. Jan. 2003.
Petroleum Engineer International, "Expandable Casing Accesses Remote Reservoirs" Apr. 1999.

New Technology Magazine, "Pipe Dream Reality," Smith, Maurice, Dec. 2003.
Roustabout, "First ever SET Workshop Held in Aberdeen," Oct. 2004.
Roustabout, "Enventure Ready to Rejuvenate the North Sea" Sep. 2004.
EP Journal of Technology, "Solid Expandable Tubulars (SET) Provide Value to Operators Worldwide in a Variety of Applications," Fonlova, Rick, Apr. 2005.
The American Oil & Gas Reporter, "Advances Grow Expandable Applications," Bullock, Michael D., Sep. 2004.
Upstream, "Expandable Tubulars Close In on the Holy Grail of Drilling", Cottrill, Adrian, Jul. 26, 2002.
Oil and Gas, "Shell Drills World's First Monodiameter Well in South Texas" Sumrow, Mike., Oct. 21, 2002.
World Oil, "Expandables and the Dream of the Monodiameter Well: A Status Report", Fischer, Perry, Jul. 2004.
World Oil, "Well Remediation Using Expandable Cased-Hole Liners", Merritt, Randy et al., Jul. 2002.
World Oil, "How in Situ Expansion Affects Casing and Tubing Properties", Mack, R.D., et al., Jul. 1999. pp. 69-71.
Enventure Global Technology "Expandable Tubular Technology—Drill Deeper, Farther, More Economically" Mark Rivenbark. EGT10171.
Society of Petroleum Engineers, "Addressing Common Drilling Challenges Using Solid Expandable Tubular Technology" Perez-Roca, Eduardo, et al., 2003.
Society of Petroleum Engineers, "Monodiameter Drilling Liner—From Concept to Reality" Dean, Bill, et al. 2003.
Offshore Technology Conference, "Expandable Liner Hangers: Case Histories" Moore, Melvin, J., et al., 2002.
Offshore Technology Conference, "Deepwater Expandable Openhole Liner Case Histories: Learnings Through Field Applications" Grant, Thomas P., et al., 2002.
Offshore Technology Conference, "Realization of the MonoDiameter Well: Evolution of a Game-Changing Technology" Dupal, Kenneth, et al., 2002.
Offshore Technology Conference, "Water Production Reduced Using Solid Expandable Tubular Technology to "Clad" In Fractured Carbonate Formation" van Noort, Roger, et al., 2003.
Offshore Technology Conference, "Overcoming Well Control Challenges with Solid Expandable Tubular Technology" Patin, Michael, et al., 2003.
Offshore Technology Conference, "Expandable Cased-hole Liner Remediates Prolific Gas Well and Minimizes Loss of Production" Buckler Bill, et al., 2002.
Offshore Technology Conference, "Development and Field Testing of Solid Expandable Corrosion Resistant Cased-hole Liners to Boost Gas Production in Corrosive Environments" Siemers Gertjan, et al., 2003.
"Practices for Providing Zonal Isolation in Conjunction with Expandable Casing Jobs-Case Histories" Sanders, T, et al. 2003.
Society of Petroleum Engineers, "Increasing Solid Expandable Tubular Technology Reliability in a Myriad of Downhole Environments", Escobar, C. et al., 2003.
Society of Petroleum Engineers, "Water Production Management—PDO's Successful Application of Expandable Technology", Braas, JCM., et al., 2002.
Society of Petroleum Engineers, "Expandable Tubular Solutions", Filippov, Andrei, et al., 1999.
Society of Petroleum Engineers, "Expandable Liner Hanger Provides Cost-Effective Alternative Solution" Lohoefer, C. Lee, et al., 2000.
Society of Petroleum Engineers, "Solid Expandable Tubular Technology—A Year of Case Histories in the Drilling Environment" Dupal, Kenneth, et al., 2001.
"In-Situ Expansion of Casing and Tubing" Mack, Robert et al.
Society of Petroleum Engineers, "Expandable Tubulars: Field Examples of Application in Well Construction and Remediation" Diagle, Chan, et al., 2000.
AADE Houston Chapter, "Subsidence Remediation—Extending Well Life Through the Use of Solid Expandable Casing Systems" Shepherd, David, et al., Mar. 2001 Conference.
Society of Petroleum Engineers, "Planning the Well Construction Process for the Use of Solid Expandable Casing" DeMong, Karl, et al., 2003.
Enventure Global Technology, "The Development and Applications of Solid Expandable Tubular Technology" Cales, GL., 2003.
Society of Petroleum Engineers, "Installation of Solid Expandable Tubular Systems Through Milled Casing Windows" Waddell, Kevin, et al., 2004.
Society of Petroleum Engineers, "Solid Expandable Tubular Technology in Mature Basins" Blasingame, Kate, et al., 2003.
"Casing Design in Complex Wells: The Use of Expandables and Multilateral Technology to Attack the size Reduction Issue" DeMong, Karl., et al.
"Well Remediation Using Expandable Cased-Hole Liners- Summary of Case Histories" Merritt, Randy, et al.
Offshore Technology Conference, "Transforming Conventional Wells to Bigbore Completions Using Solid Expandable Tubular Technology" Mohd Nor, Norilzah, et al., 2002.
Society of Petroleum Engineers, "Using Solid Expandable Tubulars for Openhole Water Shutoff" van Noort, Roger, et al., 2002.
Society of Petroleum Engineers, "Case Histories—Drilling and Recompletion Applications Using Solid Expandable Tubular Technology" Campo. Don, et al., 2002.
Society of Petroleum Engineers, "Reaching Deep Reservoir Targets Using Solid Expandable Tubulars" Gusevlk Rune, et al., 2002.
Society of Petroleum Engineers, "Breakthroughs Using Solid Expandable Tubulars to Construct Extended Reach Wells" Demong, Karl, et al., 2004.
Deep Offshore Technology Conference "Meeting Economic Challenges of Deepwater Drilling with Expandable-Tubular Technology" Haut, Richard, et al., 1999.
Offshore Technology Conference, "Field Trial Proves Upgrades to Solid Expandable Tubulars" Moore, Melvin, et al., 2002.
"Well Design with Expandable Tubulars Reduces Cost and Increases Success in Deepwater Applications" Dupal, Ken, et al., Deep Shore Technology 2000.
Offshore Technology Conference, "Reducing Non-Productive Time Through the Use of Solid Expandable Tubulars: How to Beat the Curve Through Pre-Planning" Cales, Gerry, et al., 2004.
Offshore Technology Conference, "Three Diverse Applications on Three Continents for a Single Major Operator" Sanders, Tom, et al., 2004.
Offshore Technology Conference,, "Expanding Oil Field Tubulars Through a Window Demonstrates Value and Provides New Well Construction Option" Sparling, Steven, et al., 2004.
Society of Petroleum Engineers, "Advances in Single-diameter Well Technology: The Next Step to Cost-Effective Optimization" Waddell, Kevin, et al., 2004.
Society of Petroleum Engineers, "New Technologies Combine to Reduce Drilling Cost in Ultradeepwater Applications" Touboul, Nicolas, et al., 2004.
Society of Petroleum Engineers, "Solid Expandable Tubular Technology: The Value of Planned Installation vs. Contingency" Rivenbark, Mark, et al., 2004.
Society of Petroleum Engineers, "Changing Safety Paradigms in the Oil and Gas Industry" Ratilff, Matt, et al., 2004.
"Casing Remediation—Extending Well Life Through The Use of Solid Expandable Casing Systems" Merritt, Randy, et al.
Society of Petroleum Engineers, "Window Exit Sidetrack Enhancements Through the Use of Solid Expandable Casing", Rivenbark, Mark, et al., 2004.
"Solid Expandable Tubular Technology: The Value of Planned Installations vs. Contingency", Carstens, Chris, et al.
Data Sheet, "Enventure Cased-Hole Liner (CHL) System" *Enventure Global Technology*, Dec. 2002.
Case History, "Graham Ranch No. 1 Newark East Barnett Field" Enventure Global Technology, Feb. 2002.
Case History, "K.K. Camel No. 1 Ridge Field Lafayette Parish, Louisiana" Enventure Global Technology, Feb. 2002.
Case History, "Eemskanaal—2 Groningen" Enventure Global Technology, Feb. 2002.
Case History, "Yibal 381 Oman" Enventure Global Technology, Feb. 2002.

Case History, "Mississippi Canyon 809 URSA TLP, OSC-G 5868, No. A-12" Enventure Global Technology, Mar. 2004.
Case History, "Unocal Sequola Mississippi Canyon 941 Well No. 2" Enventure Global Technology, 2005.
"SET Technology: The Facts" Enventure Global Technology, 2004.
Data Sheet, "Enventure Openhole Liner (OHL) System" Enventure Global Technology, Dec. 2002.
Data Sheet, "Window Exit Applications OHL Window Exit Expansion" Enventure Global Technology, Jun. 2003.
Combined Search Report and Written Opinion to Application No. PCT/US04/00631; Mar. 28, 2005.
Combined Search Report and Written Opinion to Application No. PCT/US04/02122 Feb. 24, 2005.
Combined Search Report and Written Opinion to Application No. PCT/US04/04740 Jan. 19, 2005.
Combined Search Report and Written Opinion to Application No. PCT/US04/06246 Jan. 26, 2005.
Combined Search Report and Written Opinion to Application No. PCT/US04/08030 Jan. 6, 2005.
Combined Search Report and Written Opinion to Application No. PCT/US04/08073 Mar. 4, 2005.
Combined Search Report and Written Opinion to Application No. PCT/US04/08170 Jan. 13, 2005.
Combined Search Report and Written Opinion to Application No. PCT/US04/08171 Feb. 16, 2005.
Combined Search Report and Written Opinion to Application No. PCT/US04/11172 Feb. 14, 2005.
Combined Search Report and Written Opinion to Application No. PCT/US04/28438 Mar. 14, 2005.
Written Opinion to Application No. PCT/US03/25675 May 9, 2005.
Arbuckle, "Advanced Laser Texturing Tames Tough Tasks," Metal Forming Magazine.
Brizmer et al., "A Laser Surface Textured Parallel Thrust Bearing," *Tribology Transactions*, 46(3):397-403, 2003.
Duphorne, "Letter Re: Enventure Claims of Baker Infringement of Enventure's Expandable Patents," Apr. 1, 2005.
Egge, "Technical Overview Production Enhancement Technology," Baker Hughes, Mar. 10, 2003.
"EIS Expandable Isolation Sleeve" *Expandable Tubular Technology*, Feb. 2003.
Enventure Global Technology, Solid Expandable Tubulars are Enabling Technology, *Drilling Contractor*, Mar.-Apr. 2001.
Etsion, "Improving Tribological Performance of Mechanical Seals by Laser Surface Texturing," *Surface Technologies*, LTD.
Etsion, "A Laser Surface Textured Hydrostatic Mechanical Seal," *Sealing Technology*, Mar. 2003.
"Expandable Sand Screens," *Weatherford Completion Systems*, 2002.
Fontova, "Solid Expandable Tubulars (SET) Provide Value to Operators Worldwide in a Variety of Applications," *EP Journal of Technology*, Apr. 2005.
Fraunhofer IWU, "Research Area: Sheet Metal Forming—Superposition of Vibrations," 2001.
Gilmer et al., "World's First Completion Set Inside Expandable Screen," *High-Tech Wells*, 2003.
Guichelaar et al., "Effect of Micro-Surface Texturing on Breakaway Torque and Blister Formation on Carbon-Graphite Faces in a Mechanical Seal," *Lubrication Engineering*, Aug. 2002.
Haefke et al., "Microtexturing of Functional Surfaces for Improving Their Tribological Performance," *Proceedings of the International Tribology Conference*, 2000.
Halliburton Completion Products, 1996.
Linzell, "Trib-Gel A Chemical Cold Welding Agent," 1999.
Lizotte, "Scratching The Surface," *PT Design*, Jun. 19993.
Power Ultrasonics, "Design and Optimisation of an Ultrasonic Die System For Forming Metal Cans," 1999.
Ratliff, "Changing Safety Paradigms in the Oil and Gas Industry," *Society of Petroleum Engineers*, SPE 90828, 2004.
Ronen et al., "Friction-Reducing Surface-Texturing in Reciprocating Automotive Components," *Tribology Transactions*, 44(3):359-366, 2001.
Rky et al., "Experimental Investigation of Laser Surface Texturing for Reciprocating Automotive Components," *Tribology Transactions*, 45(4):444-449, 2002.
Turcotte et al., "Geodynamics Applications of Continuum Physics to Geological Problems," 1982.
Von Flatern, "From Exotic to Routine—the Offshore Quick-step," *Offshore Engineer*, Apr. 2004.
Von Flatern, "Oilfield Service Trio Target Jules Verne Territory," *Offshore Engineer*, Aug. 2001.
www.JETLUBE.com, "Oilfield Catalog—Jet-Lok Product Applicatin Descriptions," 1998.
www.MATERIALSRESOURCES.com, "Low Temperature Bonding of Dissimilar and Hard-to-Bond Materials and Metals Including," 2004.
www.MITCHMET.com, "3d Surface Texture Parameters," 2004.
www.SPURIND.com, "Glavanic Protection, Metallurgical Bonds, Custom Fabrications -Spur Industries," 2000.
International Preliminary Examination Report, Application PCT/US03/11765, Jul. 18, 2005.
International Preliminary Examination Report, Application PCT/US01/11765, Aug. 15, 2005.
International Preliminary Examination Report, Application PCT/US03/20870, Sep. 30, 2004.
International Preliminary Examination Report, Application PCT/US03/25675, Aug. 30, 2005.
International Preliminary Examination Report, Application PCT/US03/25742, Dec. 20, 2004.
International Preliminary Examination Report, Application PCT/US03/38550, May 23, 2005.
International Preliminary Report on Patentability, Application PCT/US04/08171, Sep. 13, 2005.
International Preliminary Report on Patentability, Application PCT/US04/28438, Sep. 20, 2005.
Combined Search Report and Written Opinion to Application No. PCT/US04/11973, Sep. 27, 2005.
Combined Search Report and Written Opinion to Application No. PCT/US04/28423, Jul. 13, 2005.
Search Report to Application No. GB 0415835.8, Mar. 10, 2005.
Examination Report to Application No. GB 0316883.8, Nov. 25, 2003.
Examination Report to Application No. GB 0316886.1, Nov. 25, 2003.
Examination Report to Application No. GB 0316887.9, Nov. 25, 2003.
Examination Report to Application No. GB 0406257.6, Jun. 16, 2005.
Examination Report to Application No. GB 0406257.6, Sep. 2, 2005.
Examination Report to Application No. GB 0406258.4, Jul. 27, 2005.
Examination Report to Application No. GB 0412533.2, May 20, 2005.
Examination Report to Application No. GB 0416834.0, Nov. 16, 2004.
Examination Report to Application No. GB 0500184.7, Sep. 12, 2005.
Examination Report to Application No. GB 0500600.2, Sep. 6, 2005.
Examination Report to Application No. GB 0507979.3, Jun. 16, 2005.
Search and Examination Report to Application No. GB 0505039.8, Jul. 22, 2005.
Search and Examination Report to Application No. GB 0506700.4, Sep. 20, 2005.
Search and Examination Report to Application No. GB 0509618.5, Sep. 27, 2005.
Search and Examination Report to Application No. GB 0509620.1, Sep. 27, 2005.
Search and Examination Report to Application No. GB 0509626.8, Sep. 27, 2005.
Search and Examination Report to Application No. GB 0509627.6, Sep. 27, 2005.

Search and Examination Report to Application No. GB 0509629.2, Sep. 27, 2005.
Search and Examination Report to Application No. GB 0509630.0, Sep. 27, 2005.
Search and Examination Report to Application No. GB 0509631.8, Sep. 27, 2005.
Search and Examination Report to Application No. GB 0512396.3, Jul. 26, 2005.
Search and Examination Report to Application No. GB 0512398.9, Jul. 27, 2005.
H.3.HC.02.P01.012.197/2005, Jan. 17, 2005, Indonesia (Patent Publication).
H3.HC.02.03.09.044.392/2005, Sep. 12, 2005, Indonesia.
H3.HC.02.03.09.046.2804/2006, Aug. 3, 2006, Indonesia (Patent Publication).
Adams, "Drilling Engineering: A Complete Well Planning Approach," 1985.
Enventure Global Technology, "SET Technology: The Facts," 2004.
Flatern, "Oilfield Service Trio Target Jules Verne Territory," at http://www.oilonline.com.
Mohawk Energy, :Minimizing Drilling Ecoprints Houston, Dec. 16, 2005.
"Pipeline Rehabilitation by Sliplining with Polyethylene Pipe" 2006.
Rivenbark, "Expandable Tubular Technology—Drill Deeper, Farther, More Economically," Enventure Global Technology.
Tumey, "Letter: IP Analysis" May 6, 2006.
www.RIGZONE.com/news/article.asp?a_id=1755, "Tesco Provides Casing Drilling Operations Update," 2001.
www.RIGZONE.com/news/article.asp?a_id=2603, Conoco and Tesco Unveil Revolutionary Drilling Rig 2002.
International Preliminary Examination Report, Application PCT/US01/28690, Sep. 4, 2003.
International Preliminary Examination Report, Application PCT/US03/15020, May 9, 2005.
International Preliminary Examination Report, Application PCT/US03/15020 (corrected), Nov. 14, 2004.
International Preliminary Report on Patentability, Application PCT/US04/00631, Mar. 2, 2006.
International Preliminary Report on Patentability, Application PCT/US04/04740, Jun. 27, 2006.
International Preliminary Report on Patentability, Application PCT/US04/08030, Jun. 10, 2005.
International Preliminary Report on Patentability, Application PCT/US04/10317, Jun. 23, 2006.
International Preliminary Report on Patentability, Application PCT/US04/028423, Mar. 9, 2006.
International Preliminary Report on Patentability, Application PCT/US04/028423, Jun. 19, 2006.
International Preliminary Report on Patentability, Application PCT/US04/28438, Sep. 20, 2005.
International Preliminary Report on Patentability, Application PCT/US04/28889, Aug. 1, 2006.
Combined Search Report and Written Opinion to Application No. PCT/US04/00631, Mar. 28, 2005.
Combined Search Report and Written Opinion to Application No. PCT/US04/07711, Nov. 28, 2006.
Combined Search Report and Written Opinion to Application No. PCT/US04/10317, May 25, 2006.
Combined Search Report and Written Opinion to Application No. PCT/US04/28831, Dec. 19, 2005.
Combined Search Report and Written Opinion to Application No. PCT/US04/28889, Nov. 14, 2005.
Combined Search Report and Written Opinion to Application No. PCT/US05/28473, Sep. 1, 2006.
Combined Search Report and Written Opinion to Application No. PCT/US05/28642, Jul. 14, 2006.
Combined Search Report and Written Opinion to Application No. PCT/US05/28819, Aug. 3, 2006.
Combined Search Report and Written Opinion to Application No. PCT/US05/28869, Apr. 17, 2006.
Combined Search Report and Written Opinion to Application No. PCT/US06/04809, Aug. 29, 2006.
Combined Search Report and Written Opinion to Application No. PCT/US06/09886, Dec. 4, 2006.
Search Report to Application No. GB 0507980.1, Apr. 24, 2006.
Examination Report to Application No. GB 0219757.2, Oct. 31, 2004.
Examination Report to Application No. GB 03701281.2, Jan. 31, 2006.
Examination Report to Application No. GB 0400019.6, Nov. 4, 2005.
Examination Report to Application No. GB 0406257.6, Mar. 3, 2005.
Examination Report to Application No. GB 0406257.6, Nov. 9, 2005.
Examination Report to Application No. GB 0406257.6, Apr. 28, 2006.
Examination Report to Application No. GB 0406258.4, Dec. 20, 2005.
Examination Report to Application No. GB 0412876.5, Feb. 13, 2006.
Examination Report to Application No. GB 0415835.8, Dec. 23, 2005.
Examination Report to Application No. GB 0422419.2, Nov. 8, 2005.
Examination Report to Application No. GB 0422893.8, Aug. 8, 2005.
Examination Report to Application No. GB 0422893.8, Dec. 15, 2005.
Examination Report to Application No. GB 0425948.7, Nov. 24, 2005.
Examination Report to Application No. GB 0425956.0, Nov. 24, 2005.
Examination Report to Application No. GB 0428141.6, Feb. 21, 2006.
Examination Report to Application No. GB 0428141.6, Jul. 18, 2006.
Examination Report to Application No. GB 0500275.3, Apr. 5, 2006.
Examination Report to Application No. GB 0501667.0, Jan. 27, 2006.
Examination Report to Application No. GB 0503250.3, Nov. 15, 2005.
Examination Report to Application No. GB 0503250.3, Mar. 2, 2006.
Examination Report to Application No. GB 0503250.3, Aug. 11, 2006.
Examination Report to Application No. GB 0506699.8, May 11, 2006.
Examination Report to Application No. GB 0506700.4, May 16, 2006.
Examination Report to Application No. GB 0506702.0, May 11, 2006.
Examination Report to Application No. GB 0506702.0, Jul. 24, 2006.
Examination Report to Application No. GB 0507979.3, Jun. 16, 2005.
Examination Report to Application No. GB 0507979.3, Jan. 17, 2006.
Examination Report to Application No. GB 0507979.3, Jun. 6, 2006.
Examination Report to Application No. GB 0507980.1, Sep. 29, 2005.
Examination Report to Application No. GB 0509618.5, Feb. 3, 2006.
Examination Report to Application No. GB 0509620.1, Feb. 14, 2006.
Examination Report to Application No. GB 0509627.6, Feb. 3, 2006.
Examination Report to Application No. GB 0509629.2, Feb. 3, 2006.
Examination Report to Application No. GB 0509630.0, Feb. 3, 2006.
Examination Report to Application No. GB 0509630.0, May 11, 2006.

Examination Report to Application No. GB 0509630.0, Jun. 6, 2006.
Examination Report to Application No. GB 0509631.8, Feb. 14, 2006.
Examination Report to Application No. GB 0517448.7, Nov. 9, 2005.
Examination Report to Application No. GB 0517448.7, Jul. 19, 2006.
Examination Report to Application No. GB 0518025.2, Oct. 27, 2005.
Examination Report to Application No. GB 0518025.2, May 25, 2006.
Examination Report to Application No. GB 0518039.3, Nov. 29, 2005.
Examination Report to Application No. GB 0518039.3, Aug. 2, 2006.
Examination Report to Application No. GB 0518252.2, Oct. 28, 2005.
Examination Report to Application No. GB 0518252.2, May 25, 2006.
Examination Report to Application No. GB 0518799.2, Nov. 9, 2005.
Examination Report to Application No. GB 0518799.2, Jun. 14, 2006.
Examination Report to Application No. GB 0518893.3, Dec. 16, 2005.
Examination Report to Application No. GB 0518893.3, Jul. 28, 2006.
Examination Report to Application No. GB 0519989.8, Mar. 8, 2006.
Examination Report to Application No. GB 0521024.0, Dec. 22, 2005.
Examination Report to Application No. GB 0521931.6, Nov. 8, 2006.
Examination Report to Application No. GB 0522050.4, Dec. 13, 2005.
Examination Report to Application No. GB 0522892.9, Aug. 14, 2006.
Examination Report to Application No. GB 0602877.3, Mar. 20, 2006.
Examination Report to Application No. GB 0603576.0, Apr. 5, 2006.
Examination Report to Application No. GB 0603576.0, Nov. 10, 2006.
Examination Report to Application No. GB 0603656.0, May 3, 2006.
Examination Report to Application No. GB 0603656.0, Nov. 9, 2006.
Examination Report to Application No. GB 0603995.2, Apr. 25, 2006.
Examination Report to Application No. GB 0603996.0, Apr. 27, 2006.
Examination Report to Application No. GB 0604357.4, Apr. 27, 2006.
Examination Report to Application No. GB 0604359.0, Apr. 27, 2006.
Examination Report to Application No. GB 0604360.8, Apr. 26, 2006.
Search and Examination Report to Application No. GB 0412876.5, Sep. 27, 2005.
Search and Examination Report to Application No. GB 0507980.1, Jun. 20, 2006.
Search and Examination Report to Application No. GB 0516429.8, Nov. 7, 2005.
Search and Examination Report to Application No. GB 0516430.6, Nov. 8, 2005.
Search and Examination Report to Application No. GB 0516431.4, Nov. 8, 2005.
Search and Examination Report to Application No. GB 0522052.0, Aug. 8, 2006.
Search and Examination Report to Application No. GB 0522155.1, Mar. 7, 2006.
Search and Examination Report to Application No. GB 0522892.9 Jan. 5, 2006.
Search and Examination Report to Application No. GB 0523075.0, Jan. 12, 2006.
Search and Examination Report to Application No. GB 0523076.8, Dec. 14, 29005.
Search and Examination Report to Application No. GB 0523078.4, Dec. 13, 2005.
Search and Examination Report to Application No. GB 0523132.9, Jan. 12, 2006.
Search and Examination Report to Application No. GB 0524692.1, Dec. 19, 2005.
Search and Examination Report to Application No. GB 0525768.8, Feb. 3, 2006.
Search and Examination Report to Application No. GB 0525770.4, Feb. 3, 2006.
Search and Examination Report to Application No. GB 0525772.0, Feb. 2, 2006.
Search and Examination Report to Application No. GB 0525774.6, Feb. 2, 2006.
Search and Examination Report to Application No. GB 0602877.3, Sep. 25, 2006.
Search and Examination Report to Application No. GB 0609173.0, Jul. 19, 2006.
Search and Examination Report to Application No. GB 0613405.0, Nov. 2, 2006.
Search and Examination Report to Application No. GB 0613406.8, Nov. 2, 2006.
Examination Report to Application No. AU 2003257878, Jan. 19, 2006.
Examination Report to Application No. AU 2003257878, Jan. 30, 2006.
Examination Report to Application No. AU 2003257881, Jan. 19, 2006.
Examination Report to Application No. AU 2003257881, Jan. 30, 2006.
Examination Report to Application No. AU 2004202805, Jun. 14, 2006.
Examination Report to Application No. AU 2004202809, Jun. 14, 2006.
Examination Report to Application No. AU 2004202812, Jun. 14, 2006.
Examination Report to Application No. AU 2004202813, Jun. 14, 2006.
Examination Report to Application No. AU 2004202815, Jun. 14, 2006.
Search Report to Application No. EP 03071281.2; Nov. 7, 2005.
Search Report to Application No. EP 03071281.2; Nov. 14, 2005.
Search Report to Application No. EP 03723674.2; Nov. 22, 2005.
Search Report to Application No. EP 03723674.2; May 2, 2006.
Search Report to Application No. EP 03728326.4; Mar. 13, 2006.
Search Report to Application No. EP 03728326.4; Apr. 24, 2006.
Search Report to Application No. EP 03752486.5; Feb. 8, 2006.
Examination Report to Application No. EP 03752486.5; Jun. 28, 2006.
Search Report to Application No. EP 03759400.9; Mar. 3, 2006.
Search Report to Application No. EP 03759400.9; Mar. 24, 2006.
Search Report to Application No. EP 03793078.1; Mar. 21, 2006.
Search Report to Application No. EP 03793078.1; Jun. 16, 2006.

MAGNETIC IMPULSE APPLIED SLEEVE METHOD OF FORMING A WELLBORE CASING

CROSS REFERENCE TO RELATED APPLICATIONS

The present application is the National Stage patent application for PCT patent application Ser. No. PCT/US2003/025677, filed on Aug. 18, 2003, which claimed the benefit of the filing dates of (1) U.S. provisional patent application Ser. No. 60/405,610, filed on Aug. 23, 2002, the disclosures of which are incorporated herein by reference.

The present application is related to the following: (1) U.S. patent application Ser. No. 09/454,139, filed on Dec. 3, 1999, (2) U.S. patent application Ser. No. 09/510,913, filed on Feb. 23, 2000, (3) U.S. patent application Ser. No. 09/502,350, filed on Feb. 10, 2000, (4) U.S. Pat. No. 6,328,113, (5) U.S. patent application Ser. No. 09/523,460, filed on Mar. 10, 2000, (6) U.S. patent application Ser. No. 09/512,895, filed on Feb. 24, 2000, (7) U.S. patent application Ser. No. 09/511,941, filed on Feb. 24, 2000, (8) U.S. patent application Ser. No. 09/588,946, filed on Jun. 7, 2000, (9) U.S. patent application Ser. No. 09/559,122, filed on Apr. 26, 2000, (10) PCT patent application Ser. No. PCT/US00/18635, filed on Jul. 9, 2000, (11) U.S. provisional patent application Ser. No. 60/162,671, filed on Nov. 1, 1999, (12) U.S. provisional patent application Ser. No. 60/154,047, filed on Sep. 16, 1999, (13) U.S. provisional patent application Ser. No. 60/159,082, filed on Oct. 12, 1999, (14) U.S. provisional patent application Ser. No. 60/159,039, filed on Oct. 12, 1999, (15) U.S. provisional patent application Ser. No. 60/159,033, filed on Oct. 12, 1999, (16) U.S. provisional patent application Ser. No. 60/212,359, filed on Jun. 19, 2000, (17) U.S. provisional patent application Ser. No. 60/165,228, filed on Nov. 12, 1999, (18) U.S. provisional patent application Ser. No. 60/221,443, filed on Jul. 28, 2000, (19) U.S. provisional patent application Ser. No. 60/221,645, filed on Jul. 28, 2000, (20) U.S. provisional patent application Ser. No. 60/233,638, filed on Sep. 18, 2000, (21) U.S. provisional patent application Ser. No. 60/237,334, filed on Oct. 2, 2000, (22) U.S. provisional patent application Ser. No. 60/270,007, filed on Feb. 20, 2001, (23) U.S. provisional patent application Ser. No. 60/262,434, filed on Jan. 17, 2001, (24) U.S. provisional patent application Ser. No. 60/259,486, filed on Jan. 3, 2001, (25) U.S. provisional patent application Ser. No. 60/303,740, filed on Jul. 6, 2001, (26) U.S. provisional patent application Ser. No. 60/313,453, filed on Aug. 20, 2001, (27) U.S. provisional patent application Ser. No. 60/317,985, filed on Sep. 6, 2001, (28) U.S. provisional patent application Ser. No. 60/3318,386, filed on Sep. 10, 2001, (29) U.S. patent application Ser. No. 09/969,922, filed on Oct. 3, 2001, (30) U.S. patent application Ser. No. 10/016,467, filed on Dec. 10, 2001; (31) U.S. provisional patent application Ser. No. 60/343,674, filed on Dec. 27, 2001; (32) U.S. provisional patent application Ser. No. 60/346,309, filed on Jan. 7, 2002; (33) U.S. provisional patent application Ser. No. 60/372,048, filed on Apr. 12, 2002; (34) U.S. provisional patent application Ser. No. 60/380,147, filed on May 6, 2002; (35) U.S. provisional patent application Ser. No. 60/387,486, filed on Jun. 10, 2002; (36) U.S. provisional patent application Ser. No. 60/387,961, filed on Jun. 12, 2002; (37) U.S. provisional patent application Ser. No. 60/391,703, filed on Jun. 26, 2002; (38) U.S. provisional patent application Ser. No. 60/397,284, filed on Jul. 19, 2002, and (39) U.S. provisional patent application Ser. No. 60/405,394, filed on Aug. 23, 2003, the disclosures of which are incorporated herein by reference.

BACKGROUND OF THE INVENTION

This invention relates generally to oil and gas exploration, and in particular to forming and repairing wellbore casings to facilitate oil and gas exploration.

Conventionally, when a wellbore is created, a number of casings are installed in the borehole to prevent collapse of the borehole wall and to prevent undesired outflow of drilling fluid into the formation or inflow of fluid from the formation into the borehole. The borehole is drilled in intervals whereby a casing which is to be installed in a lower borehole interval is lowered through a previously installed casing of an upper borehole interval. As a consequence of this procedure the casing of the lower interval is of smaller diameter than the casing of the upper interval. Thus, the casings are in a nested arrangement with casing diameters decreasing in downward direction. Cement annuli are provided between the outer surfaces of the casings and the borehole wall to seal the casings from the borehole wall. As a consequence of this nested arrangement a relatively large borehole diameter is required at the upper part of the wellbore. Such a large borehole diameter involves increased costs due to heavy casing handling equipment, large drill bits and increased volumes of drilling fluid and drill cuttings. Moreover, increased drilling rig time is involved due to required cement pumping, cement hardening, required equipment changes due to large variations in hole diameters drilled in the course of the well, and the large volume of cuttings drilled and removed.

During oil exploration, a wellbore typically traverses a number of zones within a subterranean formation. Wellbore casings are then formed in the wellbore by radially expanding and plastically deforming tubular members that are coupled to one another by threaded connections. Existing methods for radially expanding and plastically deforming tubular members coupled to one another by threaded connections are not always reliable, and do not always produce satisfactory results. In particular, the threaded connections can be damaged during the radial expansion process. Furthermore, the threaded connections between adjacent tubular members, whether radially expanded or not, are typically not sufficiently coupled to permit the transmission of energy through the tubular members from the surface to the downhole location.

The present invention is directed to overcoming one or more of the limitations of the existing procedures for forming new sections of casing in a wellbore.

SUMMARY OF THE INVENTION

According to one aspect of the present invention, a method of forming a wellbore casing within a borehole that traverses a subterranean formation is provided that includes externally applied tubular sleeve for improved sealing a wellbore casing joints.

According to another aspect of the present invention, a method of forming a wellbore casing within a borehole that traverses a subterranean formation is provided that includes magnetic impulse method for externally applying a tubular sleeve for improved sealing of wellbore casing joints.

According to another aspect of the present invention, a method of forming a wellbore casing within a borehole that traverses a subterranean formation is provided that includes expanding joined tubular members such as joined wellbore casings with a tubular sleeve externally applied to the surfaces of the joined wellbore casing and overlapping the joint thereby maintaining an improved seal of the wellbore casing joints after expansion.

According to another aspect of the present invention, a method of improving the seal of tubular members that are connected and then expanded is provided, that includes using a magnetic impulse method for externally applying a tubular sleeve to the joint between the tubular members prior to expanding the connected tubular members.

According to another aspect of the present invention, an improved method of connecting wellbore casing tubular member is provided that includes forming raised ring portions to enhance surface contact stress in the coupling connection and subsequently applying inward radial force with a tubular sleeve imposed by magnetic impulse method for improved sealing of the joints between the tubular members.

DETAILED DESCRIPTION OF THE ILLUSTRATIVE EMBODIMENTS

Figure 1:
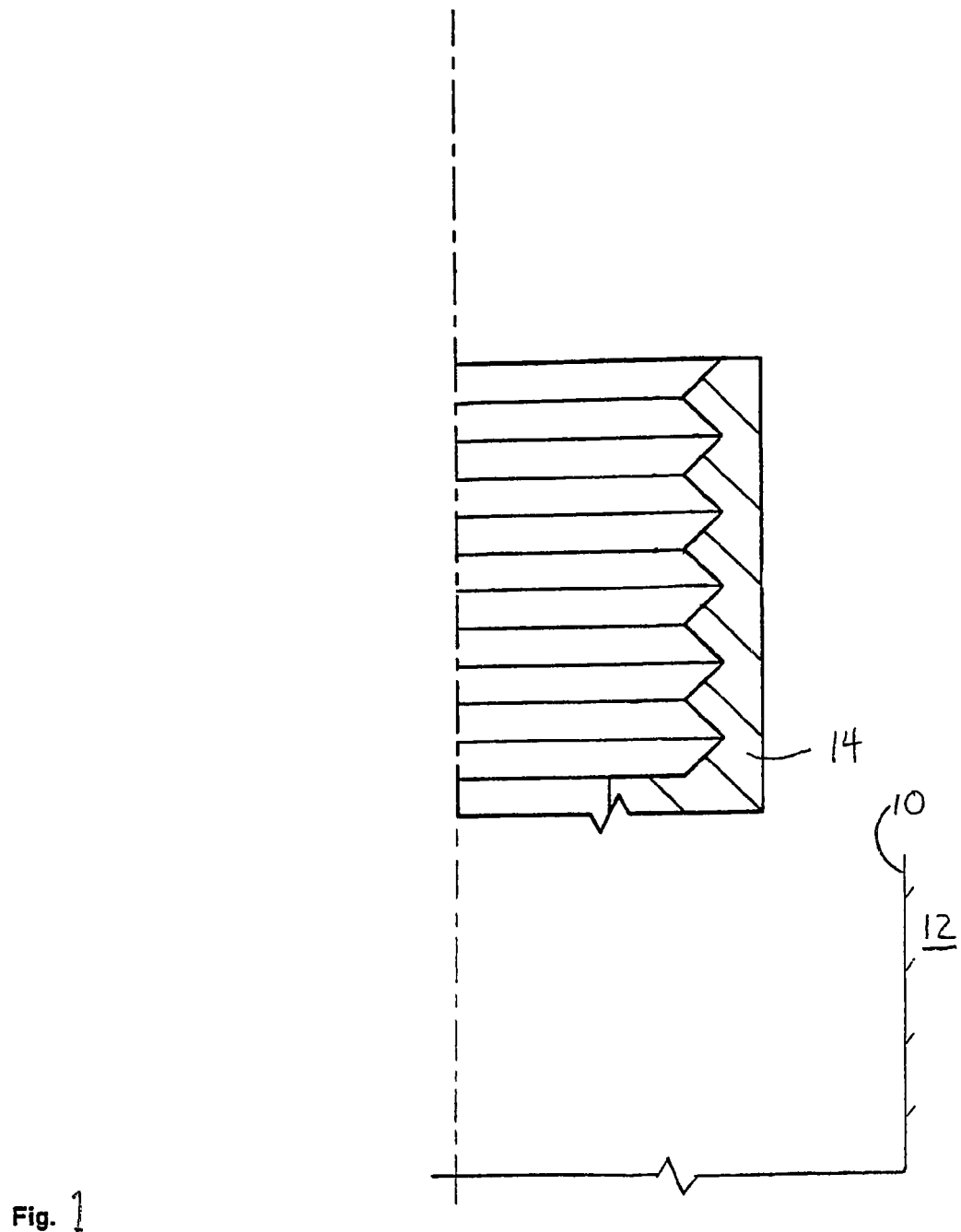
FIG. 1 is a fragmentary cross-sectional schematic illustration of a first tubular member, such a first wellbore casing, for placement within a borehole that traverses a subterranean formation.

Referring to FIG. 1, a borehole 10 that traverses a subterranean formation 12 includes a first tubular member 14, such as a first wellbore casing 14 that is positioned within and coupled to the borehole. In several exemplary embodiments, tubular members in the form of wellbore casings will be described and depicted. It will be understood that although the methods, particularly advantageous for forming wellbore casings, certain advantageous features may also be applicable to other tubular members as described and claimed herein. In an illustrative embodiment, the first wellbore casing 14 may, for example, be positioned within and coupled to the borehole 10 using any number of conventional methods and apparatus, that may or may not include radial expansion and plastic deformation of the first wellbore casing 14, and/or using one or more of the methods and apparatus disclosed in one or more of the following: (1) U.S. patent application Ser. No. 09/454,139, filed on Dec. 3, 1999, (2) U.S. patent application Ser. No. 09/510,913, filed on Feb. 23, 2000, (3) U.S. patent application Ser. No. 09/502,350, filed on Feb. 10, 2000, (4) U.S. Pat. No. 6,328,113, (5) U.S. patent application Ser. No. 09/523,460, filed on Mar. 10, 2000, (6) U.S. patent application Ser. No. 09/512,895, filed on Feb. 24, 2000, (7) U.S. patent application Ser. No. 09/511,941, filed on Feb. 24, 2000, (8) U.S. patent application Ser. No. 09/588,946, filed on Jun. 7, 2000, (9) U.S. patent application Ser. No. 09/559,122, filed on Apr. 26, 2000, (10) PCT patent application Ser. No. PCT/US00/18635, filed on Jul. 9, 2000, (11) U.S. provisional patent application Ser. No. 60/162,671, filed on Nov. 1, 1999, (12) U.S. provisional patent application Ser. No. 60/154,047, filed on Sep. 16, 1999, (13) U.S. provisional patent application Ser. No. 60/159,082, filed on Oct. 12, 1999, (14) U.S. provisional patent application Ser. No. 60/159,039, filed on Oct. 12, 1999, (15) U.S. provisional patent application Ser. No. 60/159,033, filed on Oct. 12, 1999, (16) U.S. provisional patent application Ser. No. 60/212,359, filed on Jun. 19, 2000, (17) U.S. provisional patent application Ser. No. 60/165,228, filed on Nov. 12, 1999, (18) U.S. provisional patent application Ser. No. 60/221,443, filed on Jul. 28, 2000, (19) U.S. provisional patent application Ser. No. 60/221,645, filed on Jul. 28, 2000, (20) U.S. provisional patent application Ser. No. 60/233,638, filed on Sep. 18, 2000, (21) U.S. provisional patent application Ser. No. 60/237,334, filed on Oct. 2, 2000, (22) U.S. provisional patent application Ser. No. 60/270,007, filed on Feb. 20, 2001, (23) U.S. provisional patent application Ser. No. 60/262,434, filed on Jan. 17, 2001, (24) U.S, provisional patent application Ser. No. 60/259,486, filed on Jan. 3, 2001, (25) U.S. provisional patent application Ser. No. 60/303,740, filed on Jul. 6, 2001, (26) U.S. provisional patent application Ser. No. 60/313,453, filed on Aug. 20, 2001, (27) U.S. provisional patent application Ser. No. 60/317,985, filed on Sep. 6, 2001, (28) U.S. provisional patent application Ser. No. 60/3318,386, filed on Sep. 10, 2001, (29) U.S. utility patent application Ser. No. 09/969,922, filed on Oct. 3, 2001, (30) U.S. utility patent application Ser. No. 10/016,467, filed on Dec. 10, 2001; (31) U.S. provisional patent application Ser. No. 60/343,674, filed on Dec. 27, 2001; (32) U.S. provisional patent application Ser. No. 60/346,309, filed on Jan. 7, 2002; (33) U.S. provisional patent application Ser. No. 60/372,048, filed on Apr. 12, 2002; (34) U.S. provisional patent application Ser. No. 60/380,147, filed on May 6, 2002; (35) U.S. provisional patent application Ser. No. 60/387,486, filed on Jun. 10, 2002; (36) U.S. provisional patent application Ser. No. 60/387,961, filed on Jun. 12, 2002; (37) U.S. provisional patent application Ser. No. 60/391,703, filed on Jun. 26, 2002; (38) U.S. provisional patent application Ser. No. 60/397,284, filed on Jul. 19, 2002, and (39) U.S. provisional patent application Ser. No. 60/405,394, filed on Aug. 23, 2003, the disclosures of which are incorporated herein by reference.

Figure 2:
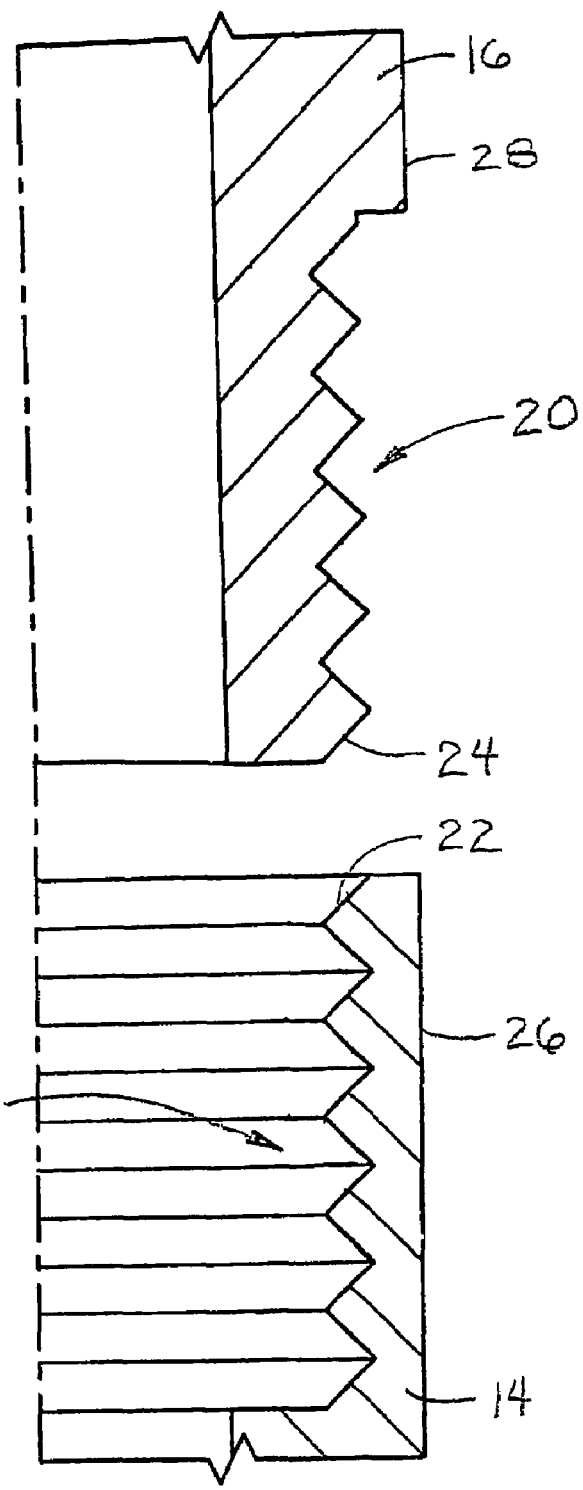
FIG. 2 is a fragmentary cross-sectional schematic illustration of the first tubular member, such as the first wellbore casing as in FIG. 1 and an aligned second tubular member, such as a second wellbore casing in position for coupling together and for placing the first and second tubular members, such as the depicted wellbore casings within a borehole.

Referring to FIG. 2, the second tubular member 16, such as second wellbore casing 16 is then overlappingly coupled to the first wellbore casing 14 for positioning within the borehole 10. In several exemplary embodiments, the first wellbore casing 14 may, for example, be coupled at a first coupling portion 18 to a second coupling portion 20 of the second wellbore casing 16 using any number of conventional methods and apparatus. For example as shown in FIG. 2, the coupling may comprise a male, or externally, threaded portion 24 engaged with a female, or internally, threaded portion 26. The method of coupling may or may not include radial expansion and plastic deformation of either of the wellbore casings 14 or 16 or both, and or using one of more of the methods disclosed in one of more of the following: (1) U.S. patent application Ser. No. 09/454,139, filed on Dec. 3, 1999, (2) U.S. patent application Ser. No. 09/510,913, filed on Feb. 23, 2000, (3) U.S. patent application Ser. No. 09/502,350, filed on Feb. 10, 2000, (4) U.S. Pat. No. 6,328,113, (5) U.S. patent application Ser. No. 09/523,460, filed on Mar. 10, 2000, (6) U.S. patent application Ser. No. 09/512,895, filed on Feb. 24, 2000, (7) U.S. patent application Ser. No. 09/511,941, filed on Feb. 24, 2000, (8) U.S. patent application Ser. No. 09/588,946, filed on Jun. 7, 2000, (9) U.S. patent application Ser. No. 09/559,122, filed on Apr. 26, 2000, (10) PCT patent application Ser. No. PCT/US00/18635, filed on Jul. 9, 2000, (11) U.S. provisional patent application Ser. No. 60/162,671, filed on Nov. 1, 1999, (12) U.S. provisional patent application Ser. No. 60/154,047, filed on Sep. 16, 1999, (13) U.S. provisional patent application Ser. No. 60/159,082, filed on Oct. 12, 1999, (14) U.S. provisional patent application Ser. No. 60/159,039, filed on Oct. 12, 1999, (15) U.S. provisional patent application Ser. No. 60/159,033, filed on Oct. 12, 1999, (16) U.S. provisional patent application Ser. No. 60/212,359, filed on Jun. 19, 2000, (17) U.S. provisional patent application Ser. No. 60/165,228, filed on Nov. 12, 1999, (18) U.S. provisional patent application Ser. No. 60/221,443, filed on Jul. 28, 2000, (19) U.S. provisional patent application Ser. No. 60/221,645, filed on Jul. 28, 2000, (20) U.S. provisional patent application Ser. No. 60/233,638, filed on Sep. 18, 2000, (21) U.S. provisional patent application Ser. No. 60/237,334, filed on Oct. 2, 2000, (22) U.S. provisional patent application Ser. No. 60/270,007, filed on Feb. 20, 2001, (23) U.S. provisional patent application Ser. No. 60/262,434, filed on Jan. 17, 2001, (24) U.S, provisional patent application Ser. No. 60/259,486, filed on Jan. 3, 2001, (25) U.S. provisional patent application Ser. No. 60/303,740, filed on Jul. 6, 2001, (26) U.S. provisional patent application Ser. No. 60/313,453, filed on Aug. 20, 2001, (27) U.S. provisional patent application Ser. No. 60/317,985, filed on Sep. 6, 2001, (28) U.S. provisional patent application Ser. No. 60/3318,386, filed on Sep. 10, 2001, (29) U.S. utility patent application Ser. No. 09/969,922, filed on Oct. 3, 2001, (30) U.S. utility patent application Ser. No. 10/016,467, filed on Dec. 10, 2001; (31) U.S. provisional patent application Ser. No. 60/343,674, filed on Dec. 27, 2001; (32) U.S. provisional patent application Ser. No. 60/346,309, filed on Jan. 7, 2002; (33) U.S. provisional patent application Ser. No. 60/372,048, filed on Apr. 12, 2002; (34) U.S. provisional patent application Ser. No. 60/380,147, filed on May 6, 2002; (35) U.S. provisional patent application Ser. No. 60/387,486, filed on Jun. 10, 2002; (36) U.S. provisional patent application Ser. No. 60/387,961, filed on Jun. 12, 2002; (37) U.S. provisional patent application Ser. No. 60/391,703, filed on Jun. 26, 2002; (38) U.S. provisional patent application Ser. No. 60/397,284, filed on Jul. 19, 2002, and (39) U.S. provisional patent application Ser. No. 60/405,394, filed on Aug. 23, 2003, the disclosures of which are incorporated herein by reference.

Figure 3:
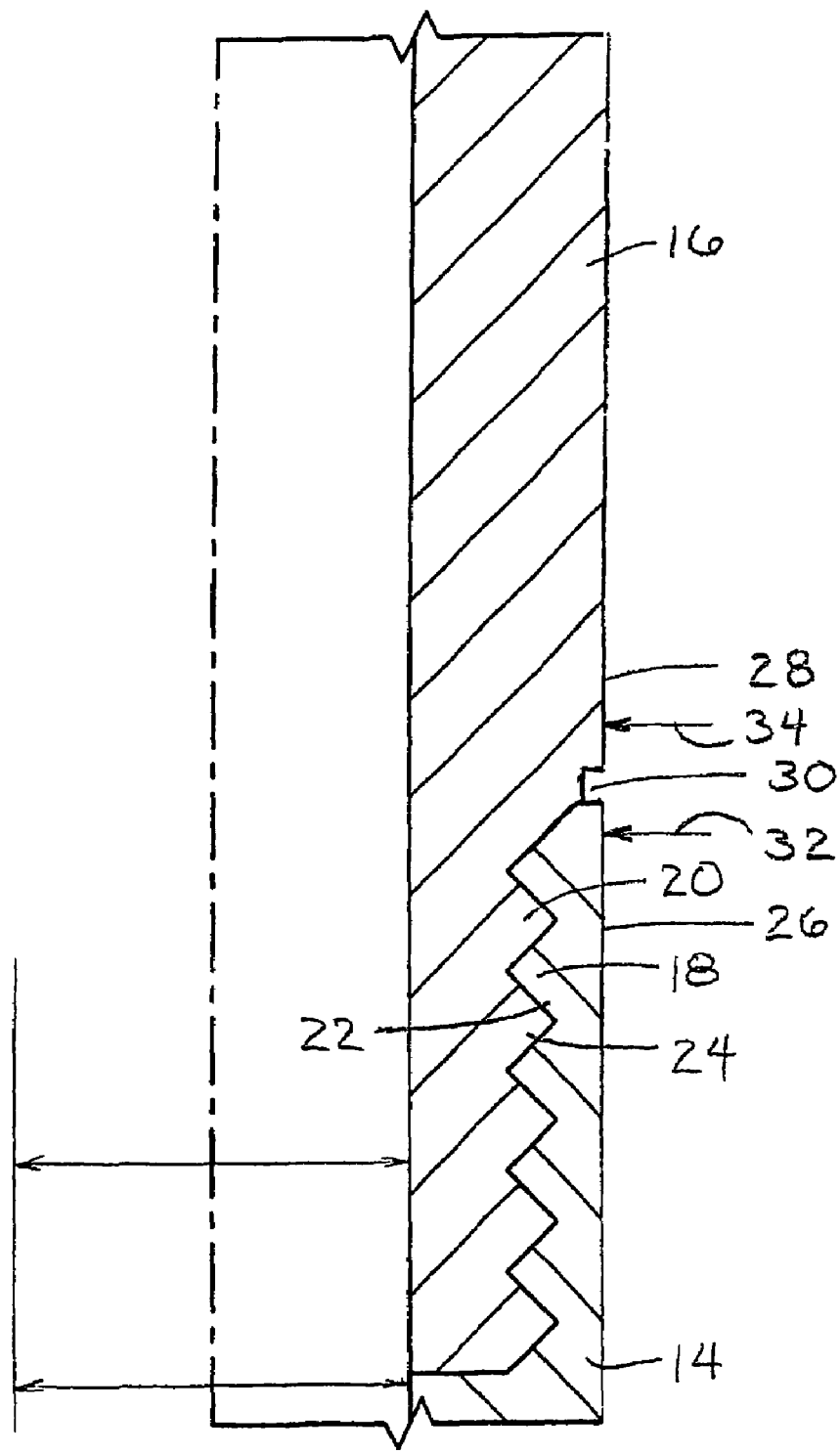
FIG. 3 is a fragmentary cross-sectional schematic illustration of first and second wellbore casings of FIG. 2 after overlapping coupling as with the first female threads and second male threads providing a substantially continuous wellbore that may be radially expanded and plastically deformed at the overlapping portions of the first and second wellbore casings.

Upon coupling the first and second tubular members, such as upon coupling the first and second wellbore casings 14 and 16, as depicted in FIG. 2, a first surface portion 26 and a second surface portion 28 are adjacently positionally in the axial direction and may or may not have the same or nearly the same outside diameters 32 and 34. It would understood that according to the foregoing methods and apparatus for expanding the wellbore casing, the depiction in FIG. 2 and FIG. 3 may or may not demonstrate an overlapping portion that has been previously expanded. In either instance, it is desirable for the present invention that the exterior first outside diameter 32 and the outside diameter 34 have the same or nearly the same dimensions. For further be seen that a joint 30 is formed there between that may include a small gap such as a bevel or partial channel on either member as is conventional for accommodating nicks or dents so that they will not interfere with complete coupling between the first and second wellbore casings.

Figure 4:
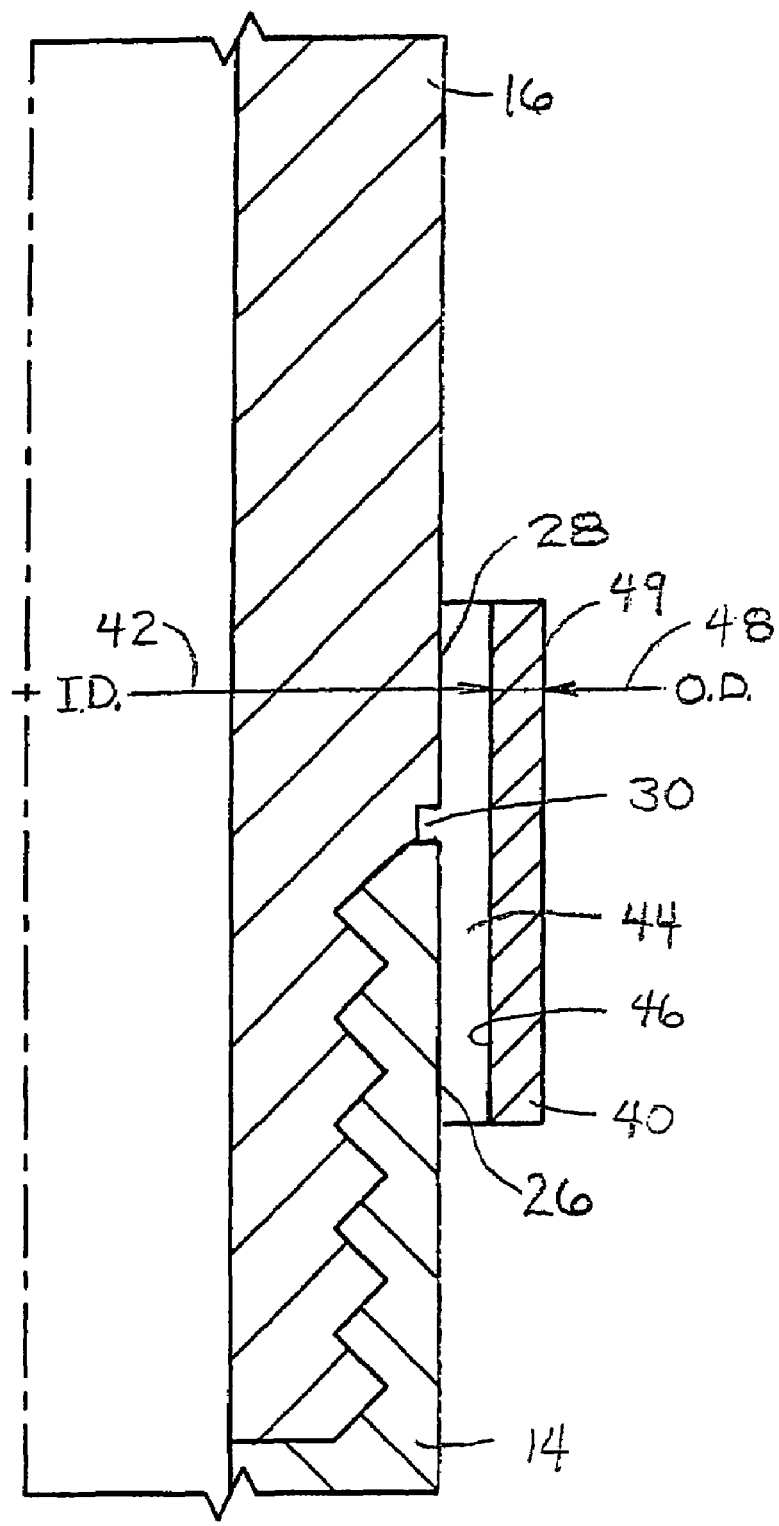
FIG. 4 is a fragmentary cross-sectional schematic illustration of the coupling joint of FIG. 3 after placing a tubular sleeve axially aligned with the first and second wellbore casings, and overlappingly positioned at the joint formed by coupling the first and second wellbore casings.

Referring to FIG. 3, it will again be understood that the first wellbore casing 14 and the second wellbore casing 16 may or may not have been radially expanded in the depiction of FIG. 4. A tubular sleeve 40 is positioned overlapping the first surface portion 26 of the first wellbore casings 14 and also overlapping the second surface portion 28 of the second wellbore casing 16, thereby overlapping the joint 30 and axially extending in either direction there from at least partially over the overlapping coupling as well as partially over a portion of casing 16 that does not overlap first wellbore casing 14.

The tubular sleeve 40 is preferably composed of electrically conductive material that are suitably malleable or flowable to be shaped mechanically, as for example copper, aluminum, light metal, and metal alloys. Steel alloys and other metal alloys with suitable electrically conductivity and with suitable malleability or suitable flow behavior may also be used. The inside diameter 42, of the tubular sleeve 40 is only slightly larger than the outside diameter of at the joint 30 the first tubular member 14 or the second tubular member 16. This means a cylindrical gap 44 between the inside surface 46 of sleeve 40 and the first and outside surfaces 26 and 28 of wellbore casings 14 and 16 respectively. The outside diameter 48 of tubular sleeve 40 is slightly larger than the inside diameter 42 defining a thickness 49 that is relatively thin compared the thickness of the wellbore casings 14 and 16.

Figure 5:
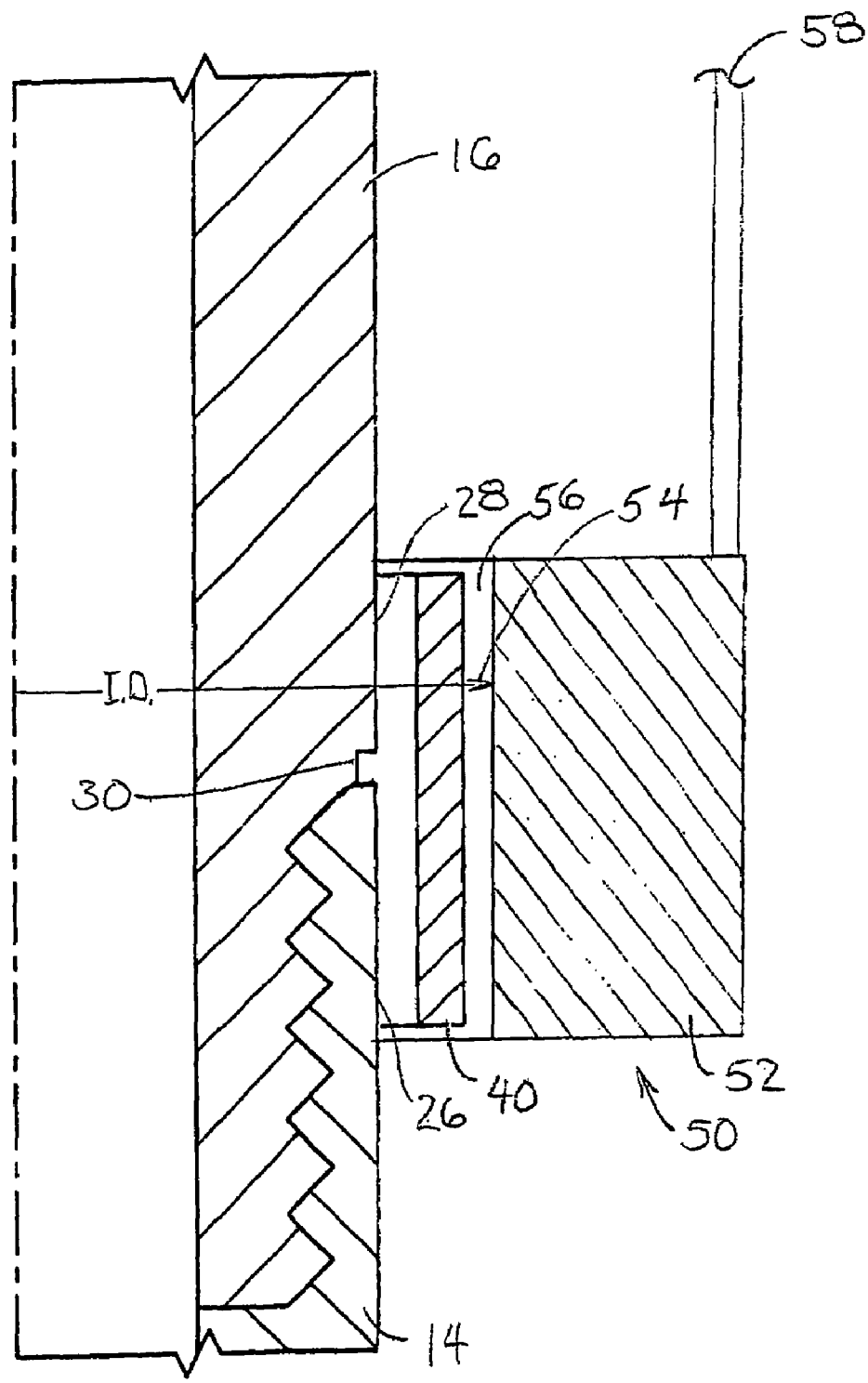
FIG. 5 is a fragmentary cross-sectional schematic illustration of the first and second wellbore casings and of the tubular sleeve of FIG. 4 and further schematically depicting one illustration of a magnetic impulse apparatus positioned at the tubular sleeve for externally applying the tubular sleeve for improved sealing of the joint formed by coupling the wellbore casings together.

FIG. 5 is a schematic illustration of the overlapping wellbore casings 14 and 16 and the overlapping tubular sleeve 40, as in FIG. 4, and further schematically depicts a magnetic impulse energy applicator 50. The impulse energy applicator 50, according to one aspect of the present invention, is aligned with the tubular sleeve at a position overlapping the joint 30 and extending a distance over the surfaces 26 and 28 on either side of the joint 30. The magnetic impulse apparatus 50 may comprise an impulse conductor ring 52 having an inside diameter 54 slightly larger than the outside diameter of the ring 40, thereby leaving a small cylindrical gap 56 there between. Conductor ring 52 is interrupted with a radially extending gap (not shown) and is operatively connected to an impulse generator 58 such that the magnetic impulse power flows circumferentially around conductor ring 52 when applied from the impulse generator 58. This method applied to joints of wellbore casing has not heretofore been known, although there are conventional devices and it is a conventional concept for providing a magnetic impulse for shaping of cylindrical metal parts. Thus, the adaptation of one of more of the methods and apparatus according to one or more of the following may be used in connection with this aspect of the present invention: (1) U.S. Pat. No. 5,444,963 issued to Steingroever, et al., Aug. 29, 1995; (2) U.S. Pat. No. 5,586,460 issued to Steingroever Dec. 24, 1996; (3). U.S. Pat. No. 5,953,805 issued to Steingroever Sep. 21, 1999, as well as the techniques an apparatus is described on the web page of Magnetic-Physics, Inc., with reference to the shaping technique under the trademark Magnetopuls, the disclosures of which are incorporated by reference.

Figure 6:
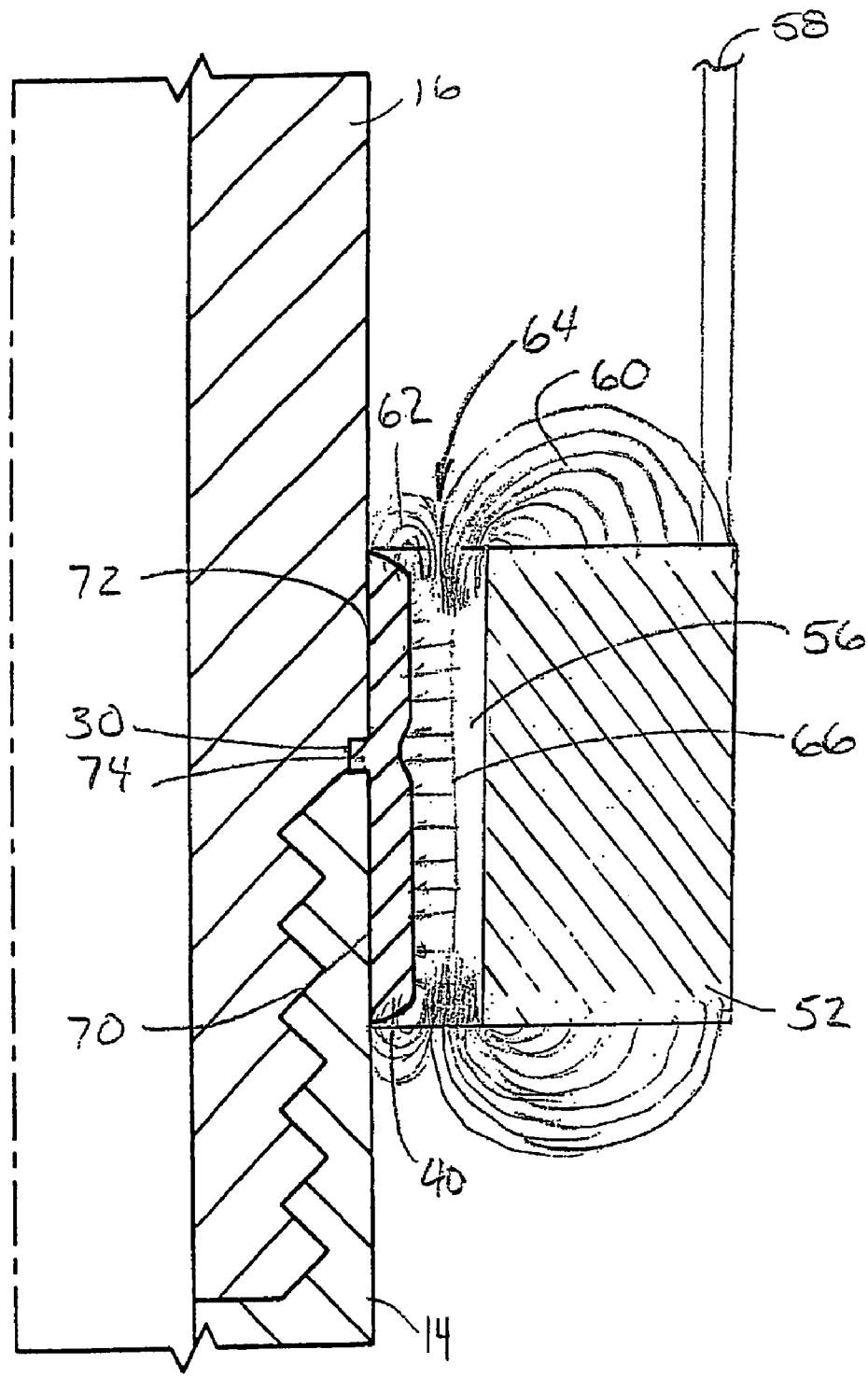
FIG. 6 is a fragmentary cross-sectional schematic illustration of the apparatus of FIG. 5, after applying magnetic impulse force to the tubular sleeve for improved sealing of the joint formed by coupling the first and second wellbore casings of FIG. 5.

With reference to FIG. 6, the method of applying the tubular sleeve to the joint of wellbore casing 14 and 16 may be more fully understood. The magnetic impulse generator 58 provides a magnetic in pulse to the conductor ring 52. The magnetic impulse causes a powerful magnetic field 60 to be produced and simultaneously causes a counter current magnetic pulse 62 to be produced within tubular sleeve 40. An extremely high concentration of magnetic flux at 64 results in the gap 56 between tubular sleeve 40 and impulse ring 52. This high flux concentration due to the magnetic impulse generates a large force 66 inward from the ring 52 thereby collapsing tubular sleeve 40 onto the surfaces 26 and 28 at the joint. This effectively forms a first sealing interface 70 between the first surface 26 and the inside surface 44 of the tubular sleeve, and also forms a sealing interface 72 between the inside surface 44 of the tubular sleeve and the surface 28 of the second wellbore casing. With sufficiently high force, the malleable or flowable material from which tubular sleeve 40 is made, flows at 74 into the joint gap 30. This method produces a surface to surface air tight metallic seal entirely over the coupling between the first wellbore casing 14 and the second wellbore casing 16. The strength of the tubular sleeve 40 also holds the joint together during the process of mechanical expansion of the wellbore casing at the joint.

Figure 7:
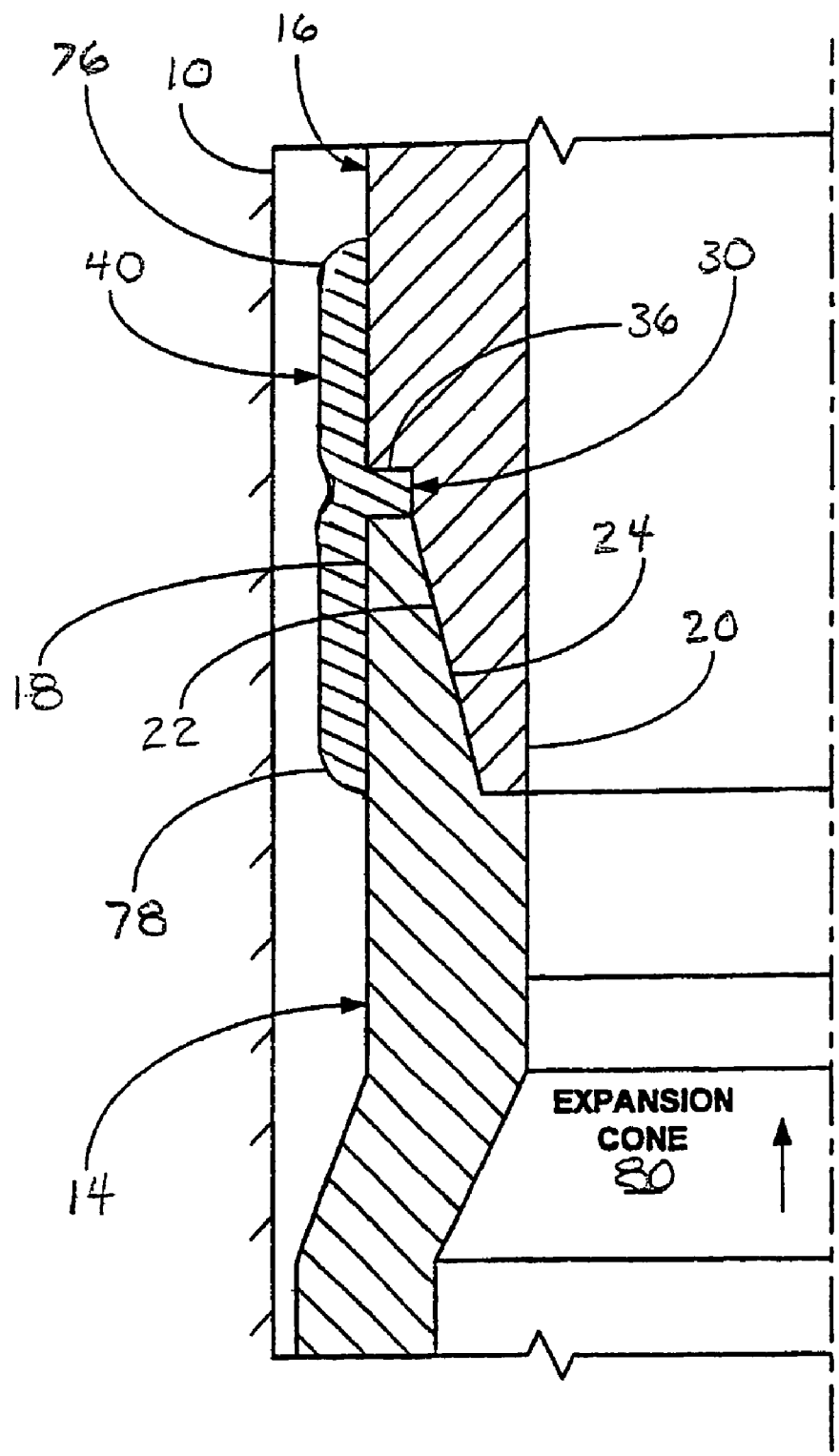
FIG. 7 is a fragmentary cross-sectional schematic illustration of a joint of a first and second tubular member, such as a first and second wellbore casing, having a tubular sleeve externally applied to the adjacent external surfaces of the first and second tubular members at the overlapping joint there between prior to expanding the first and second tubular members at the area of the joint, according to one aspect of the present invention.
Figure 8:
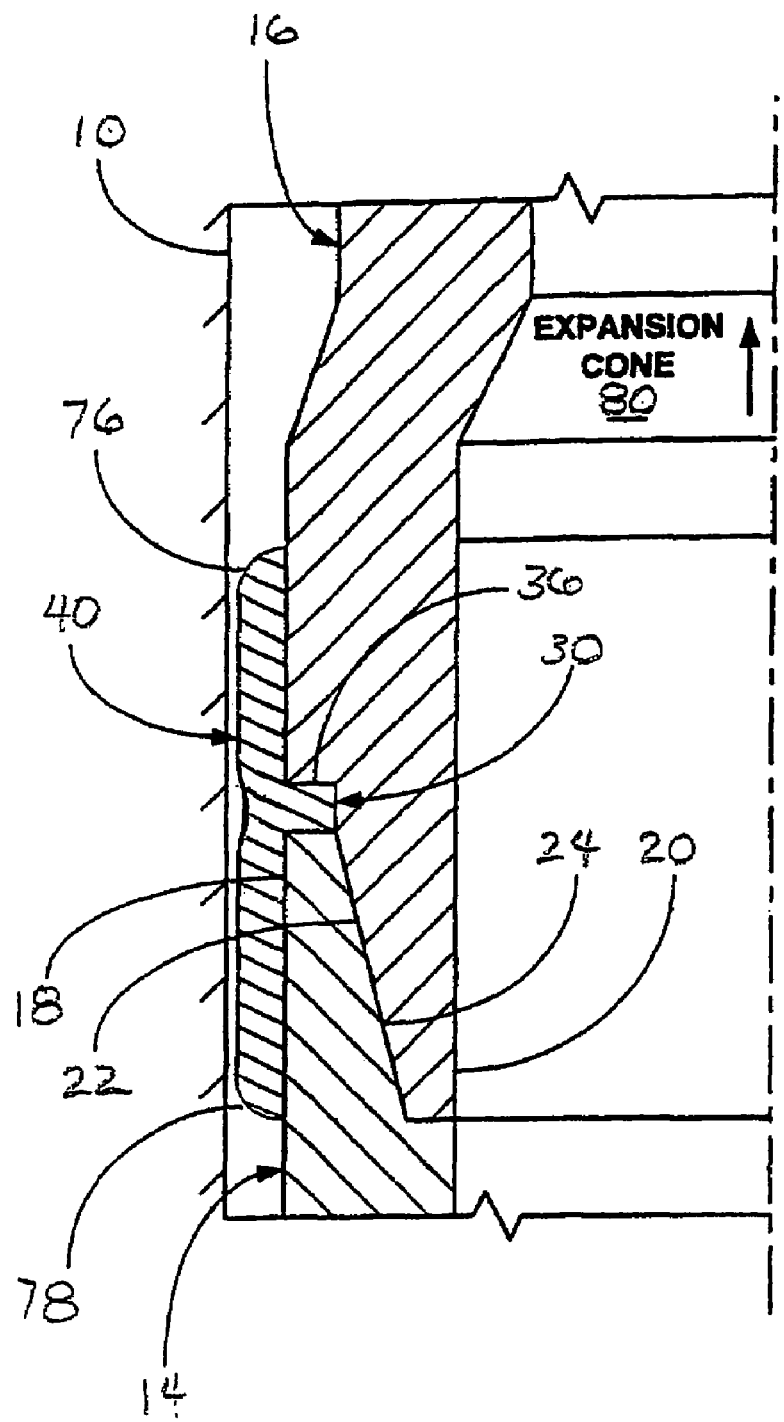
FIG. 8 is a fragmentary cross-sectional schematic illustration of the apparatus of FIG. 7, after the coupled portion of the first and second tubular member wellbore casings and the externally applied tubular sleeve have been radially expanded and plastically deformed according to one aspect of the present invention.

In an exemplary embodiment, as illustrated in FIGS. 7 and 8, the first and second tubular members, 14 and 16, and the tubular sleeve 40 may then be positioned within another structure 10 such as, for example, a wellbore 10, and radially expanded and plastically deformed, for example, by moving an expansion cone 80 through the interiors of the first and second tubular members 14 and 16. The tapered portions, 76 and 78, of the tubular sleeve 40 as may result from material flow due to large magnetic force of the type of material of sleeve 40 and facilitate the insertion and movement of the first and second tubular members 14 and 16 within and through the structure 10, and the movement of the expansion cone 80 through the interiors of the first and second tubular members, 14 and 16, may be from top to bottom or from bottom to top.

In an exemplary embodiment, during the radial expansion and plastic deformation of the first and second tubular members, 14 and 16, the tubular sleeve 40 is also radially expanded and plastically deformed. In an exemplary embodiment, as a result, the tubular sleeve 40 may be maintained in circumferential tension and the overlapping end coupling portions, 18 and 20, of the first and second tubular members, 14 and 16, may be maintained in circumferential compression.

Figure 9:
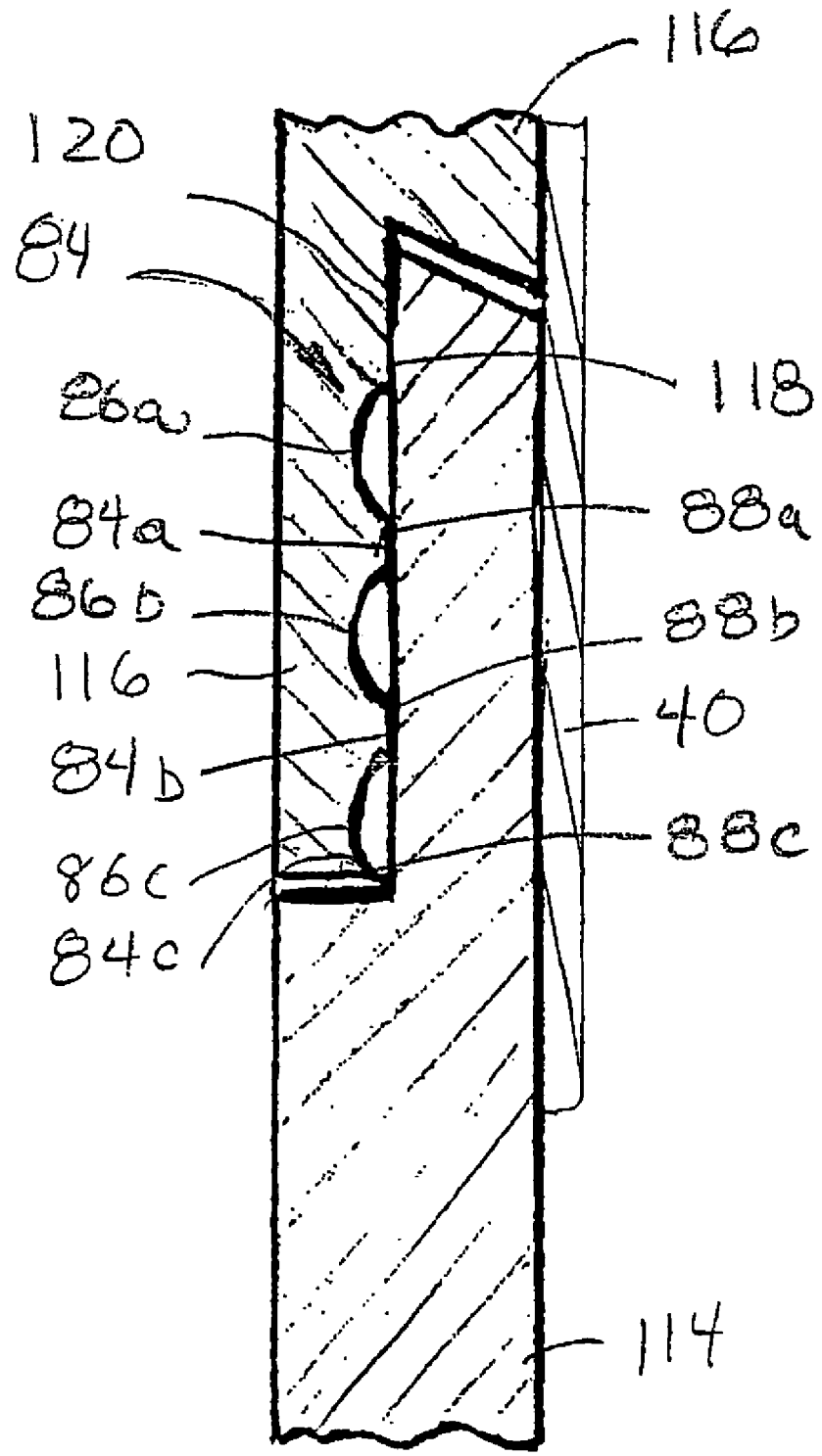
FIG. 9 is a fragmentary cross-sectional schematic illustration of the first female coupling and second male coupling and overlapping tubular sleeve with raised ridges interposed between the couplings to increase the surface to surface contact stress for maintaining sealing contact upon expanding and plastically deforming the coupling and tubular sleeve at the overlapping portions of the first and second tubular members.

In FIG. 9, a fragmentary cross-sectional schematic illustration shows an exemplary embodiment of method and apparatus in which first and second tubular members 114 and 116 are overlapping coupled together, as with a first coupling portion 118 and a second coupling portion 120 pressed together in surface-to-surface engagement, and with an overlapping tubular sleeve 40 applied to the exterior thereof and providing a substantially continuous tubular assembly that may be expanded and plastically deformed. The first coupling portion 118 and the second coupling portion 120 may be overlappingly coupled together, as with a first female coupling portion and a second male coupling portion pushed, slid or pressed together in surface-to-surface engagement, and An overlapping tubular sleeve 40 is applied to the coupling to provide sealing and to stress the tubular coupling portions toward each other. In an exemplary embodiment, one or more raised ridge rings 84(a-c) and corresponding troughs rings 86(a-c) are formed interposed between the first and second couplings to increase the surface to surface contact stress for maintaining sealing contact upon expanding and plastically deforming the coupling and tubular sleeve at the overlapping portions of the first and second tubular members. In this method and apparatus the peaks 88(a-c) of the ridges 84(a-c) have a small area of surface contact with the opposed coupling portion, compared to the entire overlapping coupling area, such that the stress or force per area of contact is significantly increased thereby facilitating the surface to surface seal at the coupling joint. Although the ridge rings 84 are shown formed in the second male coupling portion with the peaks toward the first female male coupling portion, it will be understood based upon this disclosure that the ridge rings 84 might alternatively be formed on the female coupling portion 118 with the peaks toward the female coupling portion 120. The tubular sleeve 40 as applied to the exterior of the overlapping tubular members increases the sealing stress. In a further exemplary embodiment, the tubular sleeve 40 acting together with the raised ridge rings 84 work together to maintain the seal when the tubular members 114 and 116 are expanded and plastically deformed as disclosed herein.

Figure 10:
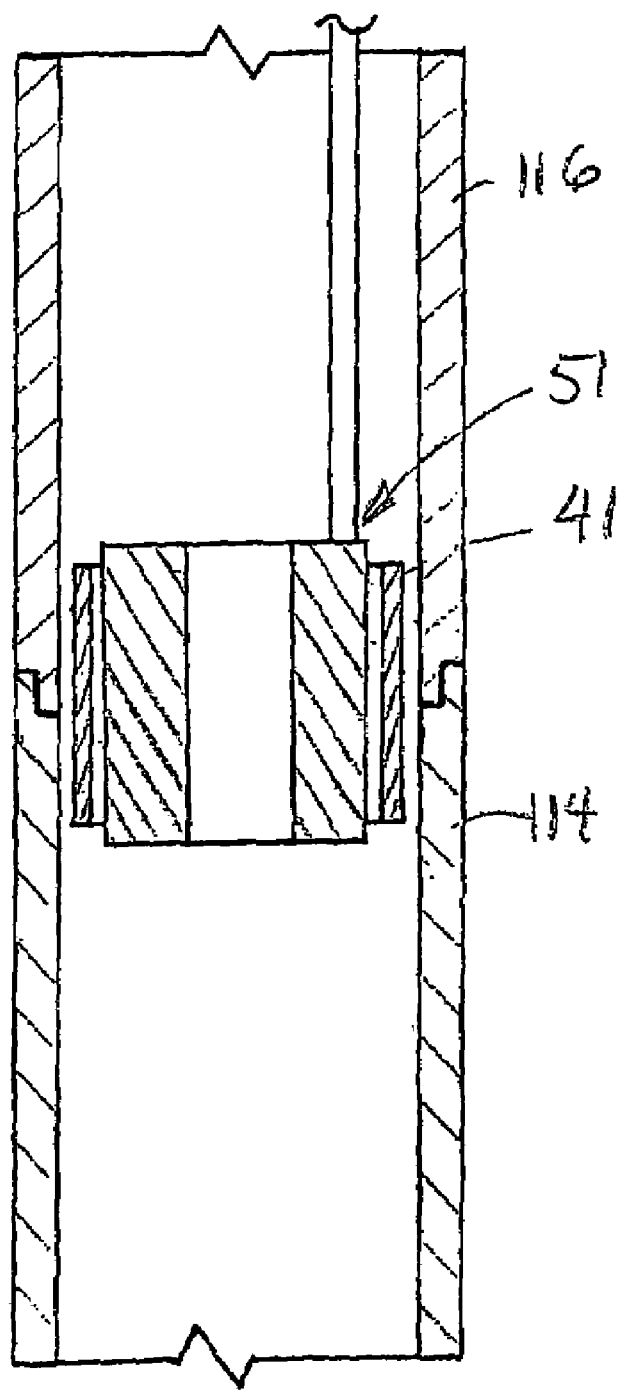
FIG. 10 is a fragmentary cross-sectional schematic illustration of an alternative embodiment of the invention in which an interior tubular sleeve 41 is aligned with the coupling joint between tubular members and the interior tubular sleeve 41 is forced outward and applied to the interior surfaces of the tubular members by a magnetic impulse device.

FIG. 10 depicts another exemplary embodiment of the invention in which an interior tubular sleeve 41 is aligned with coupling joint between tubular members 14 and 16. Before or after expanding the tubular members the interior tubular sleeve 41 is forced outward by magnetic impulse device 51 in a conventional manner or the adaptation of one of more of the methods and apparatus according to one or more of the following may be used in connection with this aspect of the present invention: (1) U.S. Pat. No. 5,444,963 issued to Steingroever, et al., Aug. 29, 1995; (2) U.S. Pat. No. 5,586,460 issued to Steingroever Dec. 24, 1996; (3). U.S. Pat. No. 5,953,805 issued to Steingroever Sep. 21, 1999, as well as the techniques an apparatus is described on the web page of Magnetic-Physics, Inc., with reference to the shaping technique under the trademark Magnetopuls, the disclosures of which are incorporated by reference. The interior sleeve 41 is applied to the interior surfaces of the tubular members overlapping the coupling joint and thereby facilitates sealing and connection between the tubular members.

As more fully disclosed in U.S. provisional patent application No. 60/405,394, filed on Aug. 23, 2002, the disclosure of which is incorporated herein by reference, one or more layers or coatings of softer material, preferably metallic material having a modulus of elasticity lower than the modulus of elasticity of the tubular members at the coupling joint, may be interposed between the joints, to facilitate sealing before and after expanding and plastically deforming joined tubular members such as wellbore casings. The interposed material may also be a material of the type having a lower melting point before deformation than after deformation. For example the material may be an exothermic material that initially releases energy upon stress or heat input thereby melting or plastically flowing at one temperature and subsequently without the further release of such heat energy having a higher melting point or plastic flow temperature.

In several exemplary embodiments, the first and second tubular members, 14 and 16, are radially expanded and plastically deformed using the expansion cone 80 in a conventional manner and/or using one or more of the methods and apparatus disclosed in one or more of the following: (1) U.S. patent application Ser. No. 09/454,139, filed on Dec. 3, 1999, (2) U.S. patent application Ser. No. 09/510,913, filed on Feb. 23, 2000, (3) U.S. patent application Ser. No. 09/502,350, filed on Feb. 10, 2000, (4) U.S. patent application Ser. No. 09/440,338, filed on Nov. 15, 1999, (5) U.S. patent application Ser. No. 09/523,460, filed on Mar. 10, 2000, (6) U.S. patent application Ser. No. 09/512,895, filed on Feb. 24, 2000, (7) U.S. patent application Ser. No. 09/511,941, filed on Feb. 24, 2000, (8) U.S. patent application Ser. No. 09/588,946, filed on Jun. 7, 2000, (9) U.S. patent application Ser. No. 09/559,122, filed on Apr. 26, 2000, (10) PCT patent application Ser. No. PCT/US00/18635, filed on Jul. 9, 2000, (11) U.S. provisional patent application Ser. No. 60/162,671, filed on Nov. 1, 1999, (12) U.S. provisional patent application Ser. No. 60/154,047, filed on Sep. 16, 1999, (13) U.S. provisional patent application Ser. No. 60/159,082, filed on Oct. 12, 1999, (14) U.S. provisional patent application Ser. No. 60/159,039, filed on Oct. 12, 1999, (15) U.S. provisional patent application Ser. No. 60/159,033, filed on Oct. 12, 1999, (16) U.S. provisional patent application Ser. No. 60/212,359, filed on Jun. 19, 2000, (17) U.S. provisional patent application Ser. No. 60/165,228, filed on Nov. 12, 1999, (18) U.S. provisional patent application Ser. No. 60/221,443, filed on Jul. 28, 2000, (19) U.S. provisional patent application Ser. No. 60/221,645, filed on Jul. 28, 2000, (20) U.S. provisional patent application Ser. No. 60/233,638, filed on Sep. 18, 2000, (21) U.S. provisional patent application Ser. No. 60/237,334, filed on Oct. 2, 2000, (22) U.S. provisional patent application Ser. No. 60/270,007, filed on Feb. 20, 2001, (23) U.S. provisional patent application Ser. No. 60/262,434, filed on Jan. 17, 2001, (24) U.S. provisional patent application Ser. No. 60/259,486, filed on Jan. 3, 2001, (25) U.S. provisional patent application Ser. No. 60/303,740, filed on Jul. 6, 2001, (26) U.S. provisional patent application Ser. No. 60/313,453, filed on Aug. 20, 2001, (27) U.S. provisional patent application Ser. No. 60/317,985, filed on Sep. 6, 2001, (28) U.S. provisional patent application Ser. No. 60/3318,386, filed on Sep. 10, 2001, (29) U.S. utility patent application Ser. No. 09/969,922, filed on Oct. 3, 2001, (30) U.S. utility patent application Ser. No. 10/016,467, filed on Dec. 10, 2001; (31) U.S. provisional patent application Ser. No. 60/343,674, filed on Dec. 27, 2001; (32) U.S. provisional patent application Ser. No. 60/346,309, filed on Jan. 7, 2002; (33) U.S. provisional patent application Ser. No. 60/372,048, filed on Apr. 12, 2002; (34) U.S. provisional patent application Ser. No. 60/380,147, filed on May 6, 2002; (35) U.S. provisional patent application Ser. No. 60/387,486, filed on Jun. 10, 2002; (36) U.S. provisional patent application Ser. No. 60/387,961, filed on Jun. 12, 2002; (37) U.S. provisional patent application Ser. No. 60/391,703, filed on Jun. 26, 2002; (38) U.S. provisional patent application Ser. No. 60/397,284, filed on Jul. 19, 2002, and (39) U.S. provisional patent application Ser. No. 60/405,394, filed on Aug. 23, 2003, the disclosures of which are incorporated herein by reference.

In several alternative embodiments, the first and second tubular members, 14 and 16, are radially expanded and plastically deformed using other conventional methods for radially expanding and plastically deforming tubular members such as, for example, internal pressurization and/or roller expansion devices such as, for example, that disclosed in U.S. patent application publication no. US 2001/0045284 A1, the disclosure of which is incorporated herein by reference.

The use of the tubular sleeve 40 during (a) the coupling of the first tubular member 19 to the second tubular member 16, (b) the placement of the first and second tubular members in the structure 10, (c) the radial expansion and plastic deformation of the first and second tubular members, and (d) magnetic impulse applying tubular sleeve to the overlapping coupling ends between the first and second tubular members provides a number of significant benefits. For example, the tubular sleeve 40 protects the exterior surfaces of the end portions, 18 and 20, of the first and second tubular members, 14 and 16, during handling and insertion of the tubular members within the structure 10. In this manner, damage to the exterior surfaces of the end portions, 18 and 20, of the first and second tubular member, 14 and 16, are prevented that could result in stress concentrations that could result in a catastrophic failure during subsequent radial expansion operations. Furthermore, the tubular sleeve 40 provides an alignment guide that facilitates the insertion and threaded coupling of the second tubular member 16 to the first tubular member 14. In this manner, misalignment that could result in damage to the threaded connections, 22 and 24, of the first and second tubular members, 14 and 16, may be avoided. In addition, during the relative rotation of the second tubular member with respect to the first tubular member, required during the threaded coupling of the first and second tubular members, the tubular sleeve 40 provides an indication of to what degree the first and second tubular members are threadably coupled. For example, if the tubular sleeve 40 can be easily rotated, that would indicate that the first and second tubular members, 14 and 16, are not fully threadably coupled and in intimate contact with the internal flange 36 of the tubular sleeve. Furthermore, the tubular sleeve 16 may prevent crack propagation during the radial expansion and plastic deformation of the first and second tubular members, 14 and 16. In this manner, failure modes such as, for example, longitudinal cracks in the end portions, 18 and 20, of the first and second tubular members may be limited in severity or eliminated all together. In addition, after completing the radial expansion and plastic deformation of the first and second tubular members, 14 and 16, the tubular sleeve 40 may provide a fluid tight metal-to-metal seal between interior surface of the tubular sleeve and the exterior surfaces of the end portions, 18 and 20, of the first and second tubular members. In this manner, fluidic materials are prevented from passing through the threaded connections, 22 and 24, of the first and second tubular members, 14 and 16, into the annulus between the first and second tubular members and the structure 10. Furthermore, because, following the radial expansion and plastic deformation of the first and second tubular members, 14 and 16, the tubular sleeve 40 may be maintained in circumferential tension and the end portions, 18 and 20, of the first and second tubular members, 14 and 16, may be maintained in circumferential compression, axial loads and/or torque loads may be transmitted through the tubular sleeve. In addition, the tubular sleeve 40 may also increase the collapse strength of the end portions, 18 and 20, of the first and second tubular members, 14 and 16.

A useful method of forming a wellbore casing within a borehole that traverses a subterranean formation has been described that includes a first wellbore casing for positioning within the borehole and coupling the first wellbore casing to the borehole, positioning a second wellbore casing within the borehole such that the second wellbore casing overlaps with and is coupled to a portion of the first wellbore casing thereby forming a joint, positioning a tubular sleeve so that it overlaps with and is coupled to at least a portion of the first wellbore casing and to a portion of the second wellbore casing, the tubular sleeve extending a length in either axial direction from the joint between the first and second wellbore casings, causing the tubular sleeve to collapse inwardly onto the respective end portions of the first and second wellbore casings and to sealingly engage the exterior surfaces of the end portions of the first and second wellbore casings respectively on either side of the joint there between, thereby facilitating sealing the joint.

In an exemplary embodiment, the method further includes regularly expanding and plastically deforming the overlapping portions of the first and second wellbore casing and regularly expanding and plastically deforming the tubular sleeve that was sealingly collapsed onto the overlapping portions of the first and second wellbore casings. In an exemplary embodiment, the exterior diameters of the first and second wellbore casings axially adjacent to the joint there between are substantially equal. In an exemplary embodiment, the inside diameters of the first wellbore casings and the inside diameter of the second wellbore casing are substantially equal. In an exemplary embodiment, the inside diameters of the first wellbore casing and the second wellbore casing are substantially constant.

It will further understood by those skilled in the art upon reading the foregoing disclosure and the claims that follow, and upon review of the drawings that the method may further include forming a wellbore casing within a borehole that traverses a subterranean formation including positioning first wellbore casing, second wellbore casing and additional wellbore casings within the borehole that overlaps one with the other and that are coupled to one another at a joint between each successive wellbore casing. In the method with additional wellbore casings would further includes additional tubular sleeves positioned to overlap each successive joint of the successive wellbore casings in causing each sleeve to collapse inwardly on the respective end portions of the first, second, and additional wellbore casings to sealingly engage the exterior surfaces of the respective end portions. The method further includes the use of magnetic impulse energy to collapse the tubular sleeves onto the surfaces of the wellbore casings at the joints thereof, thereby facilitating sealing of the joints.

It is understood that variations may be made in the foregoing without departing from the scope of the invention. For example, the teachings of the present illustrative embodiments may be used to provide a wellbore casing, a pipeline, or a structural support. Furthermore, the elements and teachings of the various illustrative embodiments may be combined in whole or in part in some or all of the illustrative embodiments.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A method of forming a wellbore casing within a borehole that traverses a subterranean formation, comprising:
    assembling a tubular liner assembly by a process comprising:
        coupling a threaded portion of a first tubular member to the threaded portion of a second tubular member; and
        coupling a tubular sleeve to the threaded portions of the first and second tubular members;
    positioning the tubular liner assembly within the borehole; and
    radially expanding and plastically deforming the tubular liner assembly within the borehole;
    wherein coupling the tubular sleeve to the threaded portions of the first and second tubular members comprises:
        applying impulsive magnetic energy to the tubular sleeve.

2. A method of forming a coupling between metallic tubular members comprising a process comprising:
    forming a female coupling portion on a first tubular member;
    forming a male coupling portion on a second tubular member;
    forming at least one raised ridge ring between the male and female coupling portions;
    coupling the female coupling portion of the first tubular member and the male portion of the second tubular member including pressing the coupling portions together in surface-to-surface contact;
    applying a tubular sleeve to exterior surfaces of the pressed together coupling portions of the first and second tubular members using a magnetic impulse generator; and
    radially expanding and plastically deforming the coupling between the tubular members with the tubular sleeve applied.

3. The method of claim 2, wherein coupling the male and female coupling portions together further comprises forming at least one ridge ring interposed between the coupling portions to increase the surface-to-surface stress, thereby facilitating sealing between the first and second tubular members.

4. The method of claim 2 wherein coupling the male and female coupling portions together further comprises forming a layer of material softer than the metallic tubular members interposed between the coupling portions to increase the surface-to-surface stress, thereby facilitating sealing between the first and second tubular members.

5. A method of forming a wellbore casing within a borehole that traverses a subterranean formation, comprising:
    assembling a tubular liner assembly by a process comprising:
        coupling an end of a first tubular member to an end of a second tubular member; and
        coupling a tubular sleeve to the ends of the first and second tubular members;
    positioning the tubular liner assembly within the borehole: and
    radially expanding and plastically deforming the tubular liner assembly within the borehole;
    wherein coupling the tubular sleeve to the ends of the first and second tubular members comprises:
        applying impulsive magnetic energy to the tubular sleeve.

6. A method of forming a coupling between metallic tubular members comprising a process comprising the steps of:
    coupling the ends of first and second tubular members;
    applying a tubular sleeve to the ends of the first and second tubular members using magnetic energy; and
    radially expanding and plastically deforming the coupling between the first and second tubular members with the tubular sleeve applied.

7. The method of claim 6, wherein coupling the ends of the first and second tubular members comprises increasing the surface-to-surface stress between the first and second tubular members.

8. The method of claim 6, wherein coupling the ends of the first and second tubular members comprises forming a layer of material softer than the ends of the first and second tubular members interposed between the ends of the first and second tubular members.

9. A system for forming a wellbore casing within a borehole that traverses a subterranean formation, comprising:
    means for assembling a tubular liner assembly comprising:
        means for coupling a threaded portion of a first tubular member to the threaded portion of a second tubular member; and
        means for coupling a tubular sleeve to the threaded portions of the first and second tubular members;
    means for positioning the tubular liner assembly within the borehold: and
    means for radially expanding and plastically deforming the tubular liner assembly within the borehole;
    wherein means for coupling the tubular sleeve to the threaded portions of the first and second tubular members comprises:
        means for applying impulsive magnetic energy to the tubular sleeve.

10. A system for forming a coupling between metallic tubular members comprising:
    means for forming a female coupling portion on a first tubular member;
    means for forming a male coupling portion on a second tubular member;
    means for forming at least one raised ridge ring between the male and female coupling portions;
    means for coupling the female coupling portion of the first tubular member and the male portion of the second tubular member including pressing the coupling portions together in surface-to-surface contact;
    means for applying a tubular sleeve to exterior surfaces of the pressed together coupling portions of the first and second tubular members using magnetic energy; and
    means for radially expanding and plastically deforming the coupling between the tubular members with the tubular sleeve applied.

11. The system claim 10, wherein means for coupling the male and female coupling portions together further comprises means for forming at least one ridge ring interposed between the coupling portions to increase the surface-to-surface stress.

12. The system of claim 10, wherein means for coupling the male and female coupling portions together further comprises means for forming a layer of material softer than the metallic tubular members interposed between the coupling portions to increase the surface-to-surface stress, thereby facilitating sealing between the first and second tubular members.

13. A system for forming a wellbore casing within a borehole that traverses a subterranean formation, comprising:
    means for assembling a tubular liner assembly by a process comprising:
        means for coupling an end of a first tubular member to an end of a second tubular member; and
        means for coupling a tubular sleeve to the ends of the first and second tubular members;
    means for positioning the tubular liner assembly within the borehole; and
    means for radially expanding and plastically deforming the tubular liner assembly within the borehold;
    wherein means for coupling the tubular sleeve to the ends of the first and second tubular members comprises:
        applying impulsive magnetic energy to the tubular sleeve.

14. A system for forming a coupling between the metallic tubular members comprising:
    means for coupling the ends of first and second tubular members;
    means for applying a tubular sleeve to the ends of the first and second tubular members using magnetic energy; and
    means for radially expanding and plastically deforming the coupling between the first and second tubular members with the tubular sleeve applied.

15. The system of claim 14, wherein means for coupling the ends of the first and second tubular members comprises means for increasing the surface-to-surface stress between the first and second tubular members.

16. The system of claim 14, wherein means for coupling the ends of the first and second tubular members comprises means for forming a layer of material softer than the ends of the first and second tubular members interposed between the ends of the first and second tubular members.

* * * * *